United States Patent [19]
Miyake et al.

[11] Patent Number: 5,941,933
[45] Date of Patent: Aug. 24, 1999

[54] INFORMATION TRANSMITTING APPARATUS AND INFORMATION RECEIVING APPARATUS

[75] Inventors: Katsumi Miyake; Shigeki Goda, both of Ikeda, Japan

[73] Assignee: Daihatsu Motor Co., Ltd., Osaka, Japan

[21] Appl. No.: 08/725,172

[22] Filed: Oct. 3, 1996

[30] Foreign Application Priority Data

| Oct. 4, 1995 | [JP] | Japan | 7-257483 |
| May 14, 1996 | [JP] | Japan | 8-119321 |
| Jul. 23, 1996 | [JP] | Japan | 8-193173 |

[51] Int. Cl.$^6$ .................................................. G06F 165/00
[52] U.S. Cl. ........................ 701/208; 701/2; 701/32; 455/39; 455/70
[58] Field of Search .................... 701/29, 31, 207, 701/208, 212, 2, 32; 455/13.1, 68, 70, 72, 39, 419

[56] References Cited

U.S. PATENT DOCUMENTS

| 4,296,491 | 10/1981 | Jerome | 369/59 |
| 5,005,129 | 4/1991 | Abe et al. | 701/31 |
| 5,046,082 | 9/1991 | Zicker et al. | 455/419 |
| 5,327,486 | 7/1994 | Wolff et al. | 379/93.23 |
| 5,548,822 | 8/1996 | Yogo | 455/68 |
| 5,680,328 | 10/1997 | Skorupski et al. | 701/30 |
| 5,684,526 | 11/1997 | Yoshinobu | 348/13 |
| 5,696,676 | 12/1997 | Takaba | 701/29 |

Primary Examiner—Jacques H. Louis-Jacques
Assistant Examiner—Gertrude Arthur
Attorney, Agent, or Firm—Roylance, Abrams, Berdo & Goodman, L.L.P.

[57] ABSTRACT

Provided is an information transmitting apparatus for transmitting information to an external receiving apparatus by means of a radio wave comprising: a control information attaching device for attaching control information representing a control processing method on the receiving apparatus side of the information to the information to be transmitted; and a transmitting device for transmitting information to which the control information is attached. Further provided is an information receiving apparatus for receiving and displaying transmitted information comprising: a receiving device for receiving the transmitted information; a display device for displaying the received information; and information processing device operating, when control information representing a control processing method of the received information is attached to the received information, to execute information processing corresponding to the control information.

31 Claims, 85 Drawing Sheets

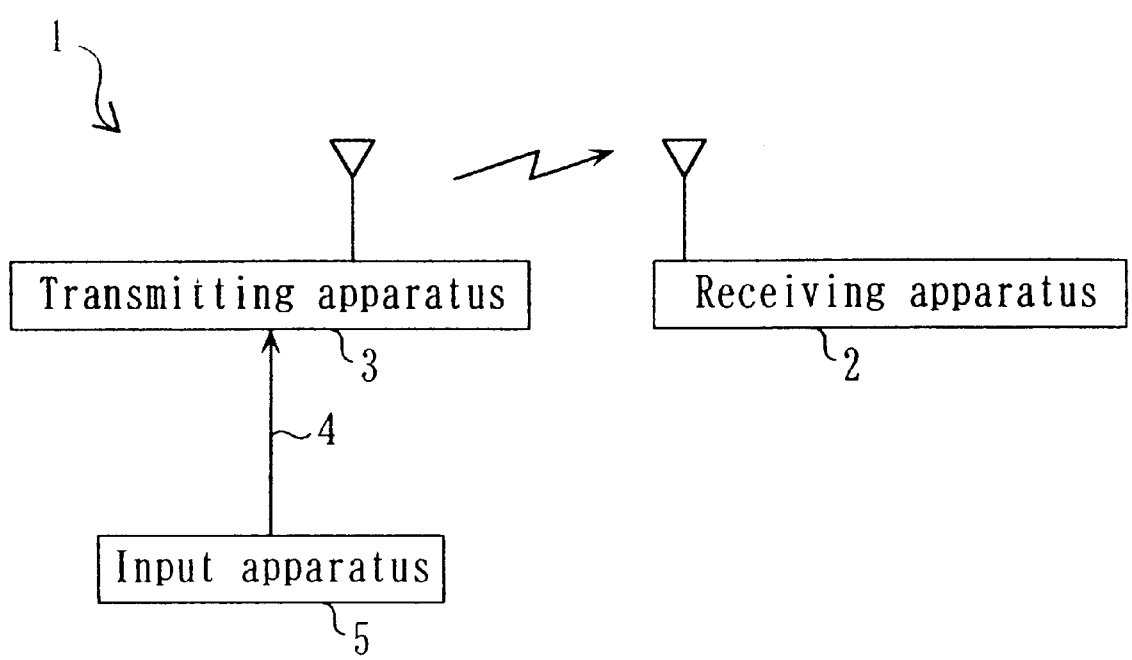

<Fig. 2>
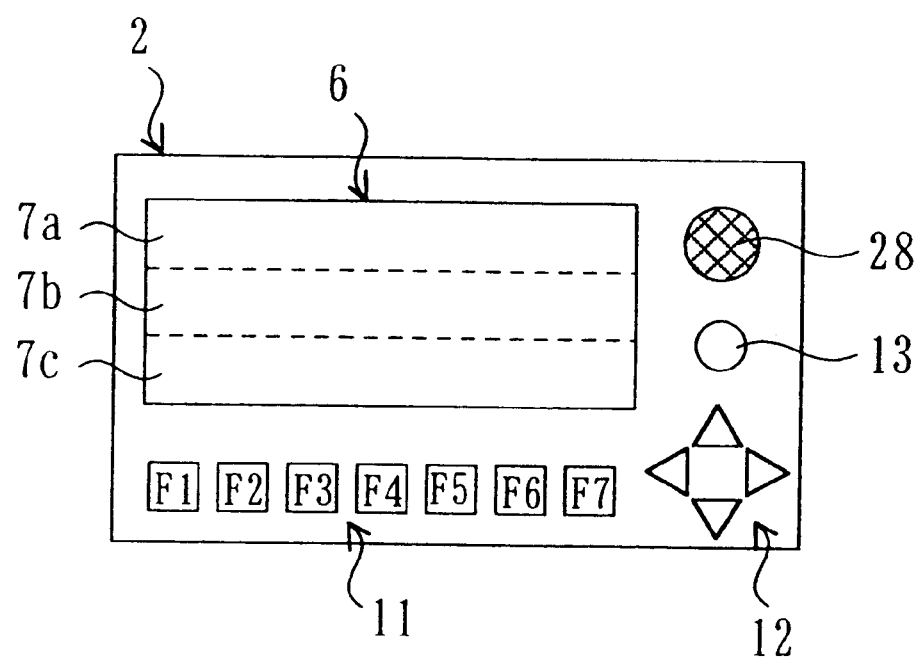

<Fig. 4>
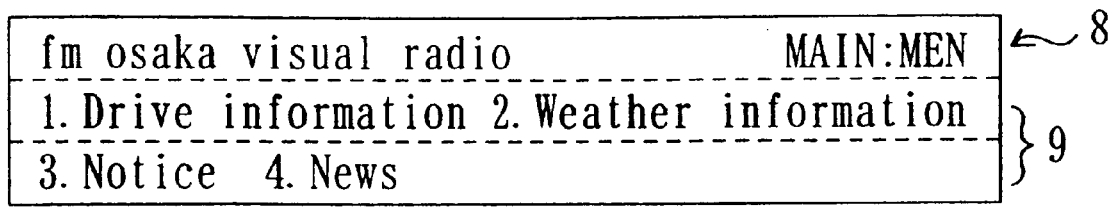

<Fig. 4>
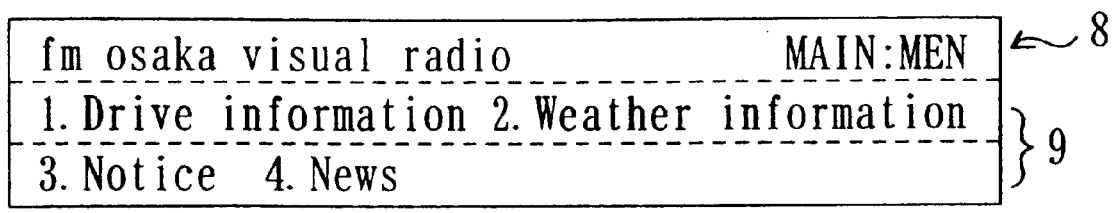

⟨Fig. 5⟩
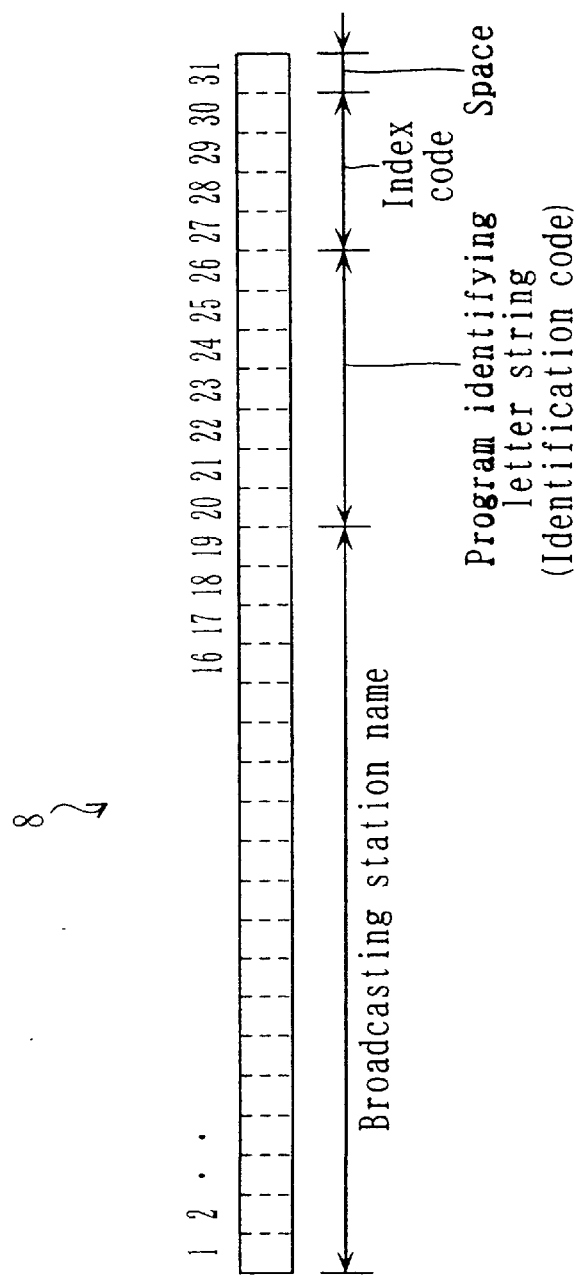

<Fig. 6>

| Byte | | Attribute · Processing |
|---|---|---|
| 20~26 | 27 | |
| D-INFO: | F | Facility information |
| D-INFO: | R | Restaurant information |
| D-INFO: | V | Voice guide activation |
| DGUIDE: | A | Radio frequency change |
| DGUIDE: | B | Drive train control (engine·A/T) |
| DGUIDE: | C | Chassis control |

⟨Fig. 7⟩

| Index code | Attribute |
|---|---|
| (sp) (sp) (sp) (sp) | Program title and notice from broadcasting station |
| MENU | Drive information sub-menu |
| □□□ | Instruction of contents and processing |
| | "-": Title page of sub-program |
| | Numeral: Additional numeral (1 to 9) of event, facility, etc. provided by sub-program |
| | Page symbol of provided information |
| | "*", "0": First page of provided information |
| | "s": Information automatic storing instruction |
| | (sp): Not stored automatically |

<Fig. 8>

|   | Letter string | Number of letters |
|---|---|---|
| 1 | NAVICODE | 8 |
| 2 | NaviCode | 8 |
| 3 | navicode | 8 |

<Fig. 9>

| fm osaka visual radio D-INFO: | ~8 |
| Drive information | |
| ON AIR!! | }9 |

<Fig. 10>

| fm osaka visual radio D-INFO:MENU |
| F: Special program of this week R: Recommended restaurant |
| E: Event guide D: Message board |

<Fig. 11>

| fm osaka visual radio D-INFO:F- 0 |
| Special program of this week |
| Guidance of fireworks display on 7/10 through 7/15 |

<Fig. 12>

| fm osaka visual radio D-INFO:F1 * |
| Yodo River fireworks display at 19:00 on 7/15 |
| Right bank of Yodo River at Juso |

<Fig. 13>

| fm osaka visual radio | D-INFO:F1 1 |
|---|---|
| P: Yodo River flood plain | 1200 cars |
| Private parking near the parking | 800 cars |

<Fig. 14>

| fm osaka visual radio | D-INFO:F1 0 |
|---|---|
| Traffic control at and near Juso Station from 17:00 for Yodo River fireworks display | |

<Fig. 15>

| fm osaka visual radio | D-INFO:F2 * |
|---|---|
| Fireworks display at Kobe Portpia Land from 19:00 on 7/12 | |

<Fig. 16>

| fm osaka visual radio | D-INFO:F2 2 |
|---|---|
| • | |
| • | |

<Fig. 17>

| fm osaka visual radio NaviCode00 |
|---|
| F1:19LKJ96A9    F2:2CBF2371 |
| F3:HIJ876A43    F4:*** |

<Fig. 18>

| fm osaka visual radio NaviCode00 |
|---|
| . |
| . |

<Fig. 19>

| fm osaka visual radio | weather forecast | ← 8 |

| Osaka (today) |
| Cloudy after sunny |

| Traffic information · · 1 |
| Weather forecast · · 2 |
| Do input |

<Fig. 21>
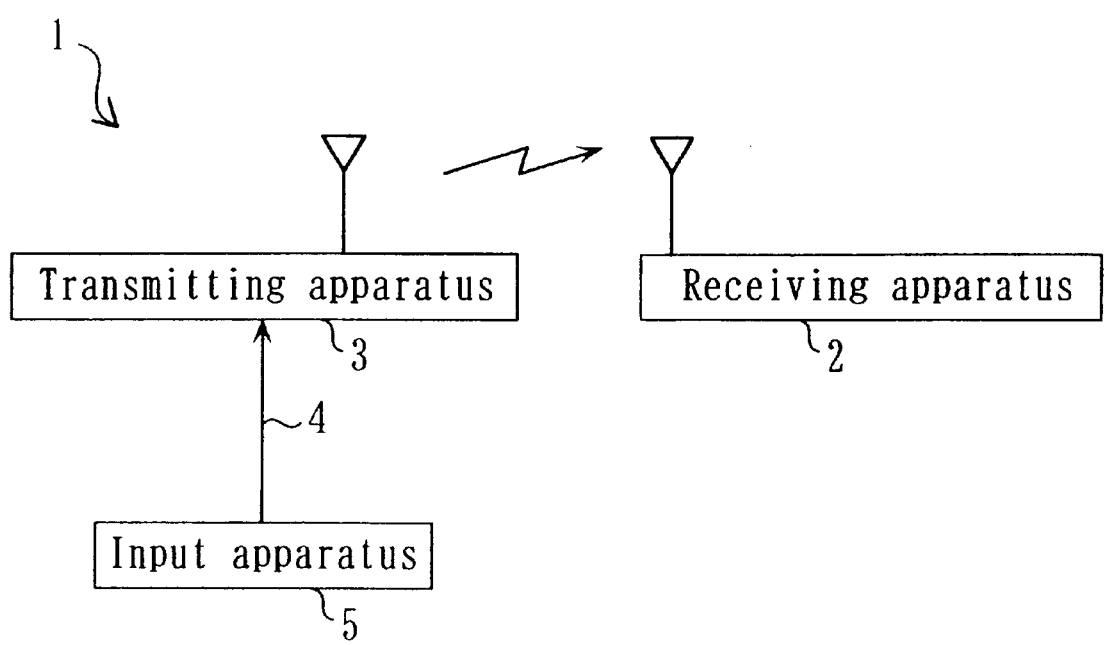

<Fig. 22>

```
┌─────────────────────────────────────┐ ⸝8
│ Daihatsu facility information       │
├─────────────────────────────────────┤
│ Recommended spot of this week is    │ ⎫
├─────────────────────────────────────┤ ⎬9
│  Kaiyukan                           │ ⎭
└─────────────────────────────────────┘
```

```
┌─────────────────────────────────────┐ ⸝8
│ 350216  1351212                     │
├─────────────────────────────────────┤
│ This week has many events           │ ⎫
├─────────────────────────────────────┤ ⎬9
│  including topical whale shark      │ ⎭
└─────────────────────────────────────┘
```

```
┌─────────────────────────────────────┐ ⸝8
│ 03201215 02001422                   │
├─────────────────────────────────────┤
│ Dolphin show                        │ ⎫
├─────────────────────────────────────┤ ⎬9
│ Yacht carnival                      │ ⎭
└─────────────────────────────────────┘
```

<Fig. 23>
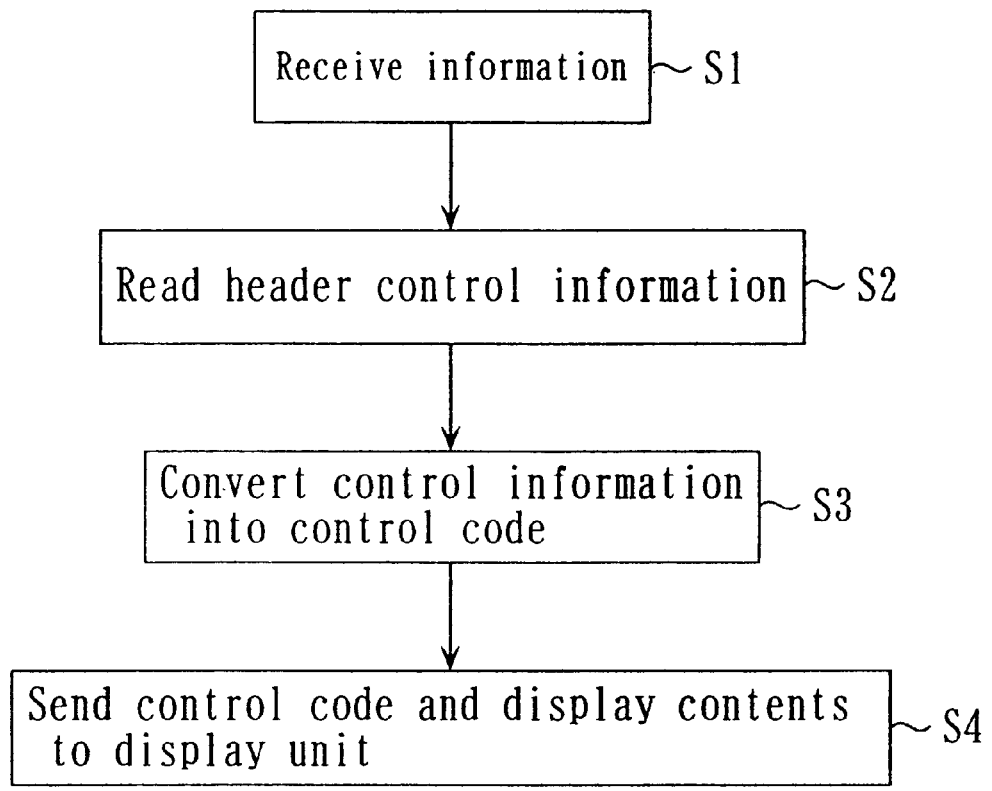

<Fig. 24>
(a) 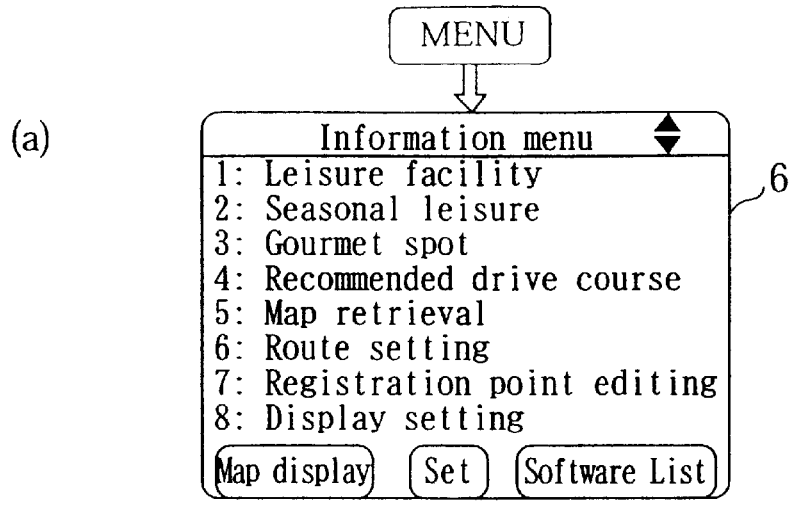
(b) 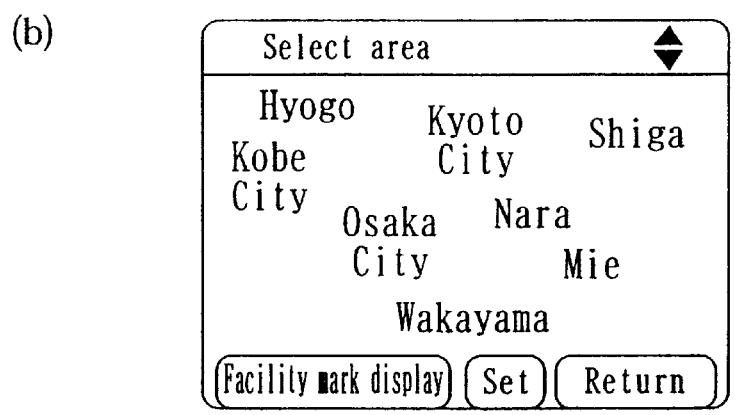
(c) 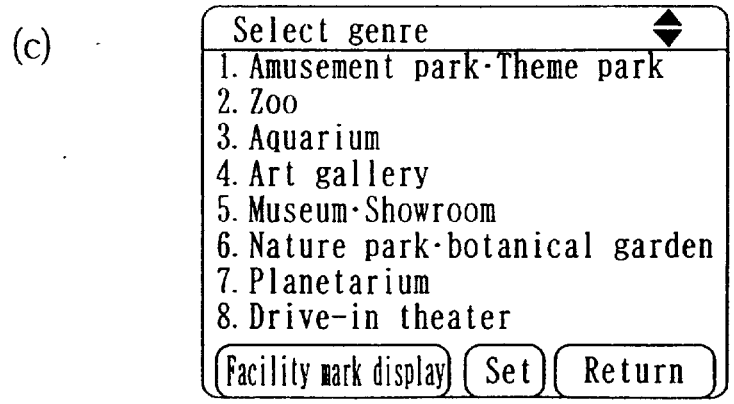

<Fig. 25>
(a) 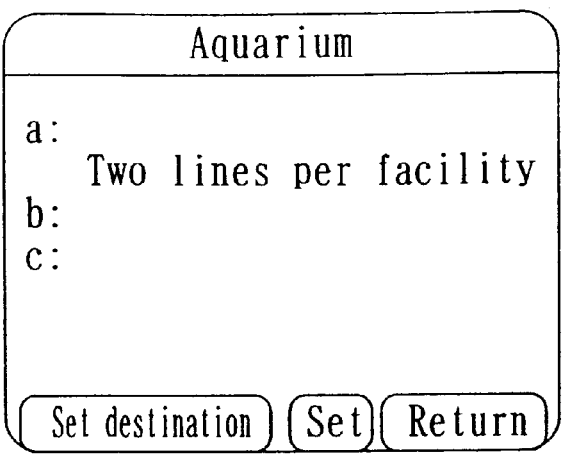
(b) 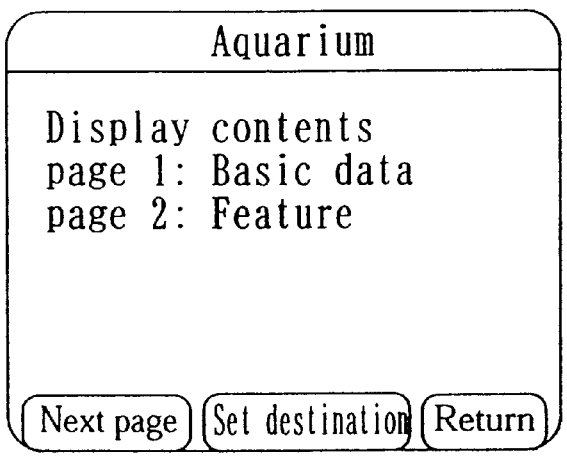
(c) 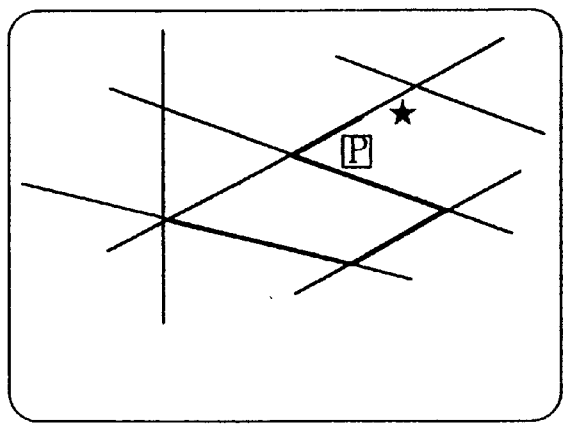

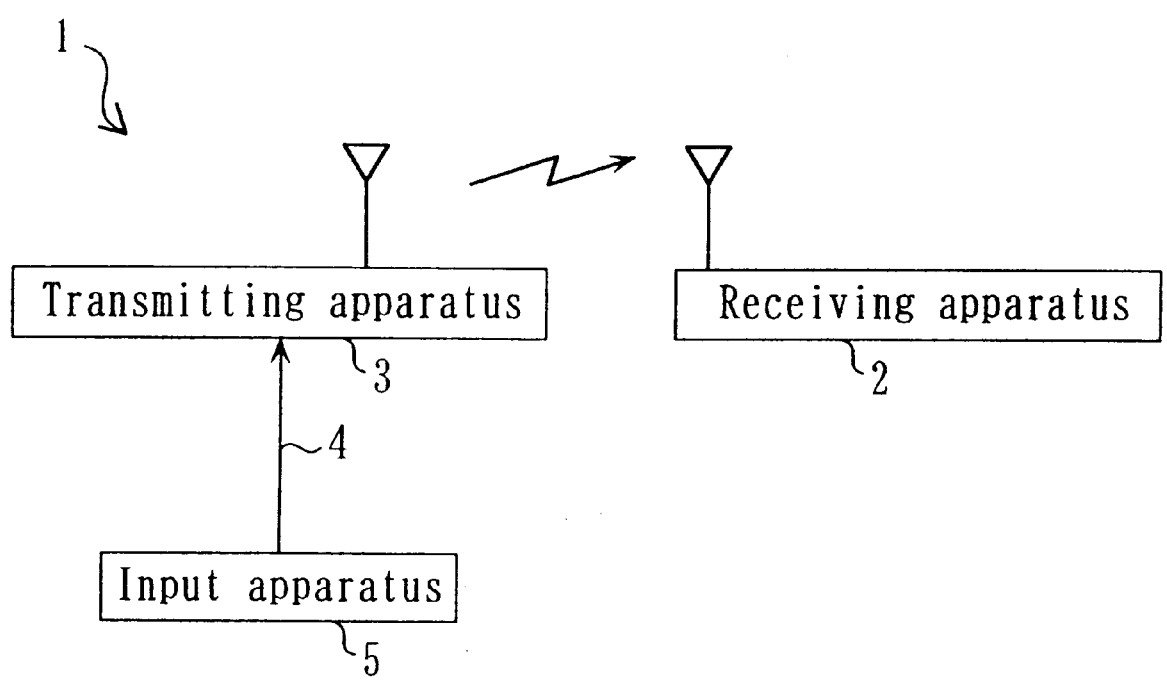
<Fig. 26>

<Fig. 27>
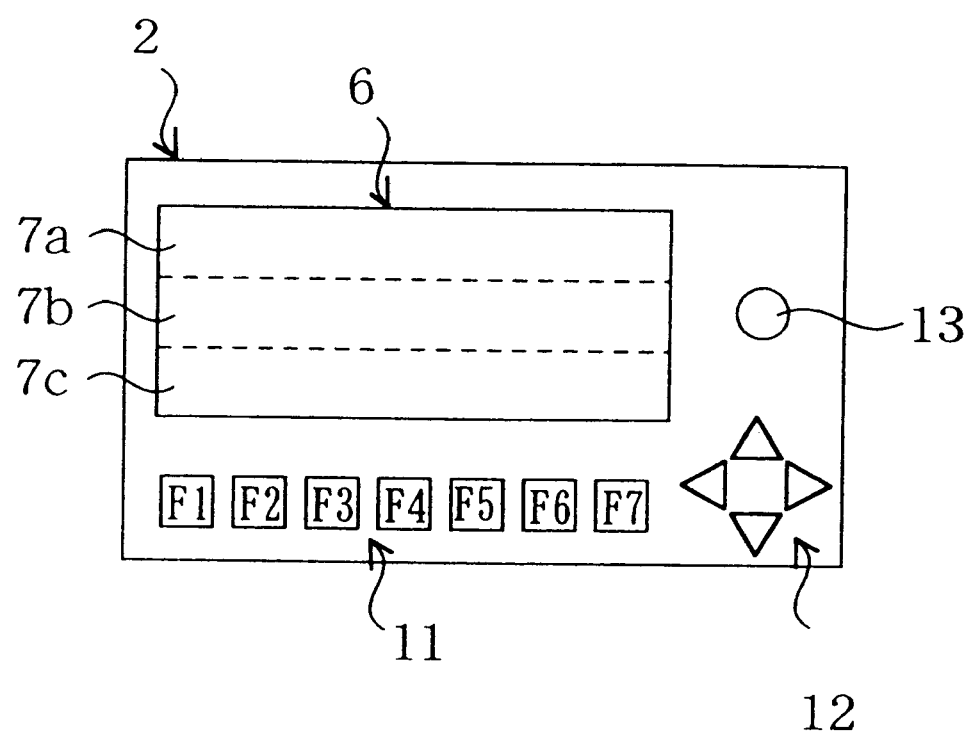

<Fig. 28>
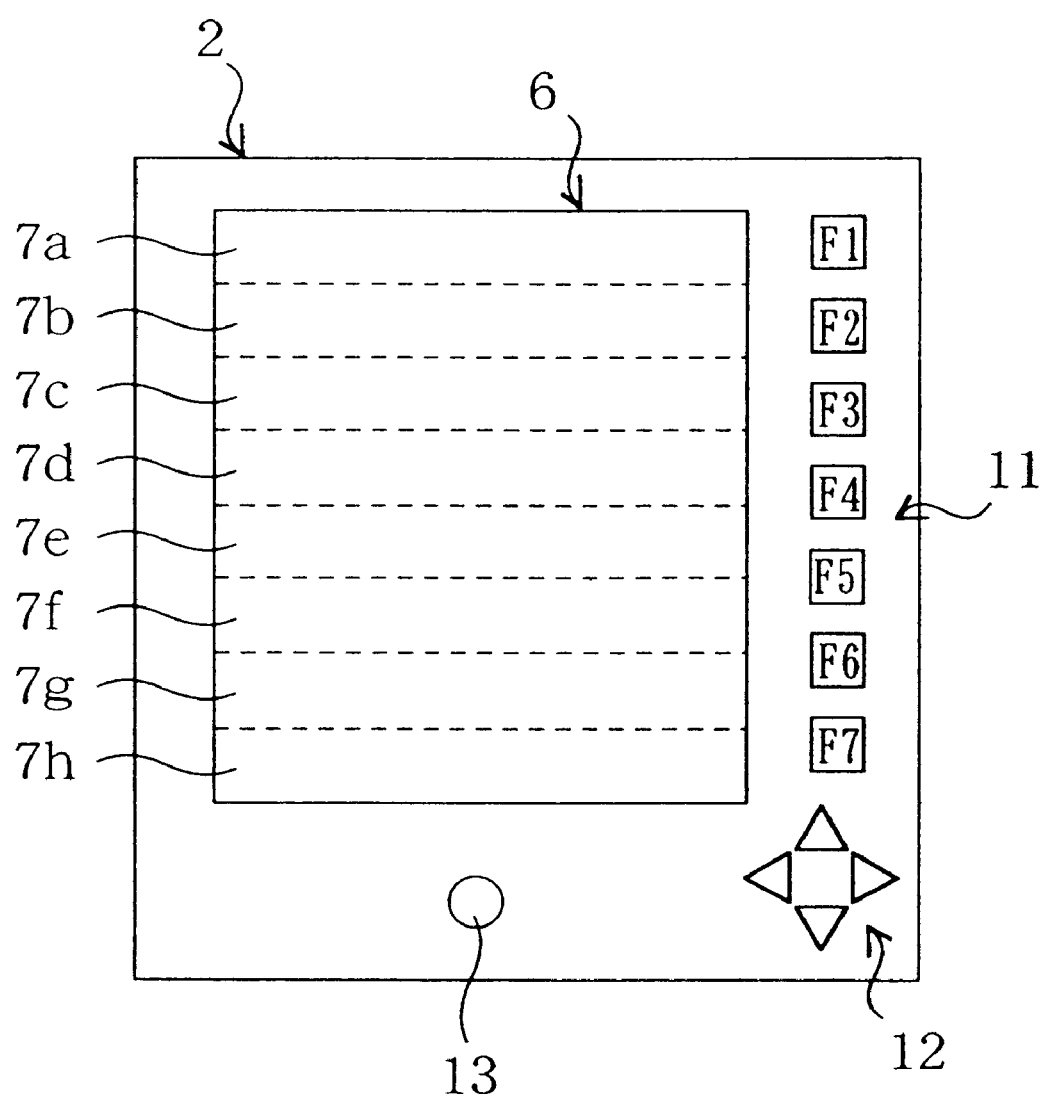

⟨Fig. 29⟩
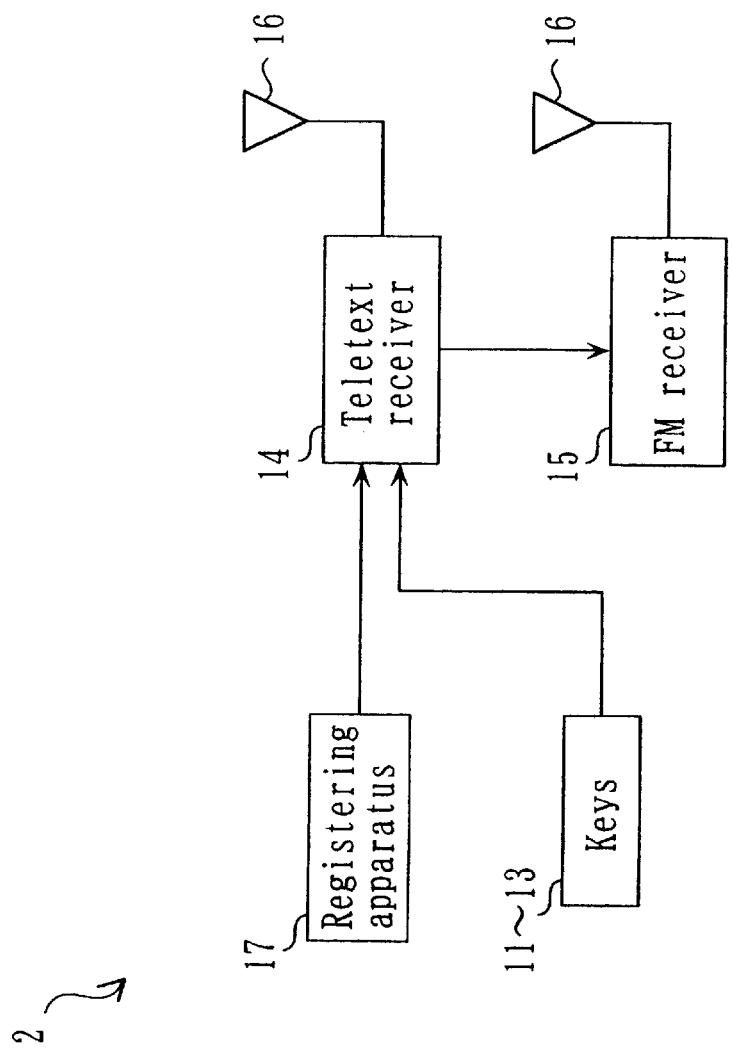

⟨Fig. 30⟩
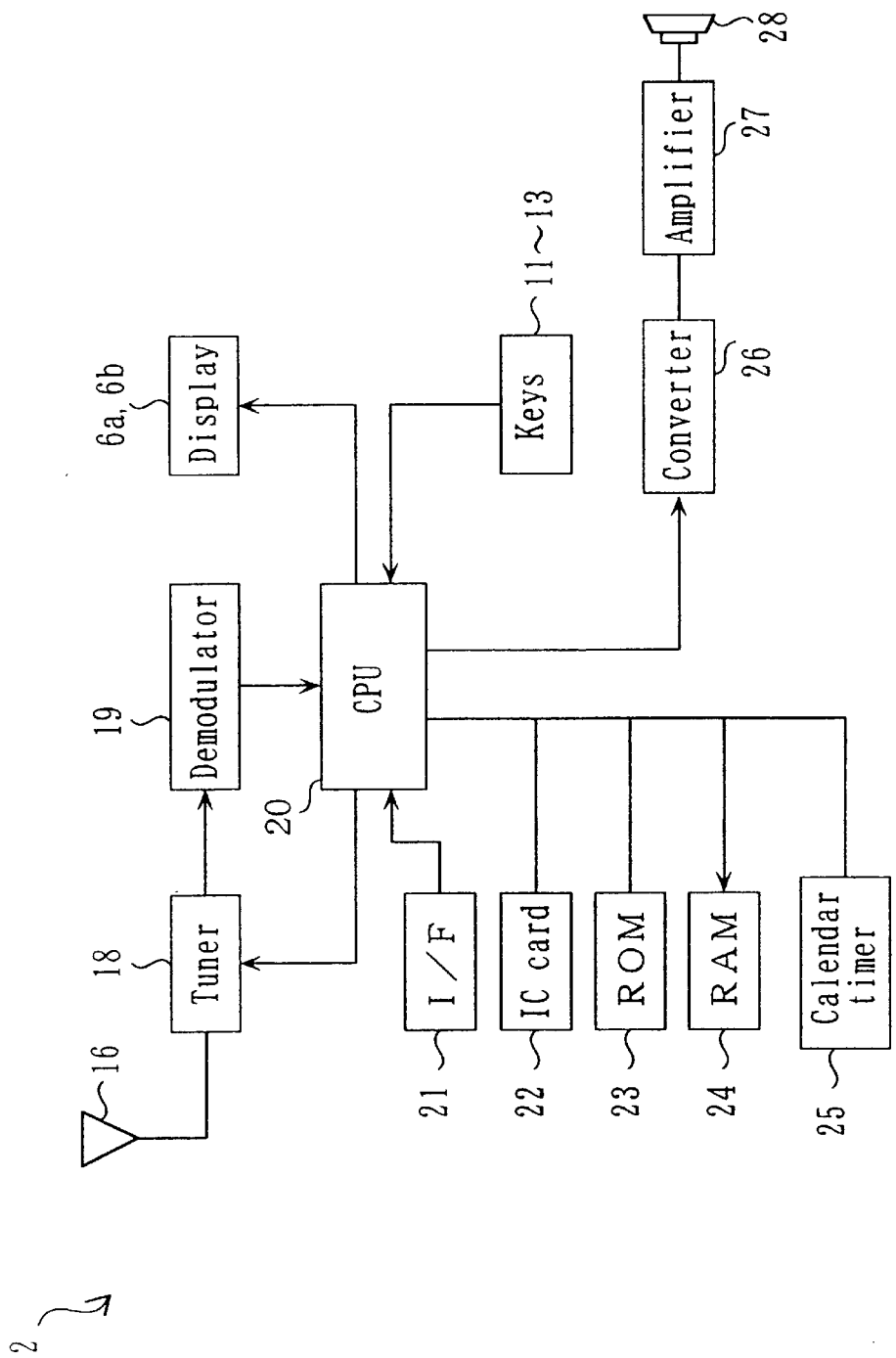

⟨Fig. 31⟩

○○ electric railroad company information 312 — 8

Event of □□ will be held at ˆˆ Park — 9

⟨Fig. 32⟩
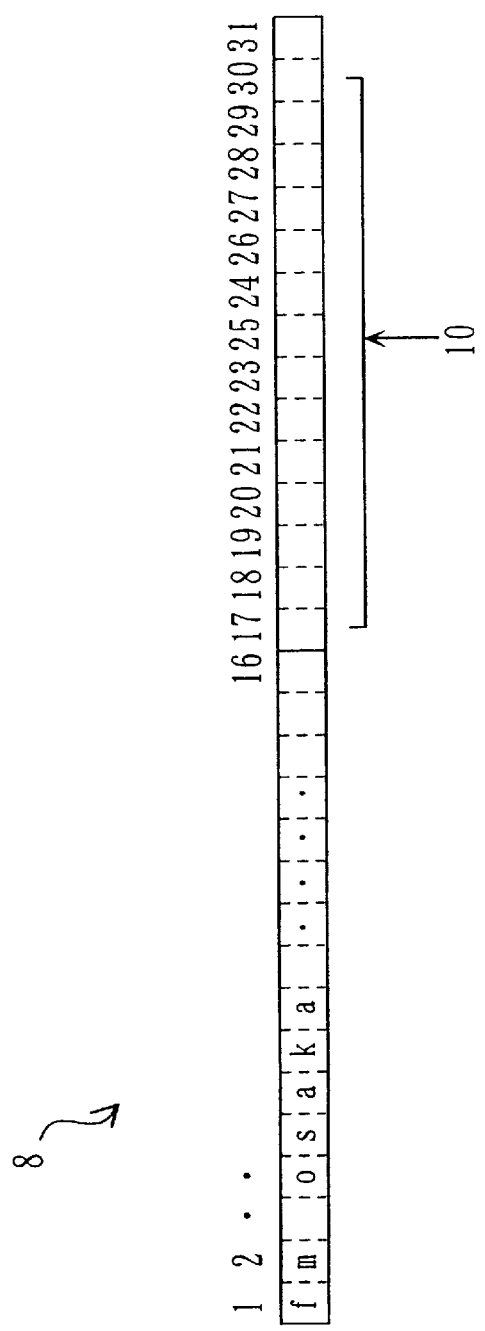

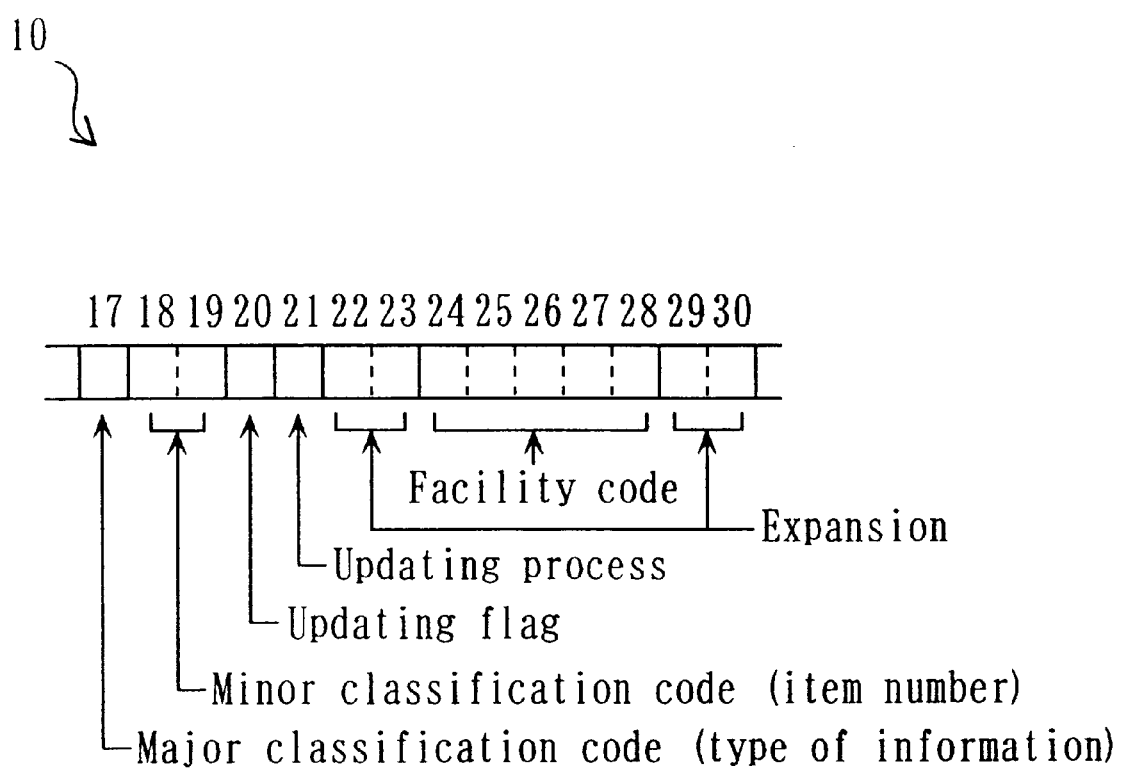
<Fig. 33>

<Fig. 34>
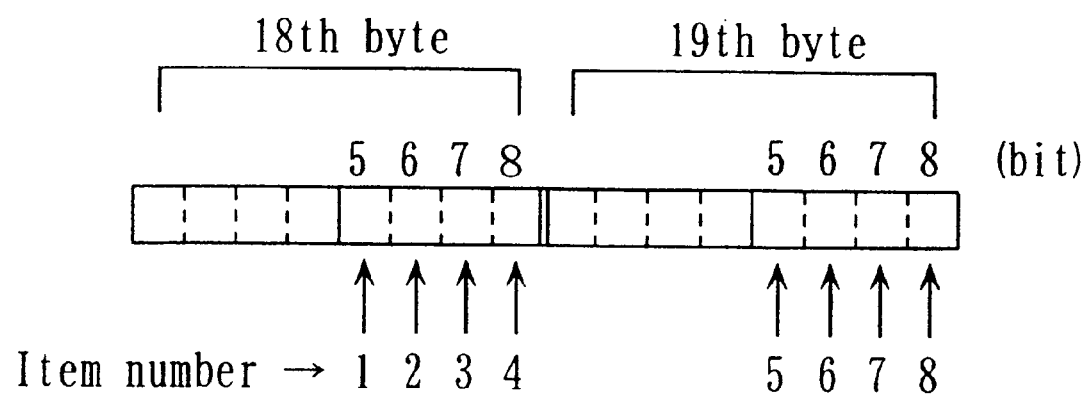

⟨Fig. 35⟩
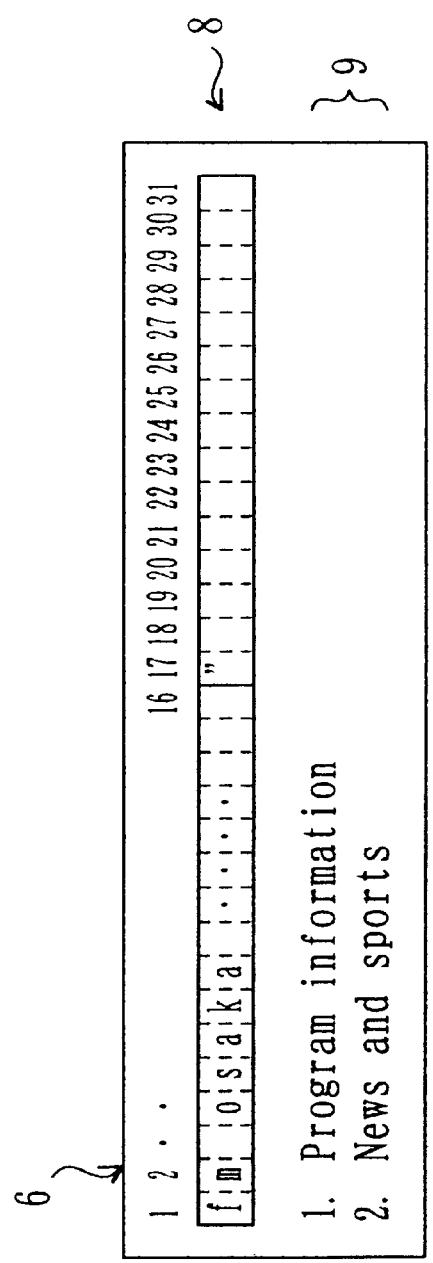

⟨Fig. 36⟩
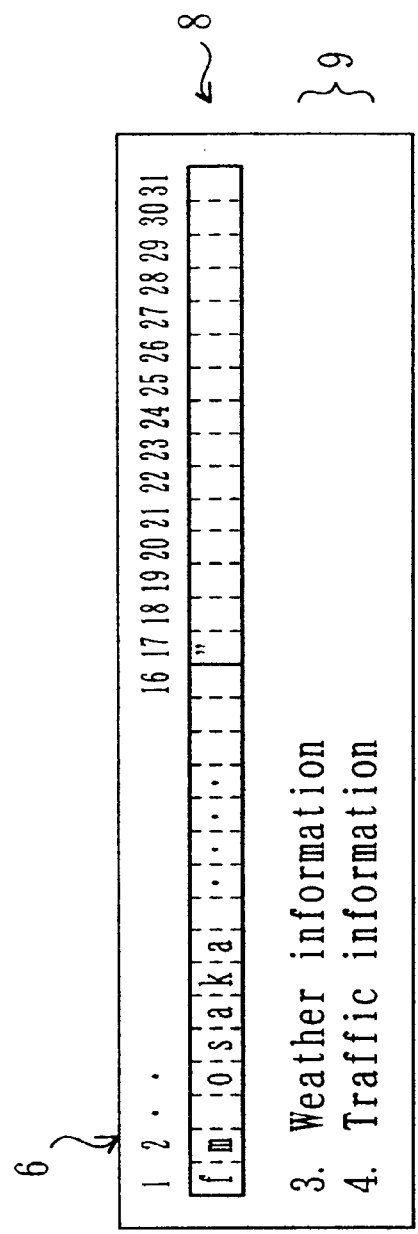

⟨Fig. 37⟩
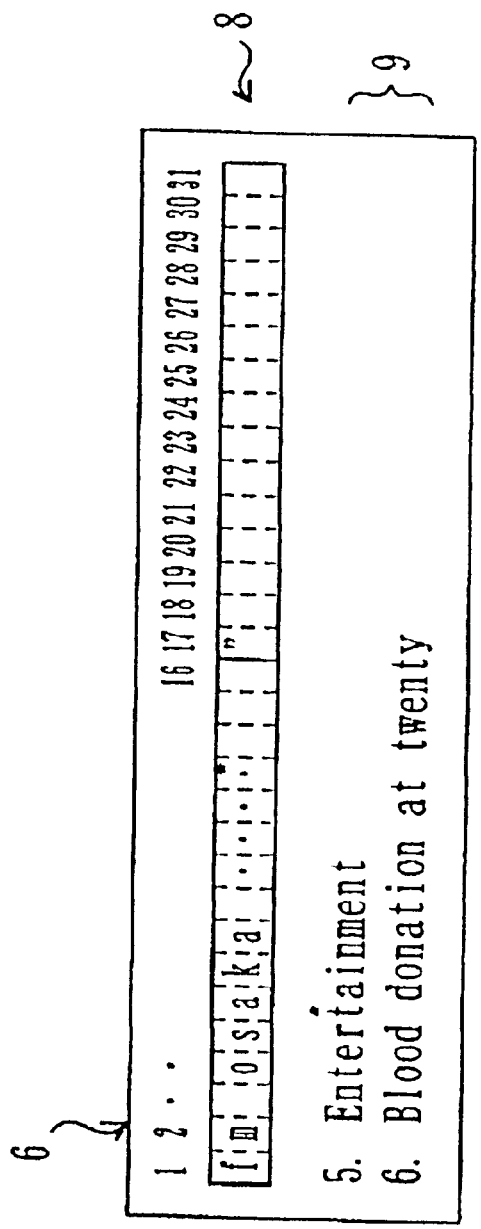

⟨Fig. 38⟩
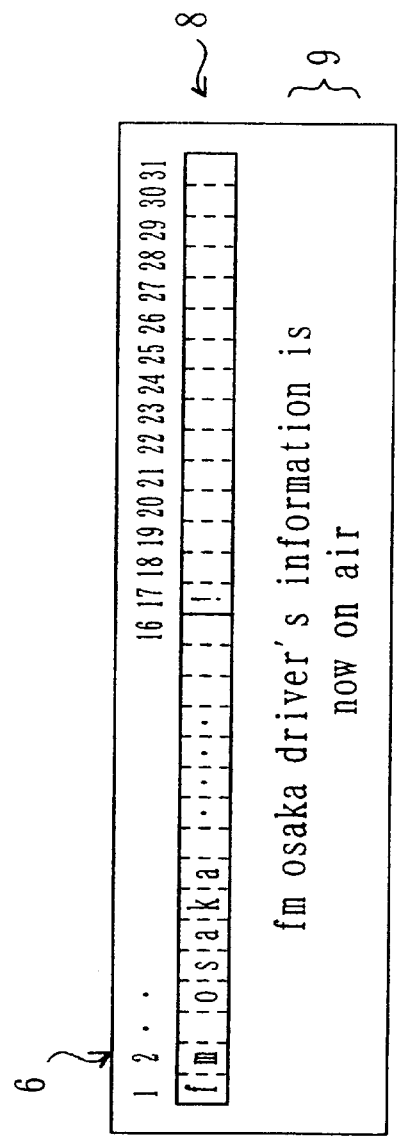

⟨Fig. 39⟩
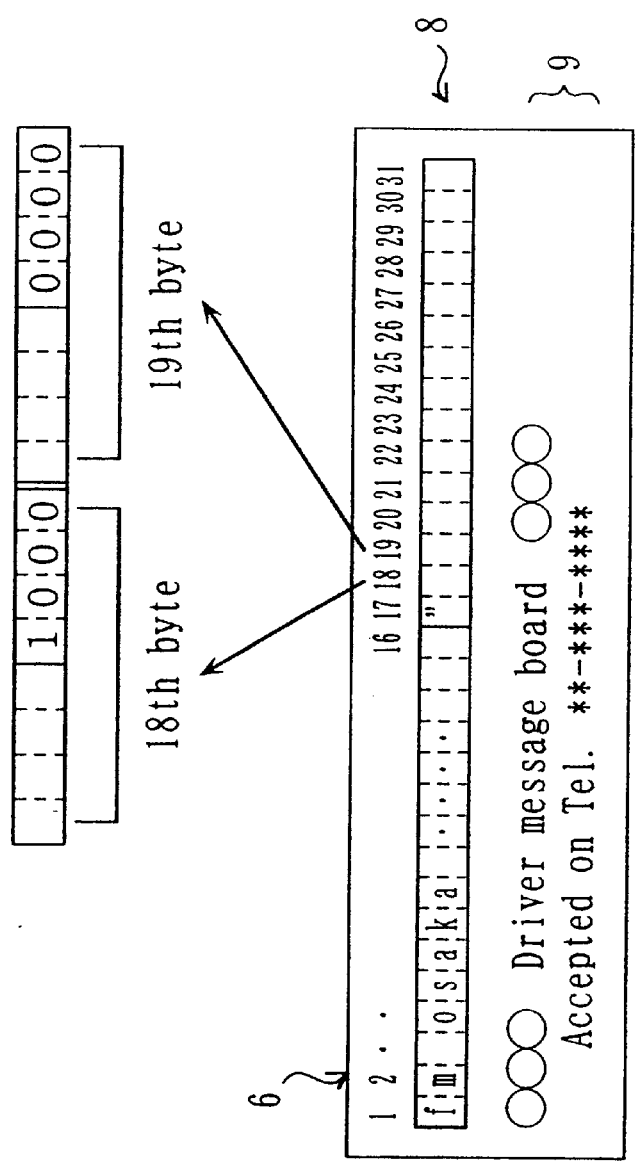

⟨Fig. 40⟩
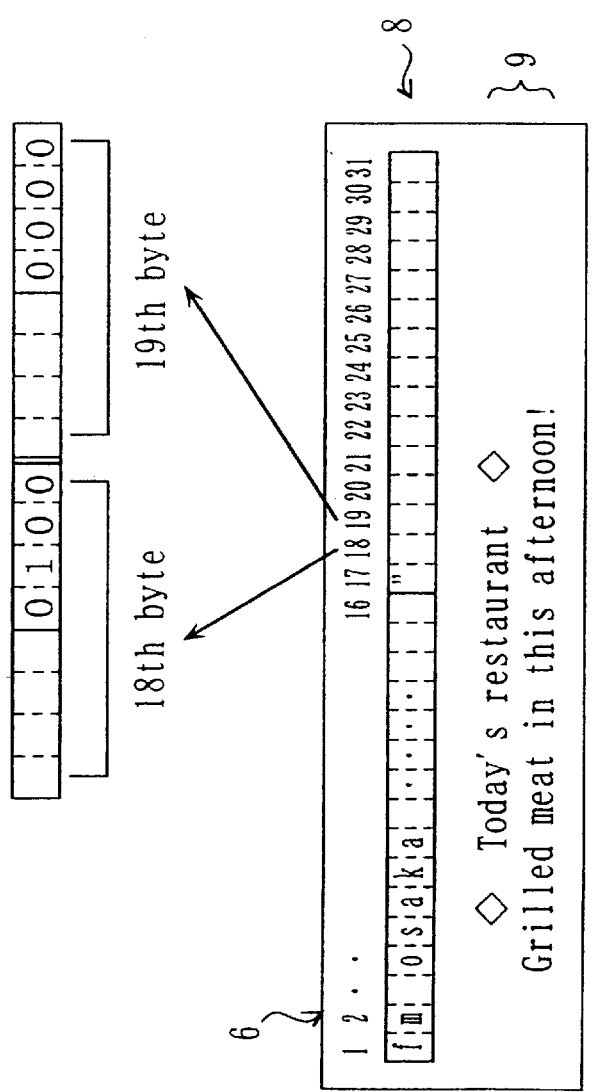

⟨Fig. 41⟩
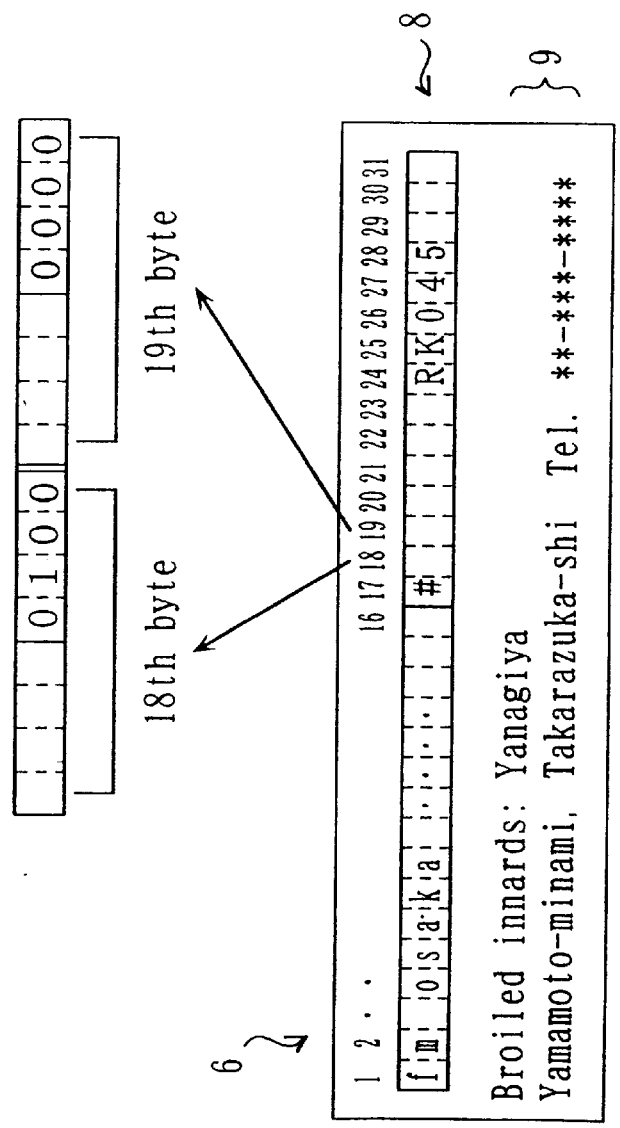

⟨Fig. 42⟩
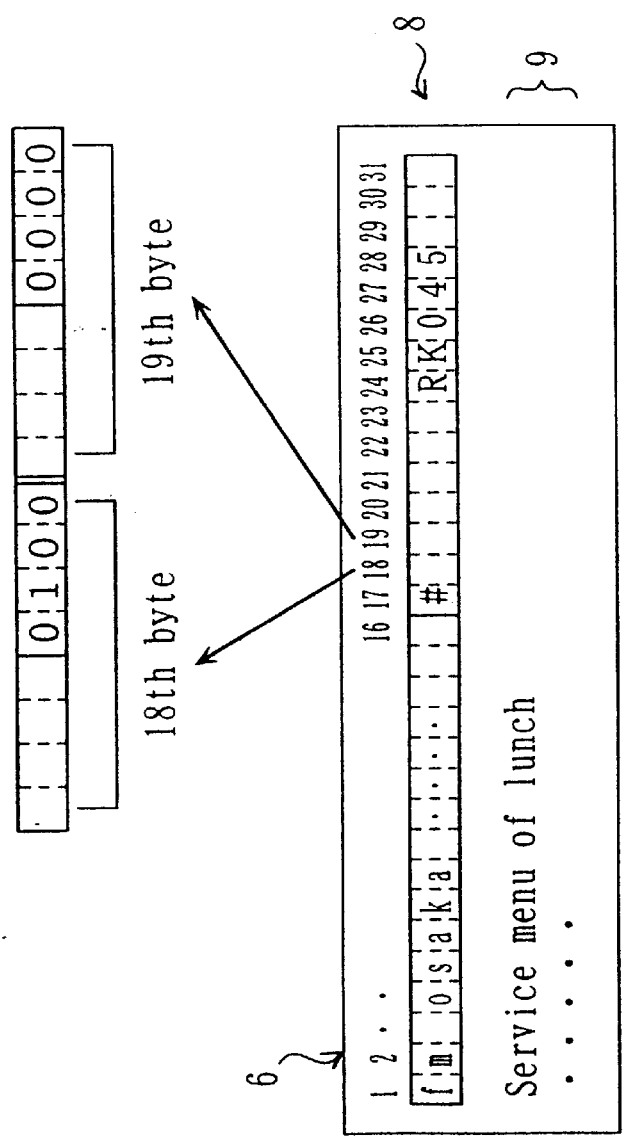

⟨Fig. 43⟩
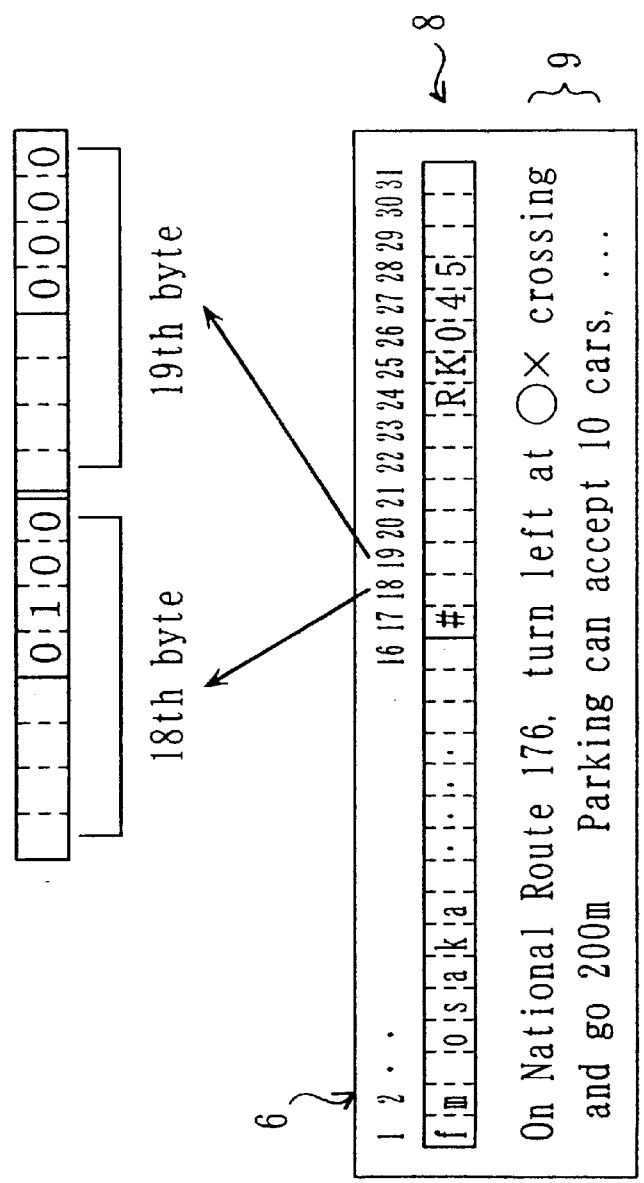

⟨Fig. 44⟩
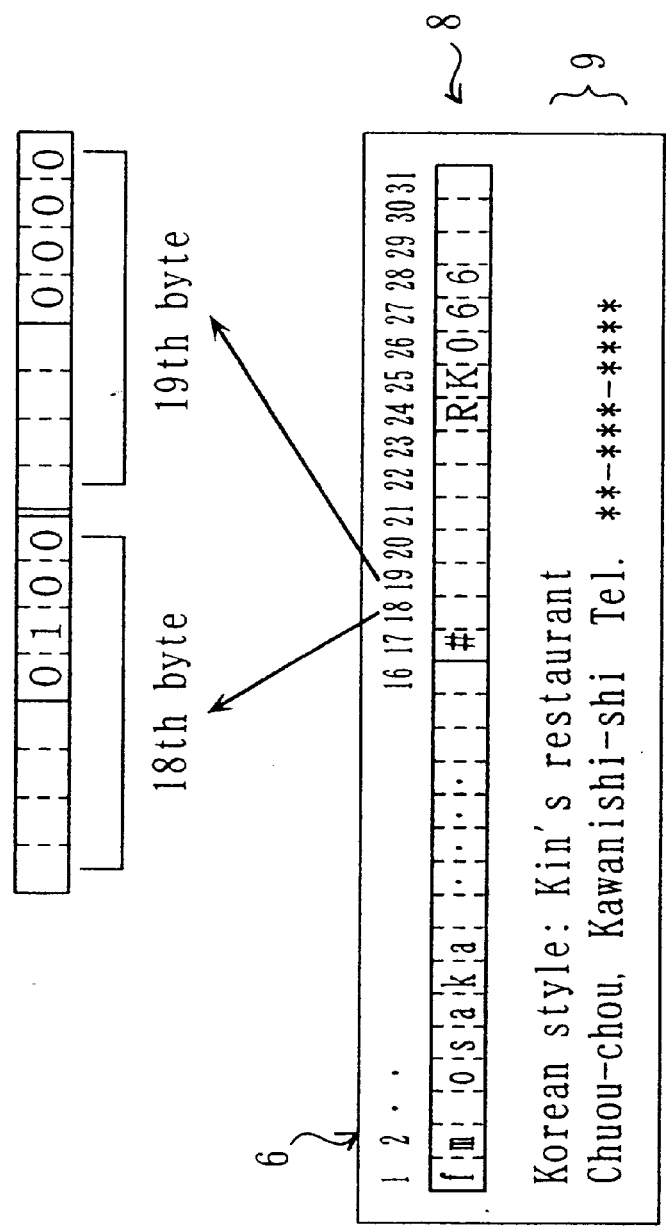

⟨Fig. 45⟩
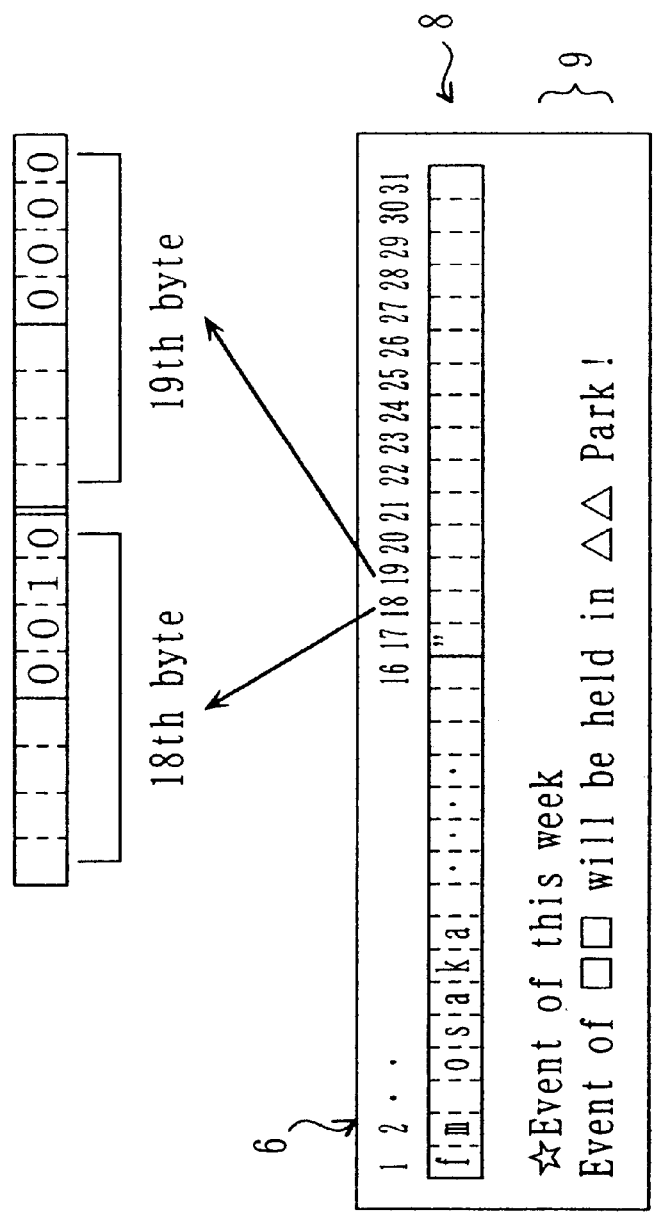

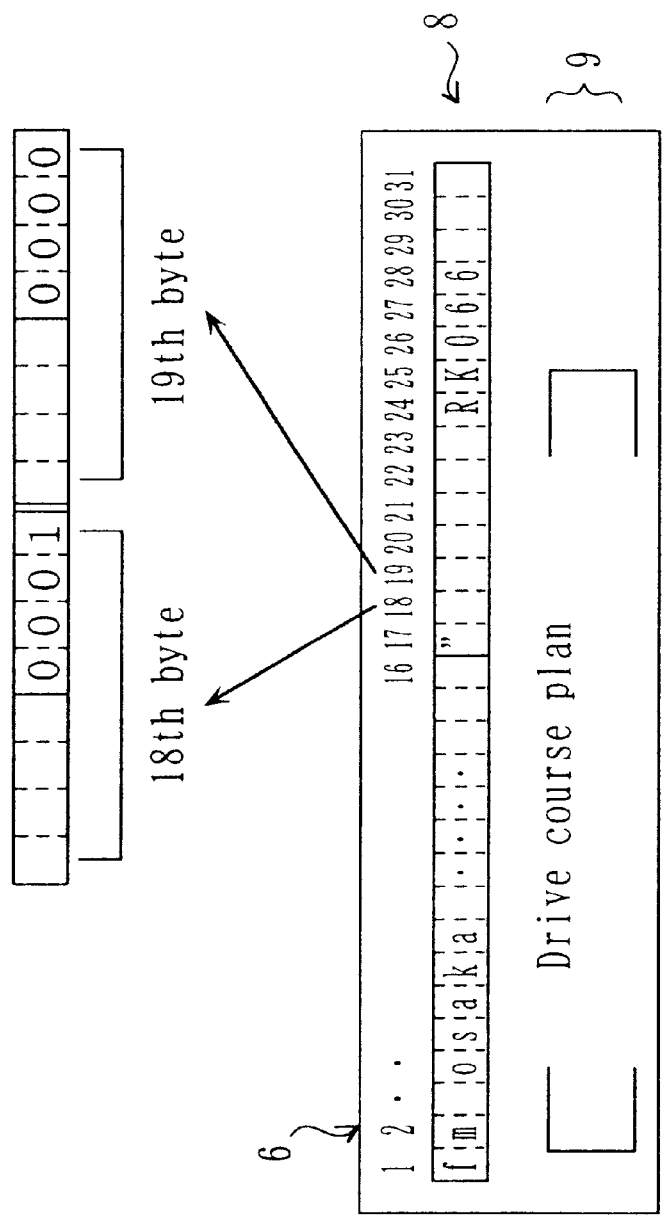
⟨Fig. 46⟩

⟨Fig. 47⟩
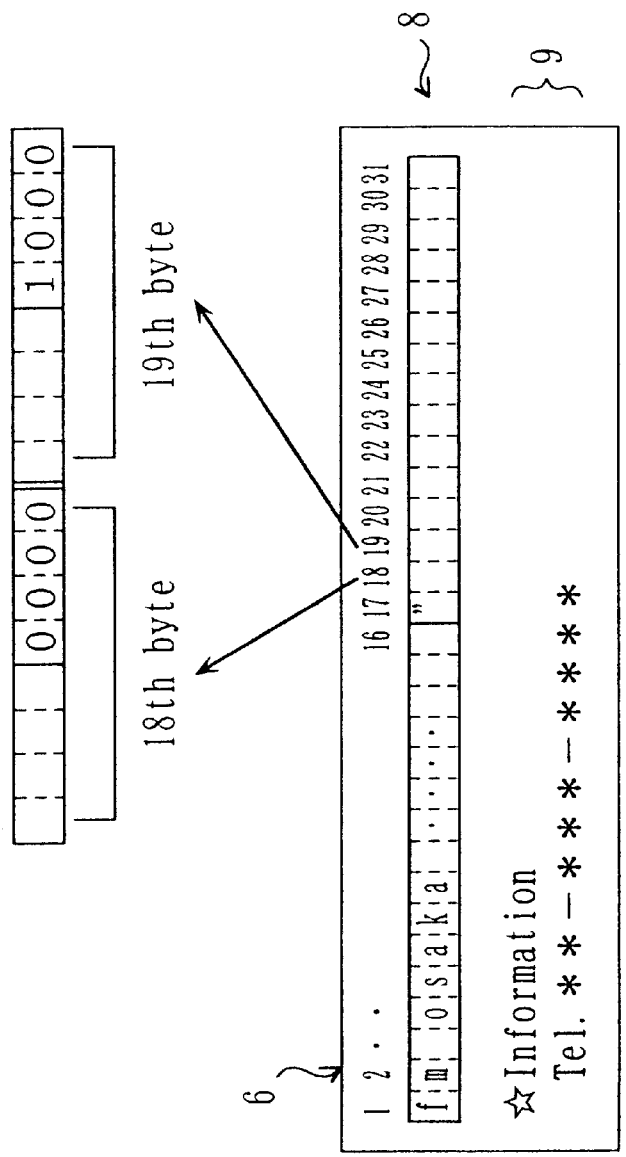

⟨Fig. 48⟩
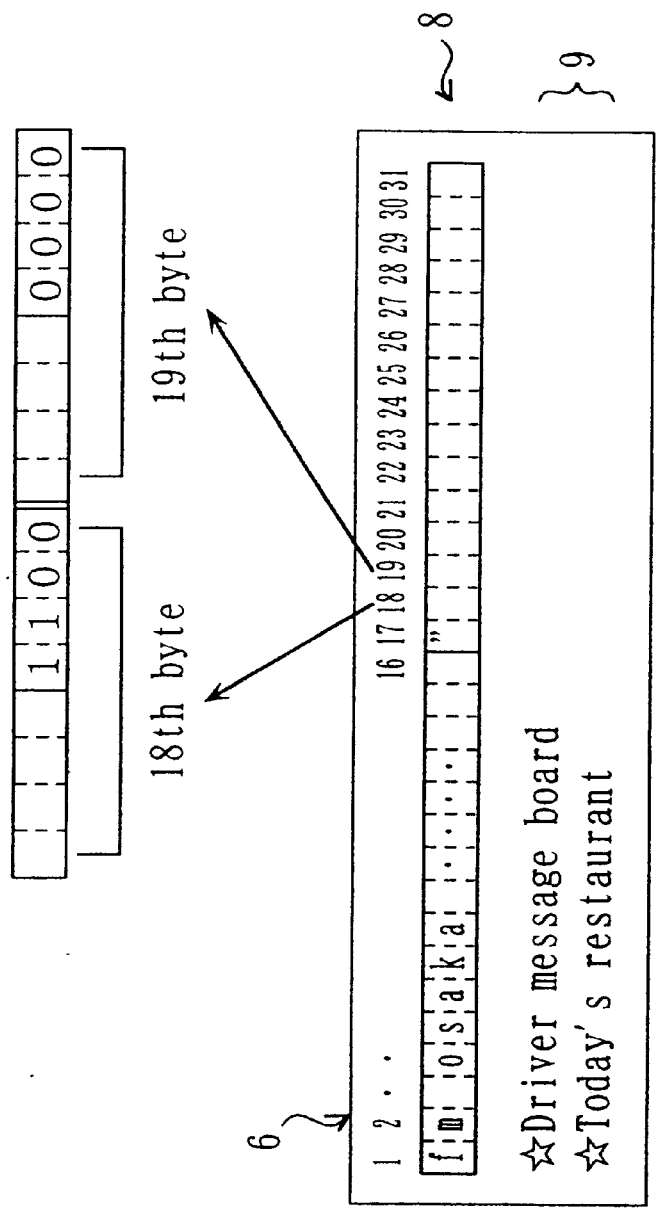

⟨Fig. 49⟩
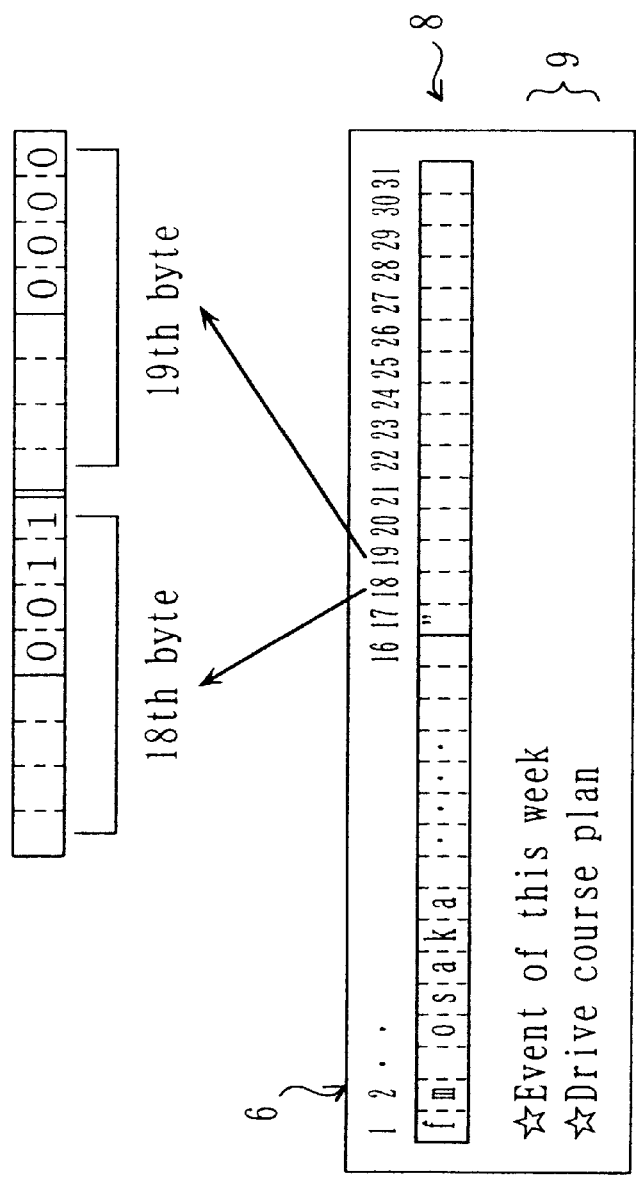

⟨Fig. 50⟩
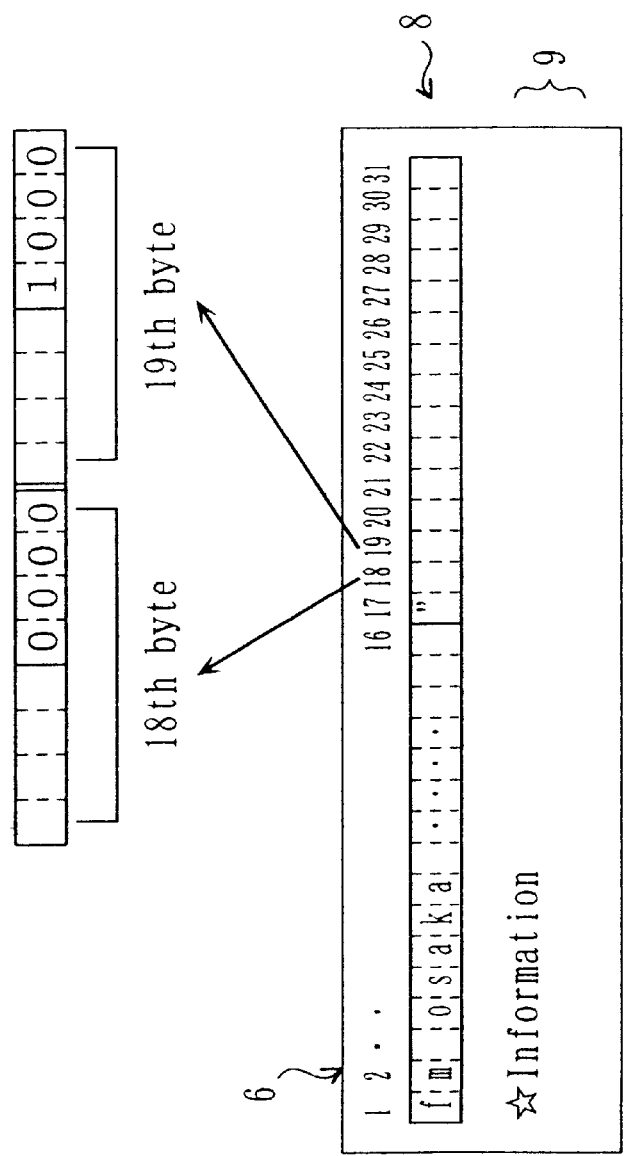

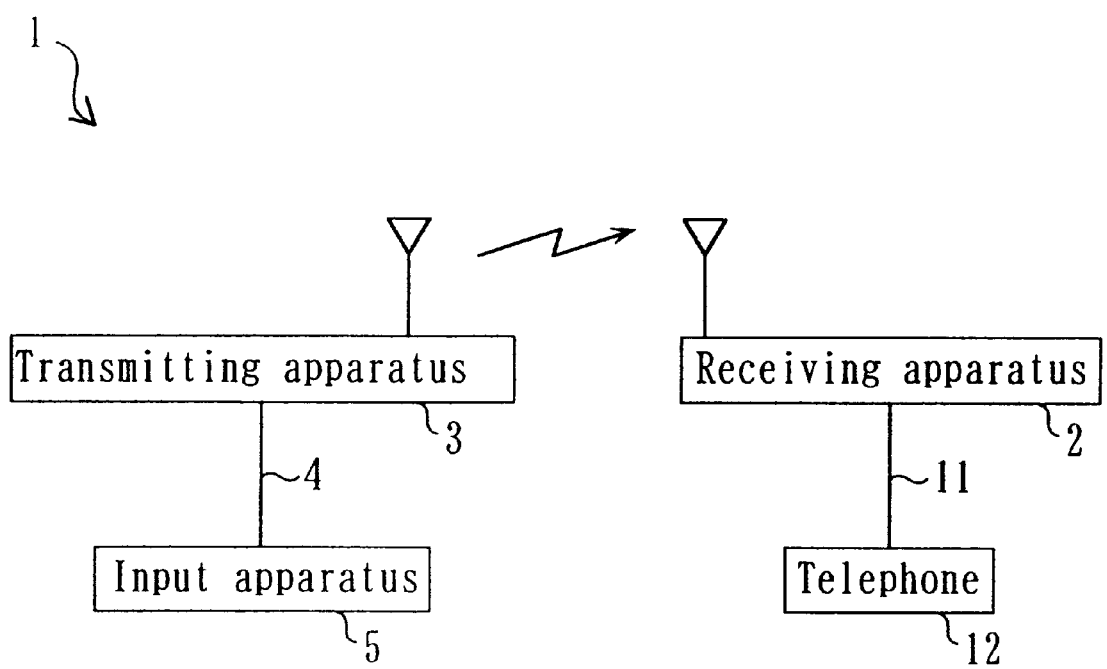
<Fig. 51>

<Fig. 52>
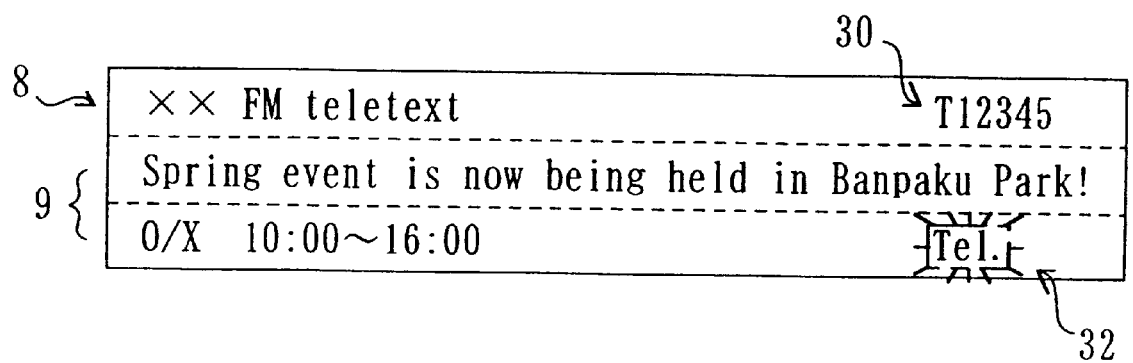

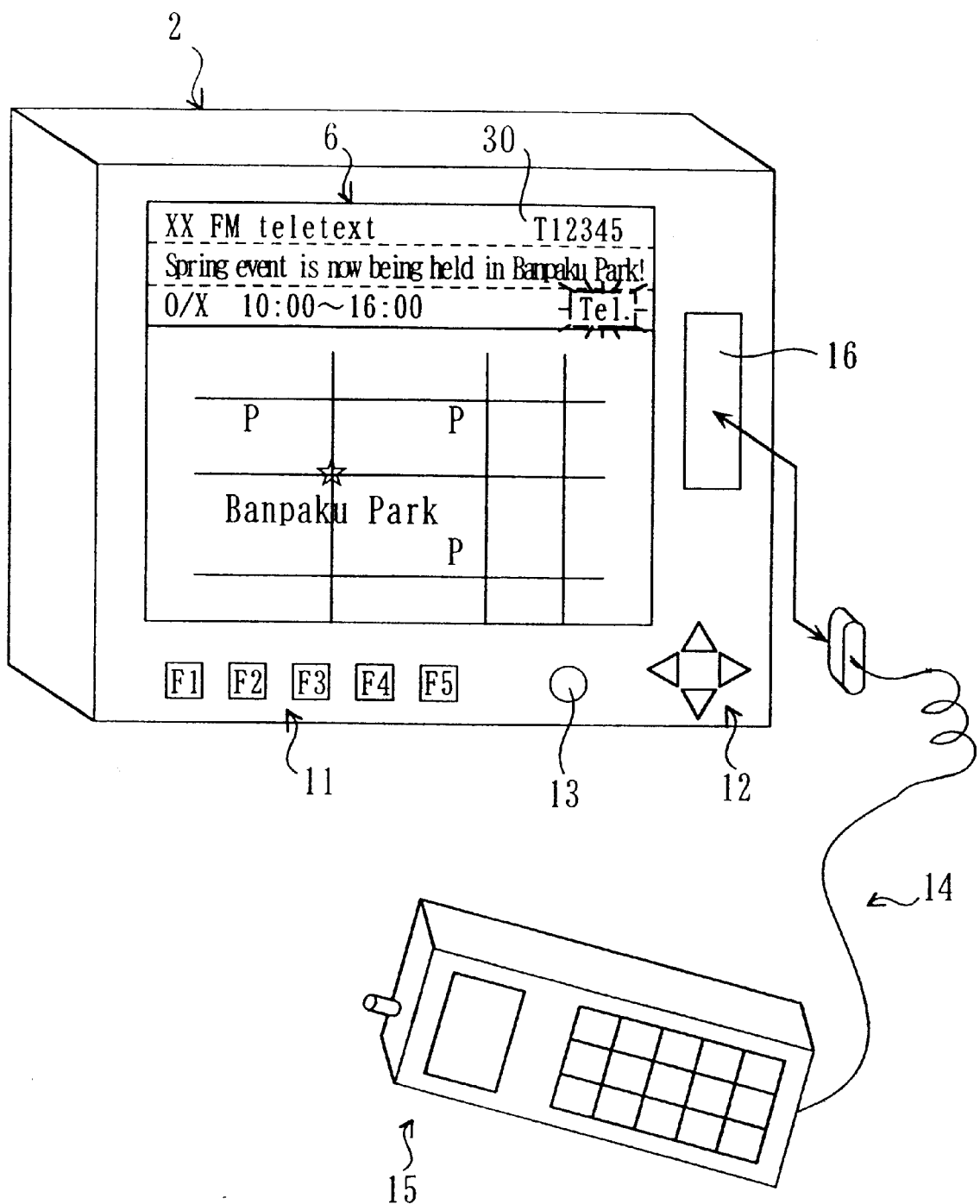
<Fig. 53>

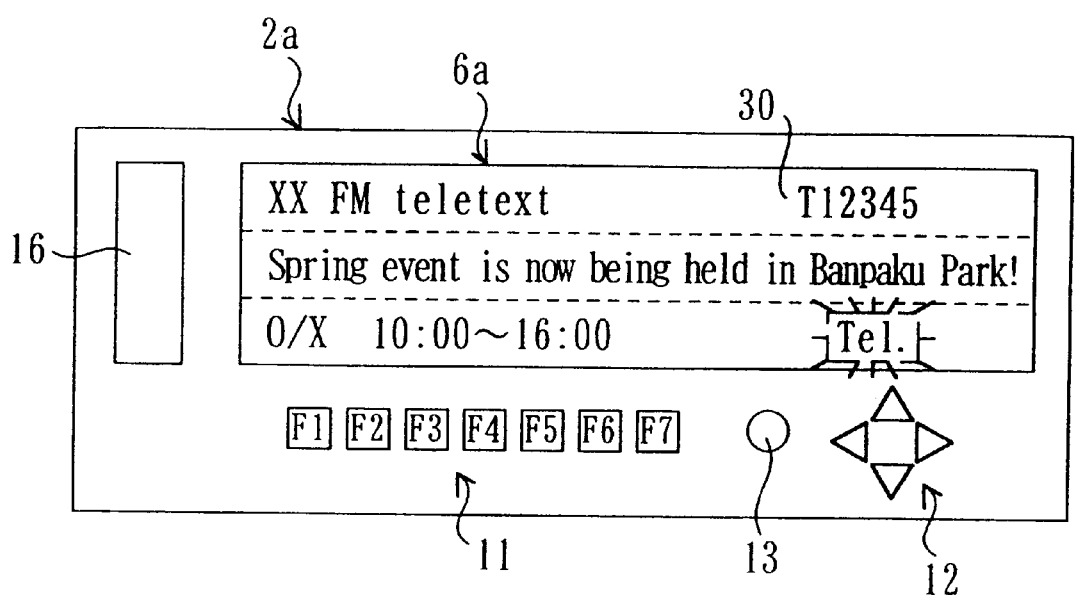
<Fig. 54>

<Fig. 55>
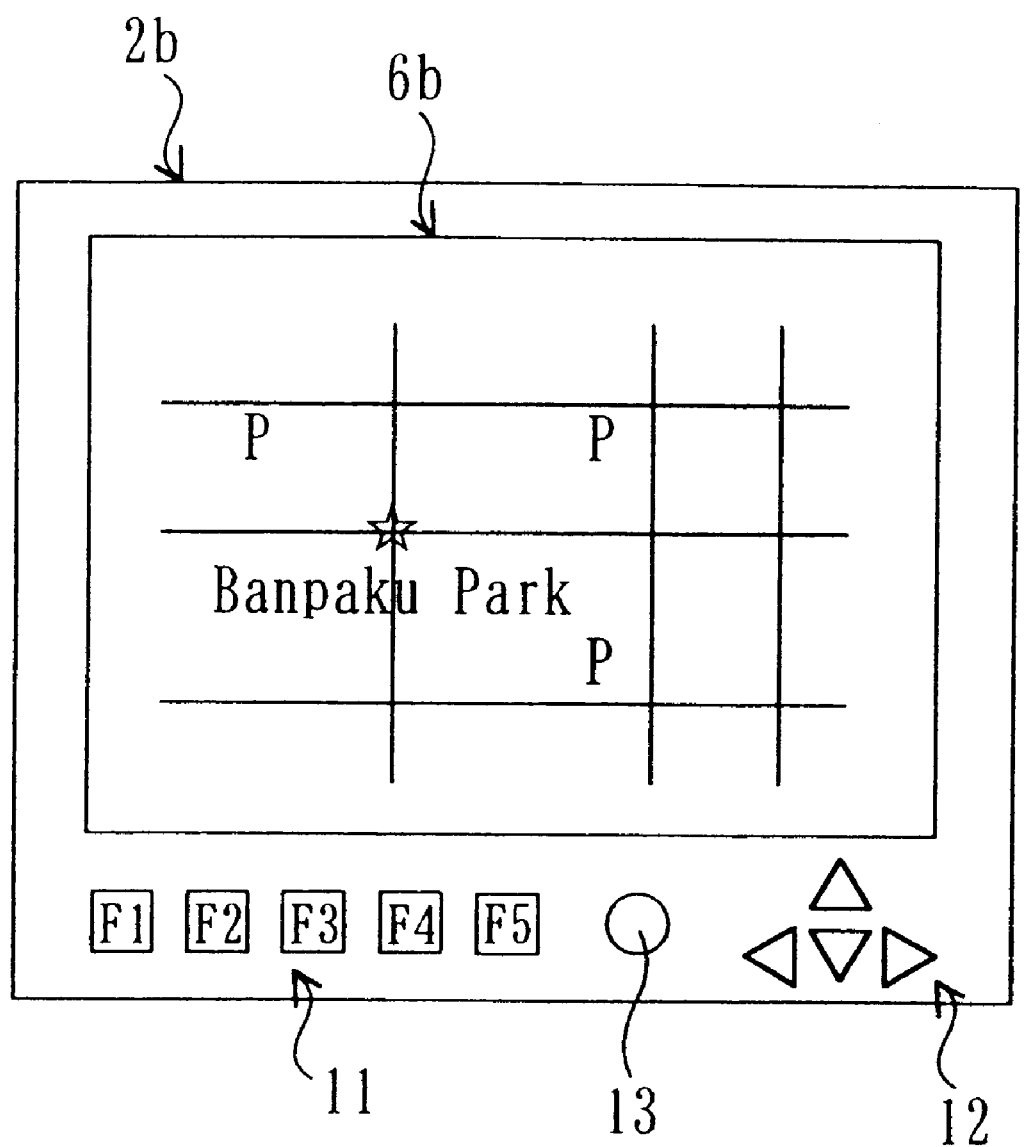

<Fig. 56>
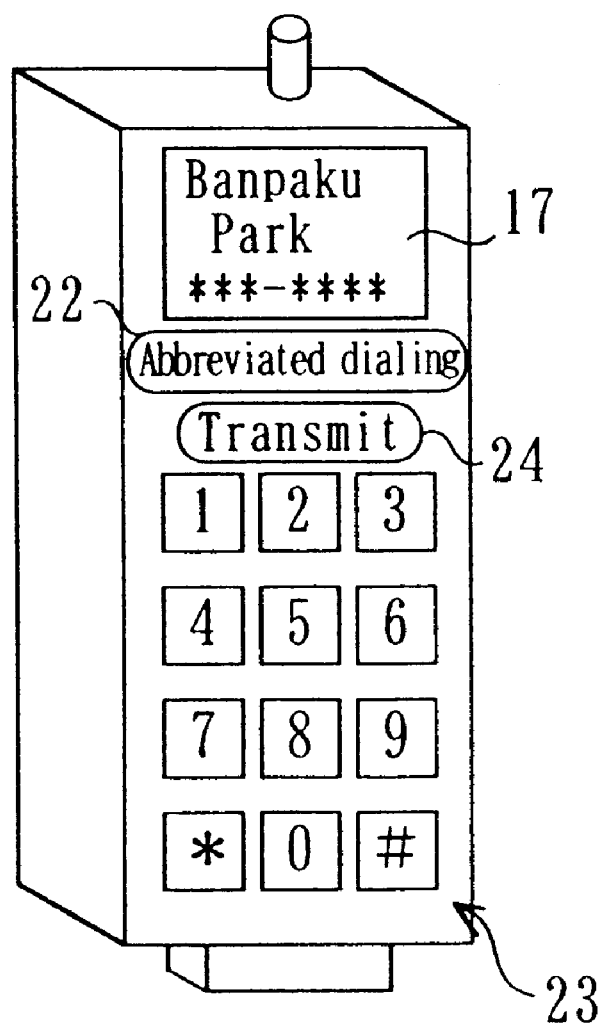

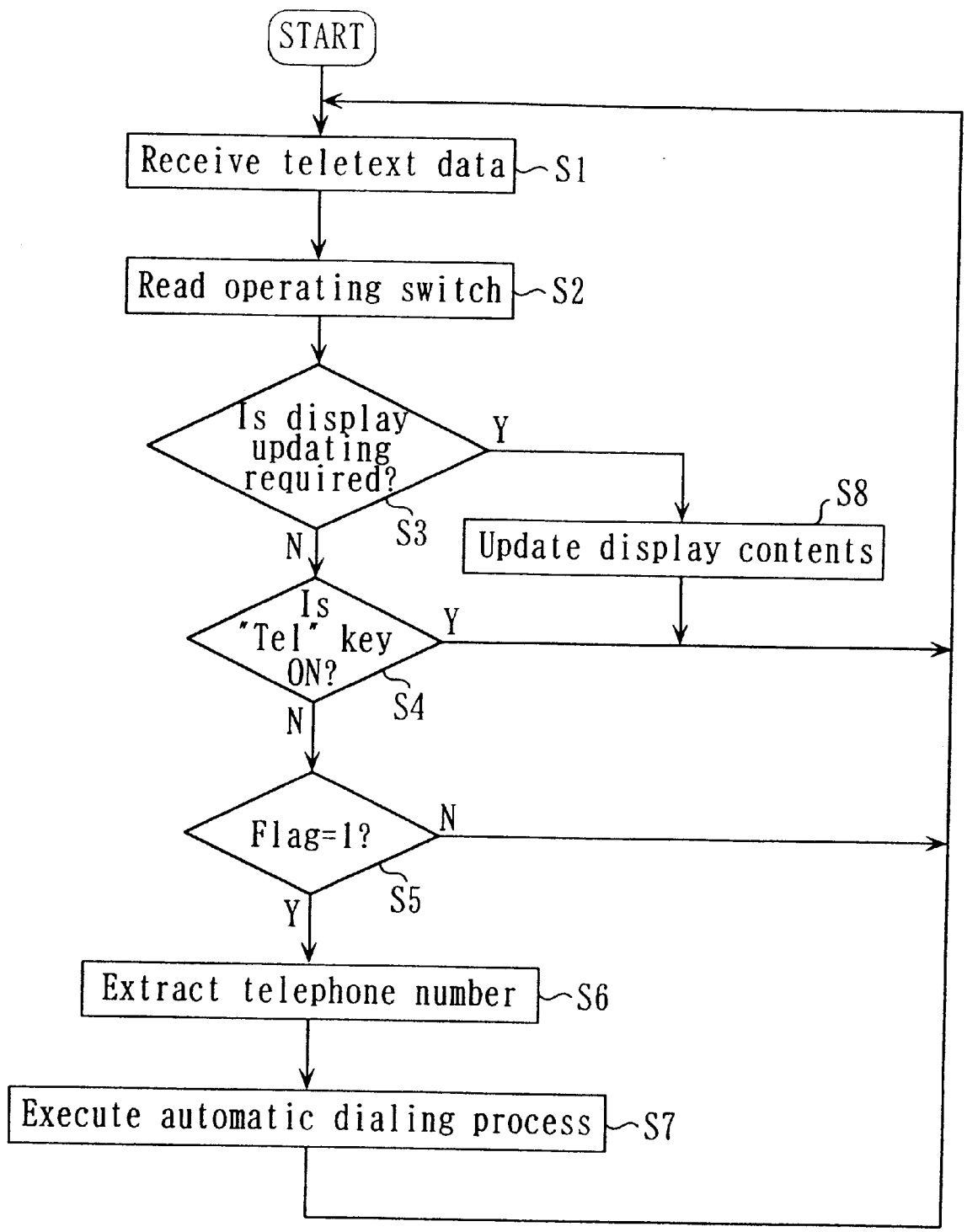
<Fig. 57>

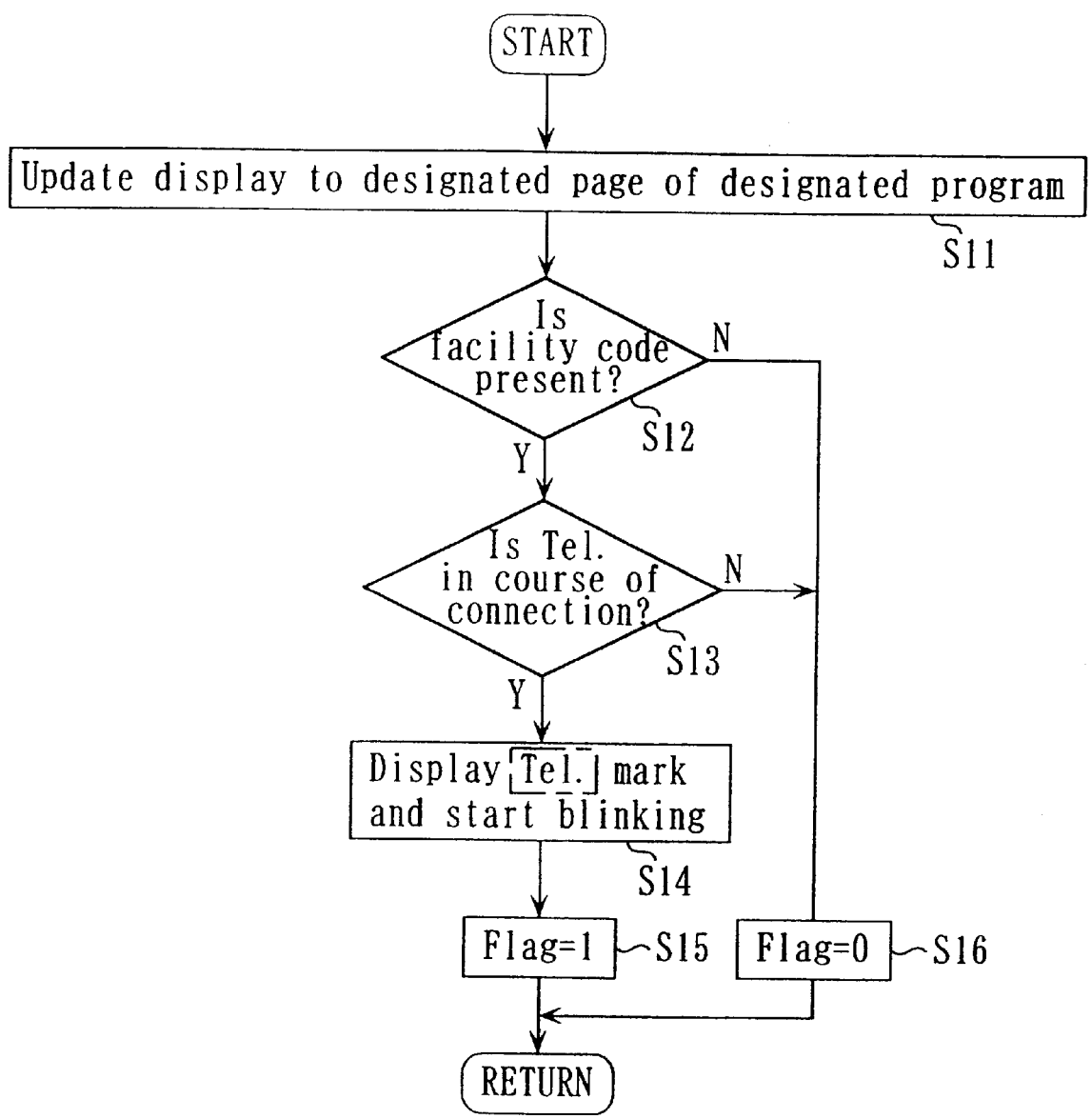
<Fig. 58>

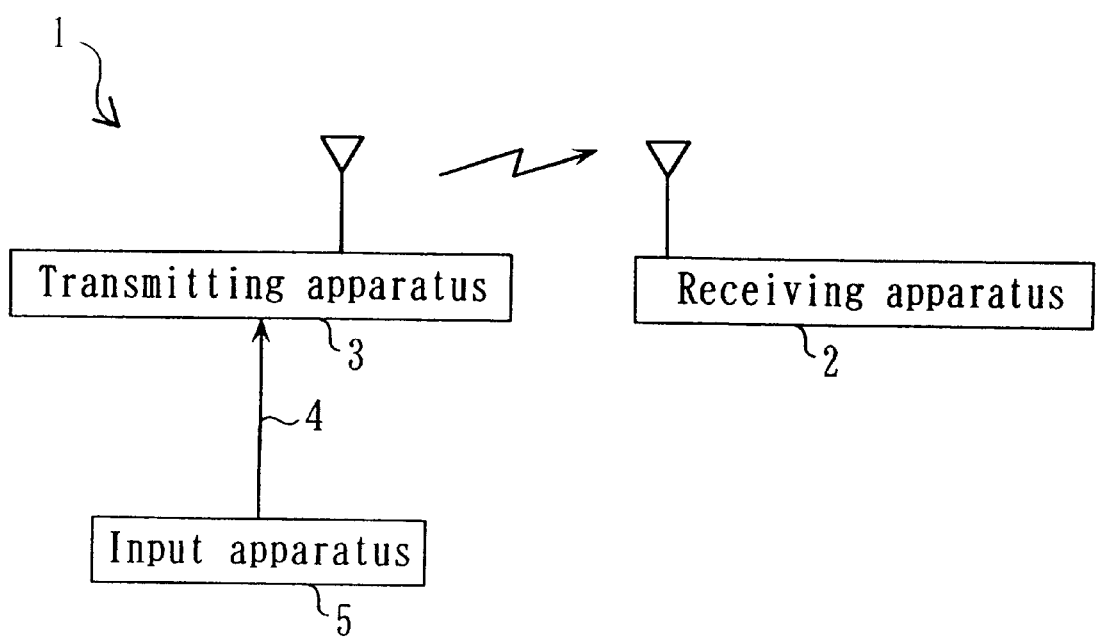
<Fig. 59>

<Fig. 60>
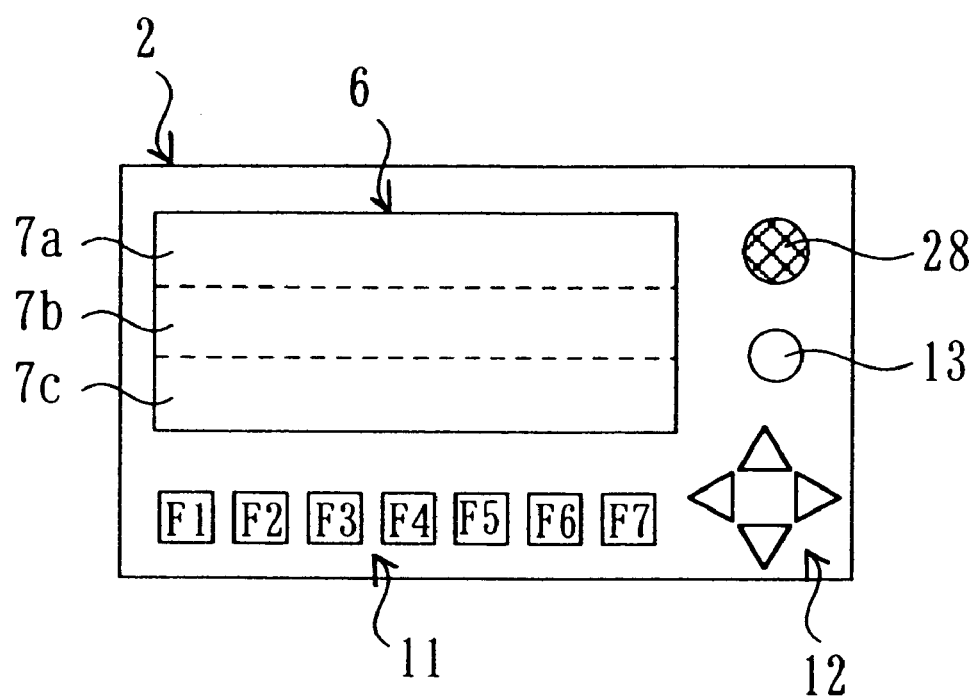

⟨Fig. 61⟩
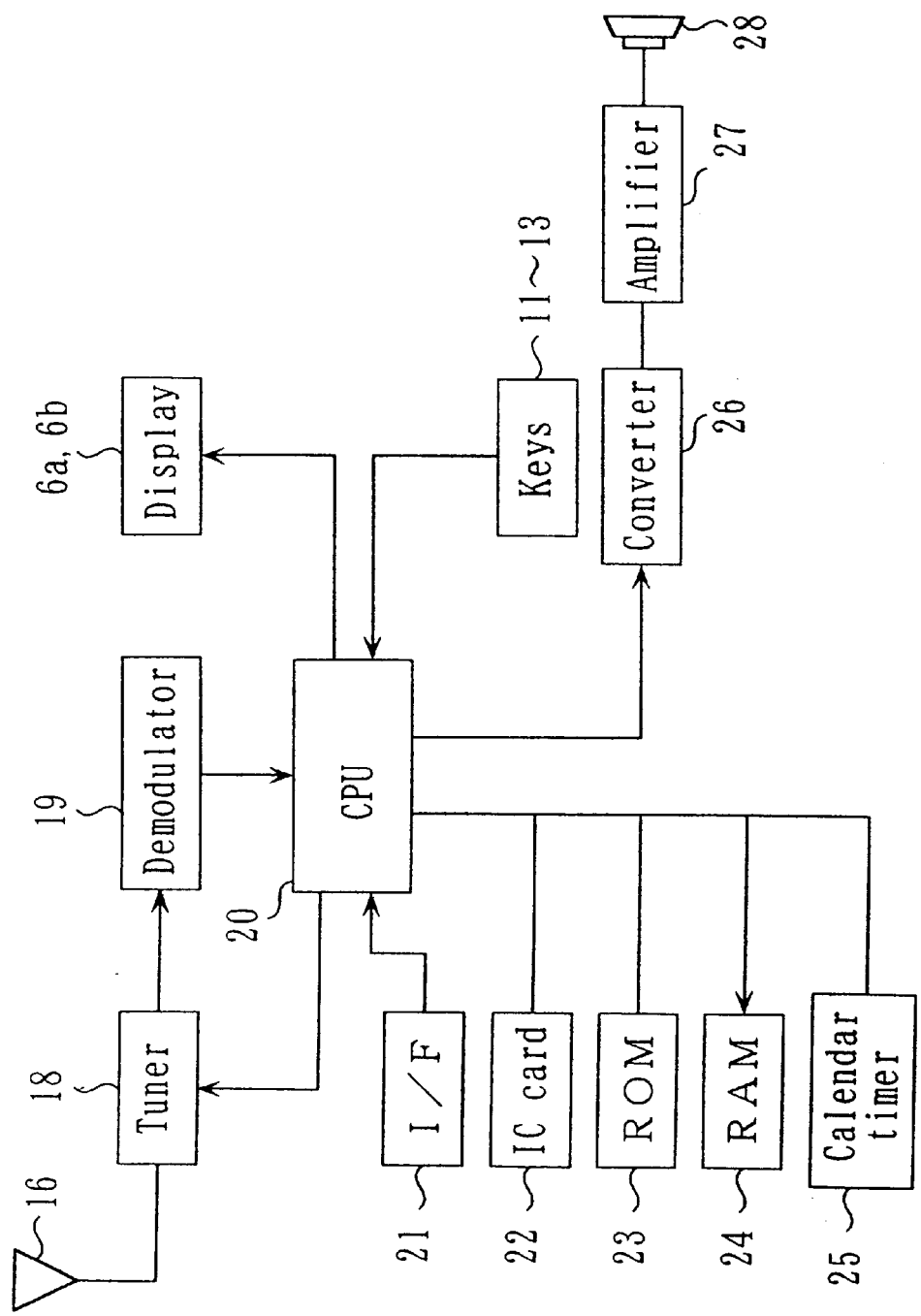

<Fig. 62>
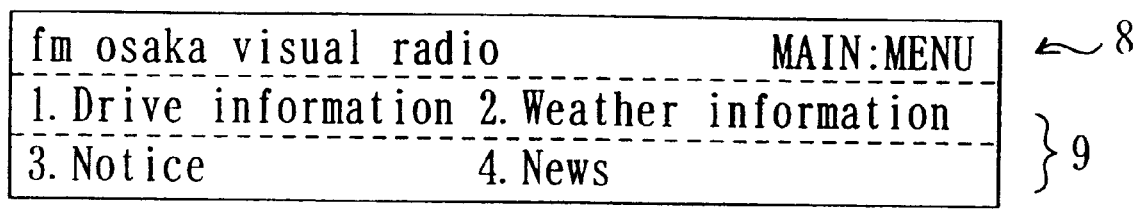

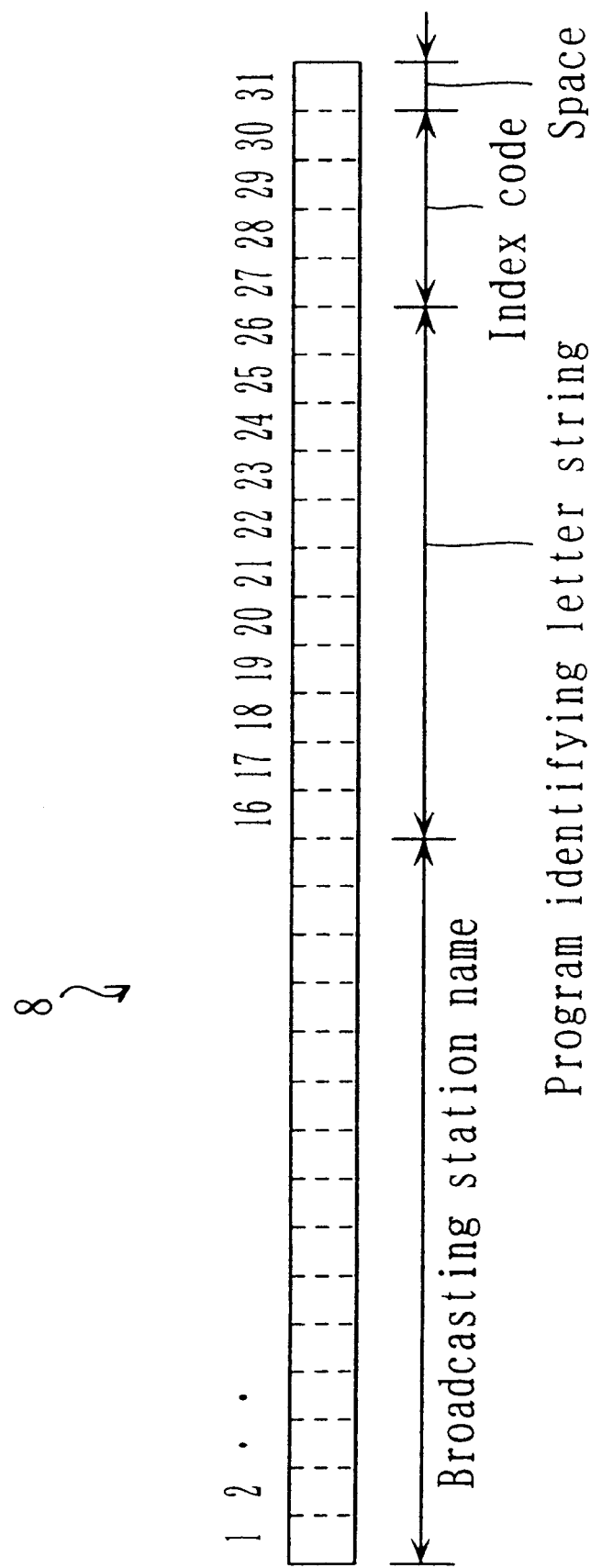

<Fig. 64>

|   | Letter string | Number of letters |
|---|---|---|
| 1 | DRIVE-INFO: | 11 |
| 2 | Drive-Info: | 11 |
| 3 | drive-info: | 11 |
| 4 | D-Info: | 7 |
| 5 | INFONAVI: | 9 |

⟨Fig. 65⟩

| Index code | Attribute |
|---|---|
| (sp) (sp) (sp) (sp) | Program title and notice from broadcasting station |
| MENU | Drive information sub-menu |
| ☐ | Selection item of English letter other than "M", or English letter attached to program name in sub-menu |
| ☐ | "-": Title page of sub-program |
| ☐ | Numeral: Additional numeral (1 to 9) of event, facility, etc. provided by sub-program |
| ☐ | Page symbol of provided information |
| ☐ | "*", "0": First page of provided information |
| ☐ | "s": Information automatic storing instruction |
| ☐ | (sp): Not stored automatically |

⟨Fig. 66⟩
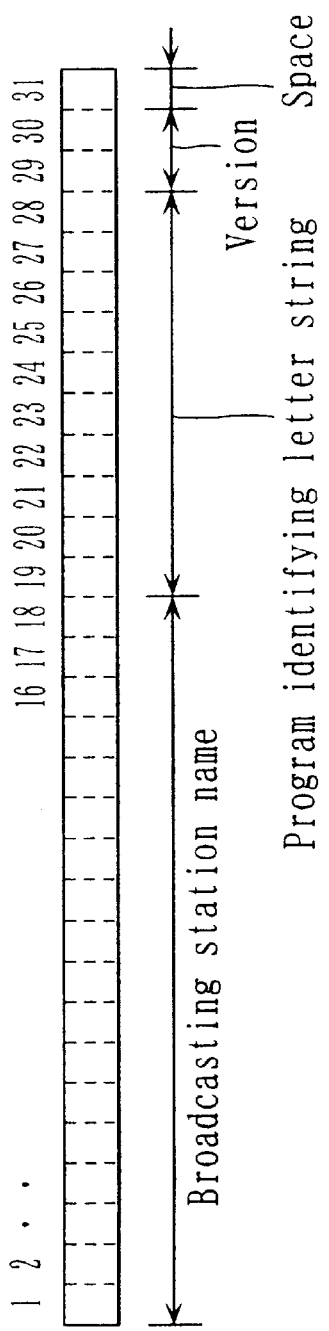

<Fig. 67>

|   | Letter string | Number of letters |
|---|---|---|
| 1 | NAVICODE | 8 |
| 2 | NaviCode | 8 |
| 3 | navicode | 8 |

<Fig. 68>

```
| fm osaka visual radio    D-INFO: |
| Drive information                |
| ON AIR!!                         |
```

<Fig. 69>

```
| fm osaka visual radio                           D-INFO:MENU |
| F:Special program of this week R:Recommended restaurant     |
| E:Event guide D:Message board                               |
```

<Fig. 70>

```
| fm osaka visual radio                            D-INFO:F- 0 |
| Special program of this week                                 |
| Guidance of fireworks display on 7/10 through 7/15           |
```

<Fig. 71>

```
| fm osaka visual radio                            D-INFO:F1 * |
| ◆ Yodo River fireworks display at 19:00 on 7/15              |
| Right bank of Yodo River at Juso                             |
```

<Fig. 72>

| fm osaka visual radio | D-INFO:F1 1 |
|---|---|
| P: Yodo River flood plain | 1200 cars |
| Private parking near the parking | 800 cars |

<Fig. 73>

| fm osaka visual radio | D-INFO:F1 0 |
|---|---|
| Traffic control at and near Juso Station from 17:00 | |
| due to Yodo River fireworks display | |

<Fig. 74>

| fm osaka visual radio | D-INFO:F2 * |
|---|---|
| ◆Fireworks display at Kobe Portpia Land | |
| from 19:00 on 7/12 | |

<Fig. 75>

| fm osaka visual radio D-INFO:F2 2 |
|---|
| · |
| · |

<Fig. 76>

| fm osaka visual radio   D-INFO:R- 0 |
| Drive-in OK! tasteful restaurant |
| entered in Info-navi map |

<Fig. 77>

| fm osaka visual radio   D-INFO:R1 * |
| French cuisine: Furansu Chubo |
| Minami-ku, Osaka-shi |

<Fig. 78>

| fm osaka visual radio   D-INFO:R1 1 |
| French home cooking restaurant |
| Chef is friendly, Satisfactory low cost! |

<Fig. 79>

| fm osaka visual radio   D-INFO:R2 * |
| . |
| . |

<Fig. 80>

| fm osaka visual radio | NaviCode00 |
|---|---|
| F1:06-*- | F2:0736-*-**** |
| F3:0727--** | F4:**** |

<Fig. 81>

| fm osaka visual radio | NaviCode00 |
|---|---|
| · | |
| · | |

<Fig. 82>
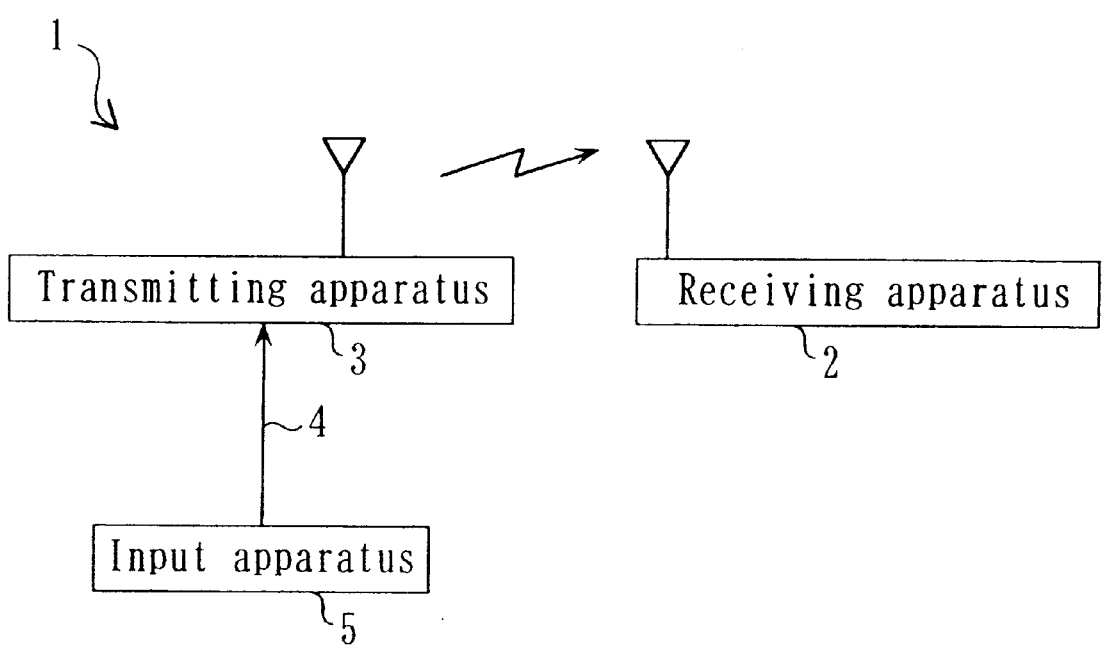

<Fig. 83>
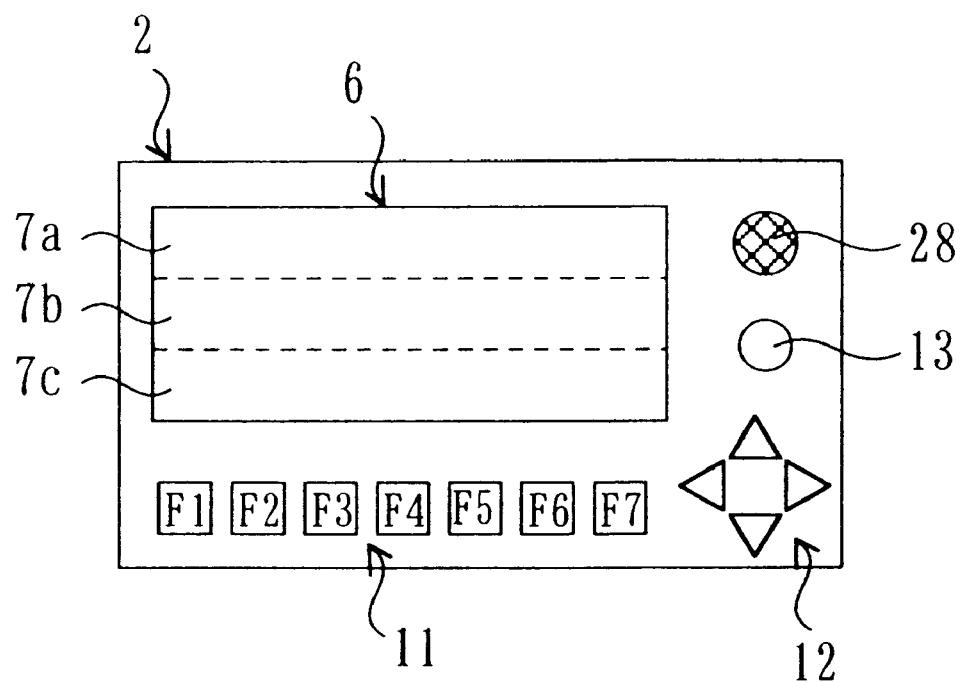

⟨Fig. 84⟩
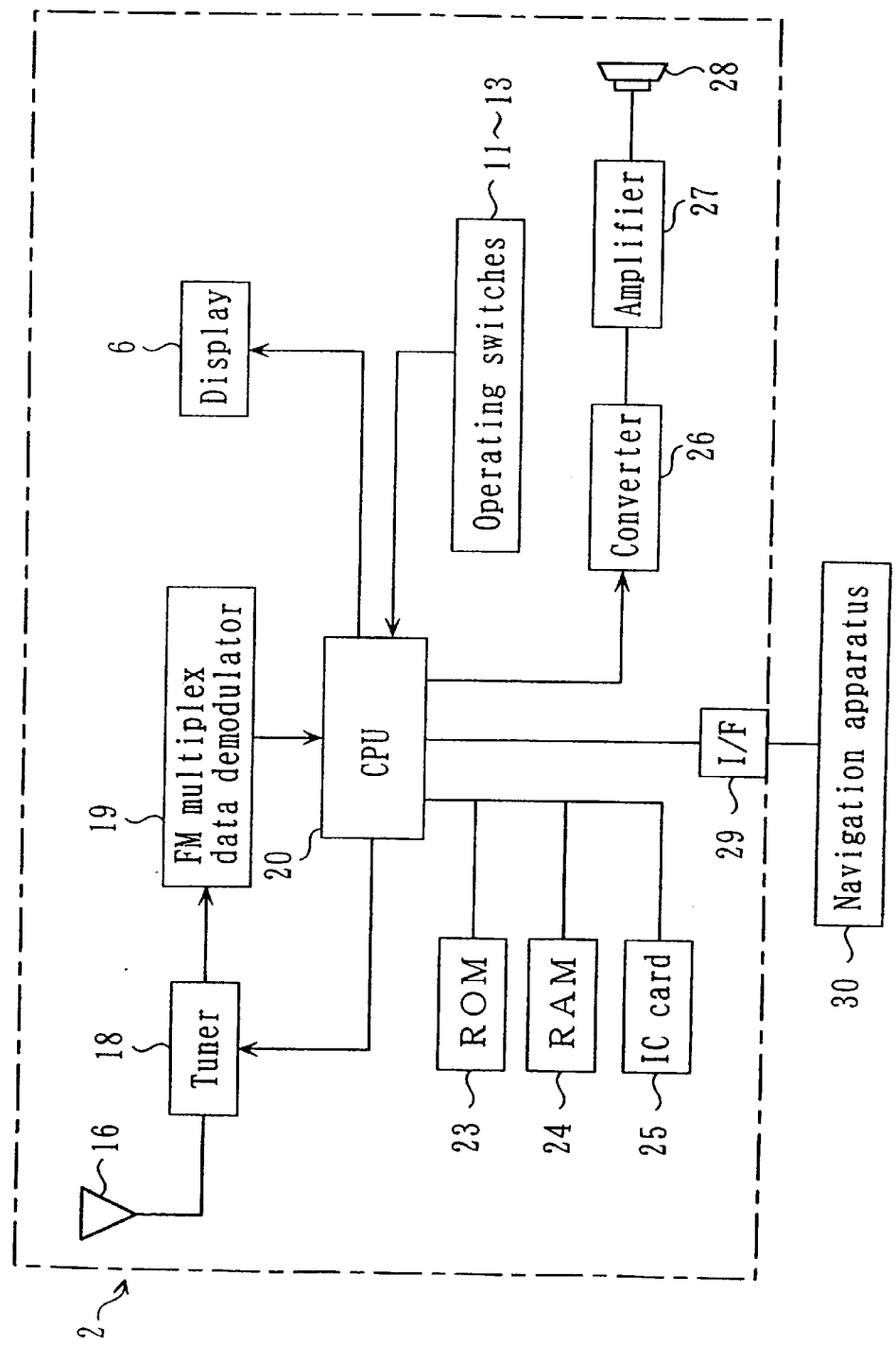

<Fig. 85>

| fm osaka visual radio　　weather forecast | ← 8 |
| Osaka (today) | |
| Cloudy after sunny | } 9 |

<Fig. 86>
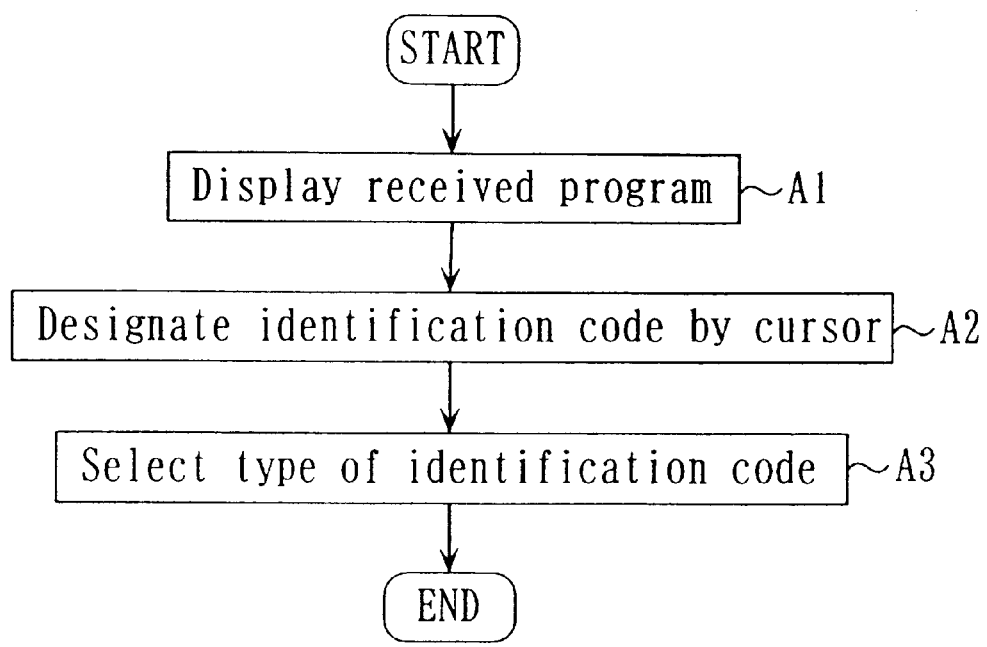

⟨Fig. 87⟩
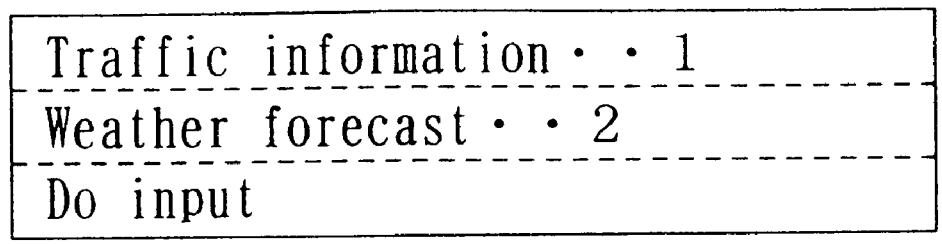

<Fig. 88>
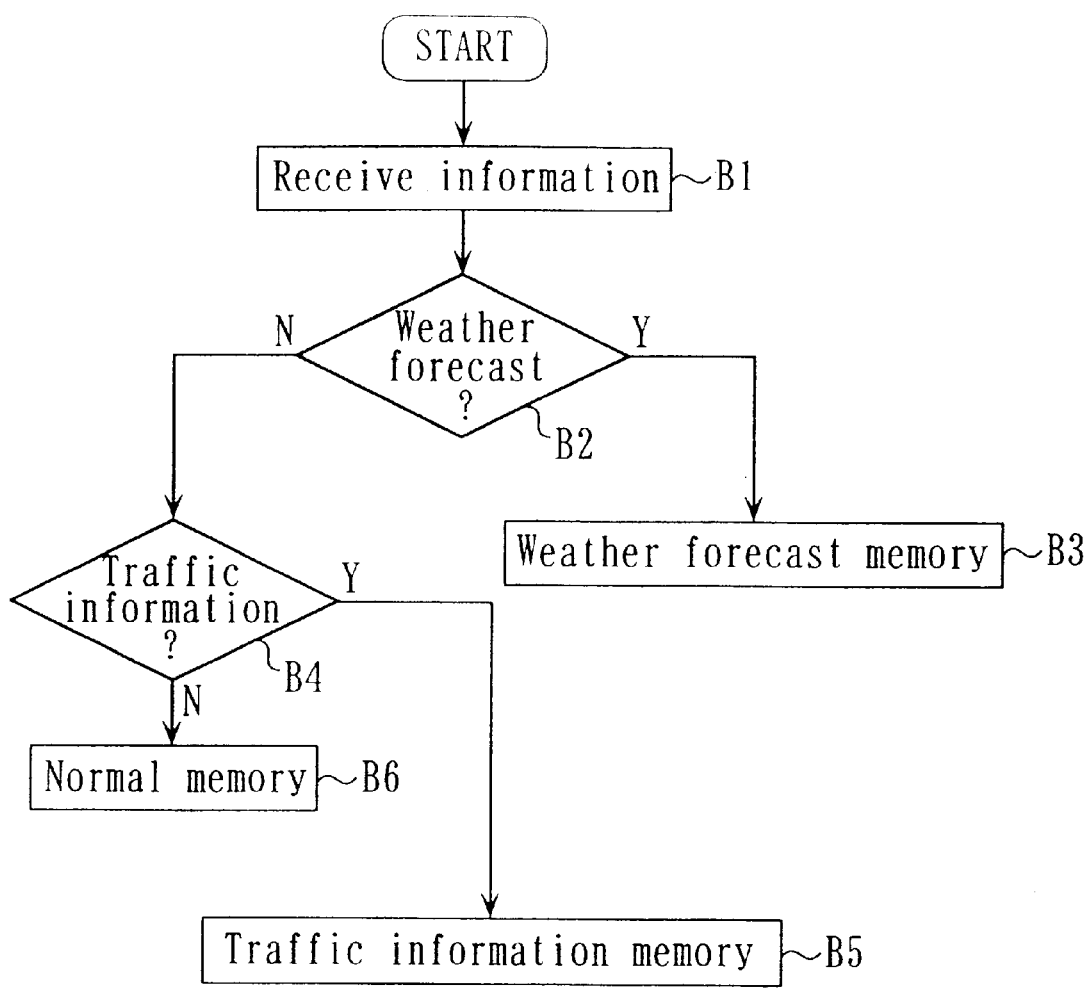

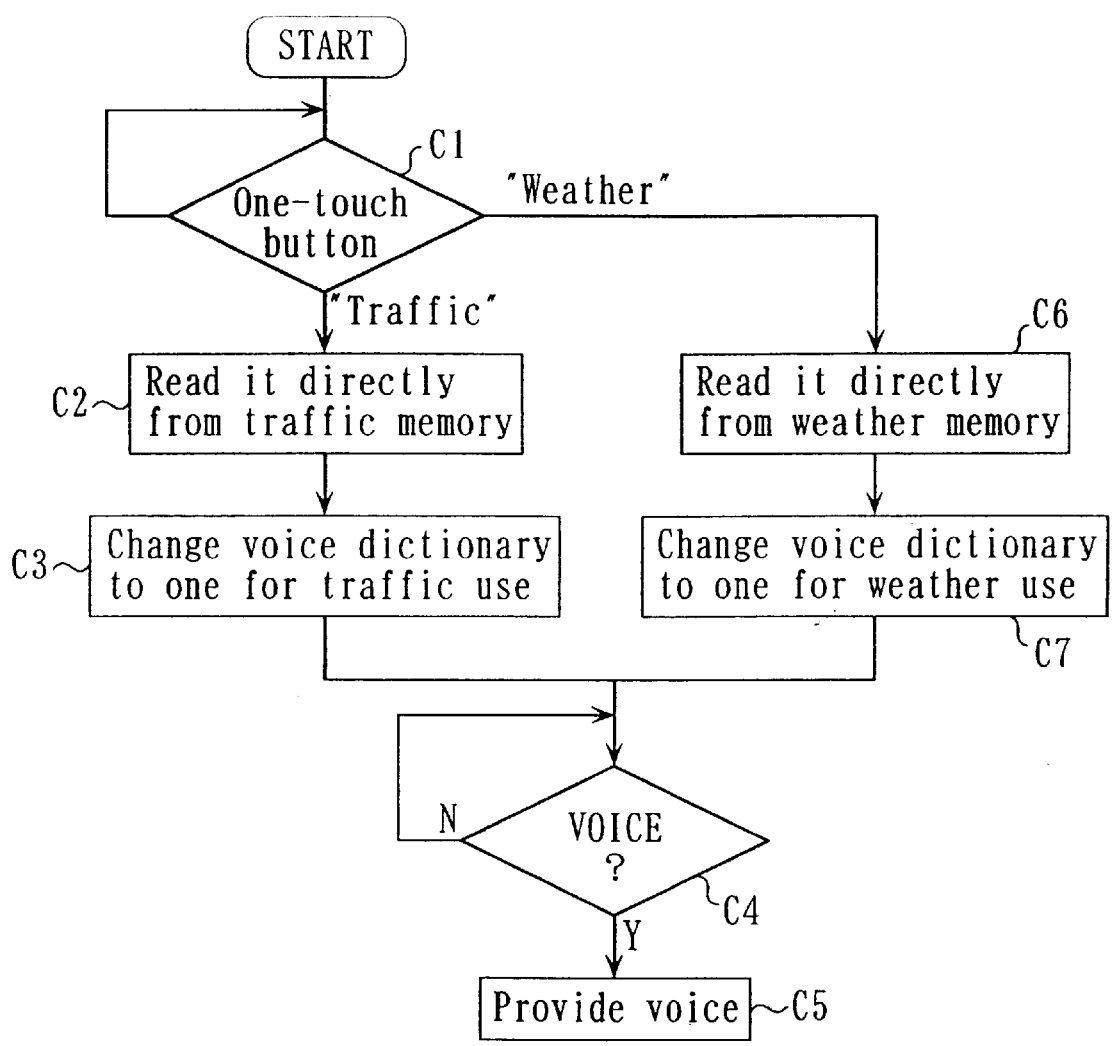
<Fig. 89>

<Fig. 90>

| Identification code | Type code |
|---|---|
| Weather information | 2・・Weather forecast |
| Weather forecast | 2・・Weather forecast |
| Weather | 2・・Weather forecast |
| Traffic information | 1・・Traffic information |
| TRAFFIC | 1・・Traffic information |

⟨Fig. 91⟩

| fm osaka visual radio | D-INFO:SC |
|---|---|
| 1 TRAFFIC NEWS | |
| 2 Weather forecast | |

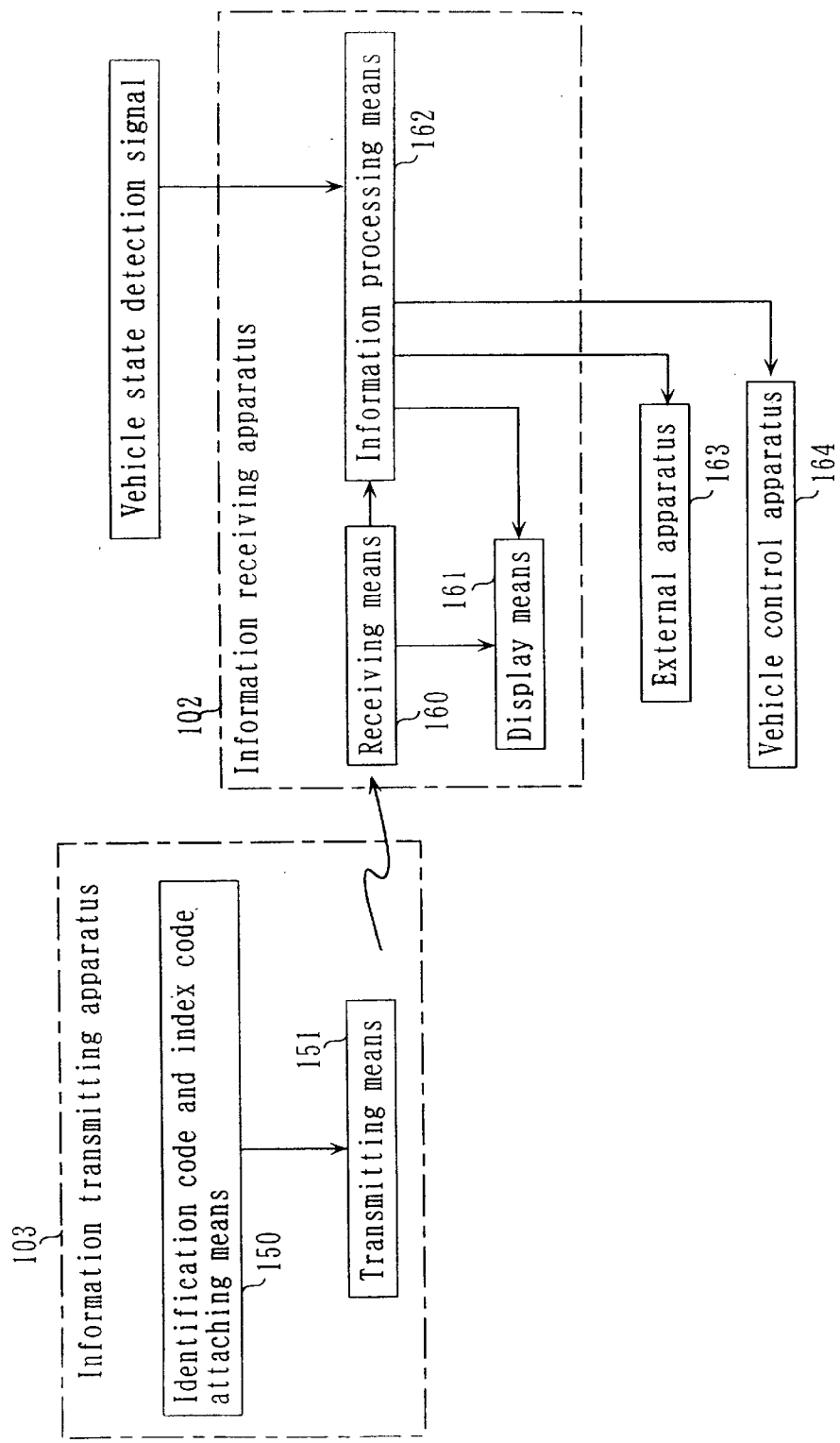
⟨Fig. 92⟩

⟨Fig. 93⟩
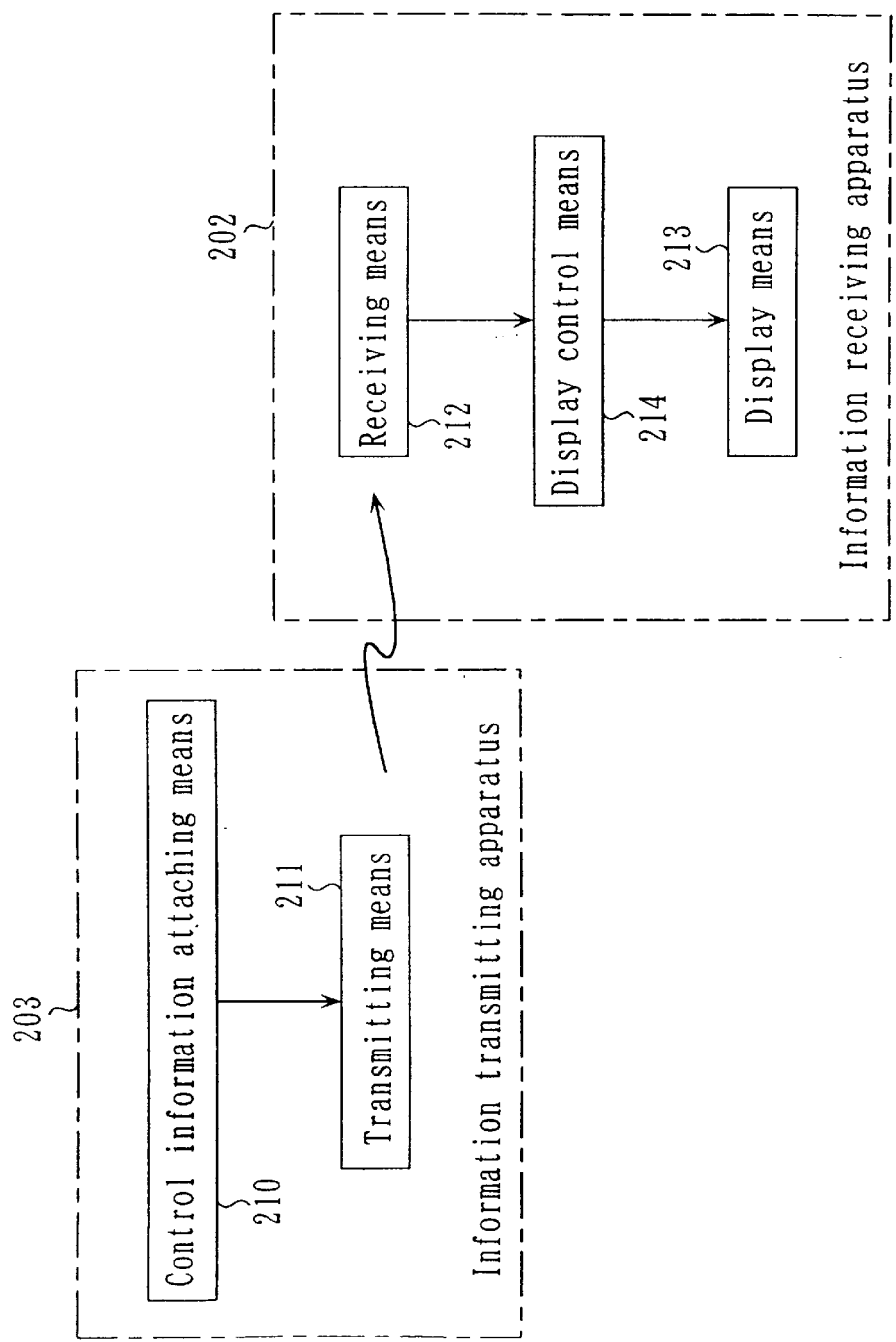

⟨Fig. 94⟩
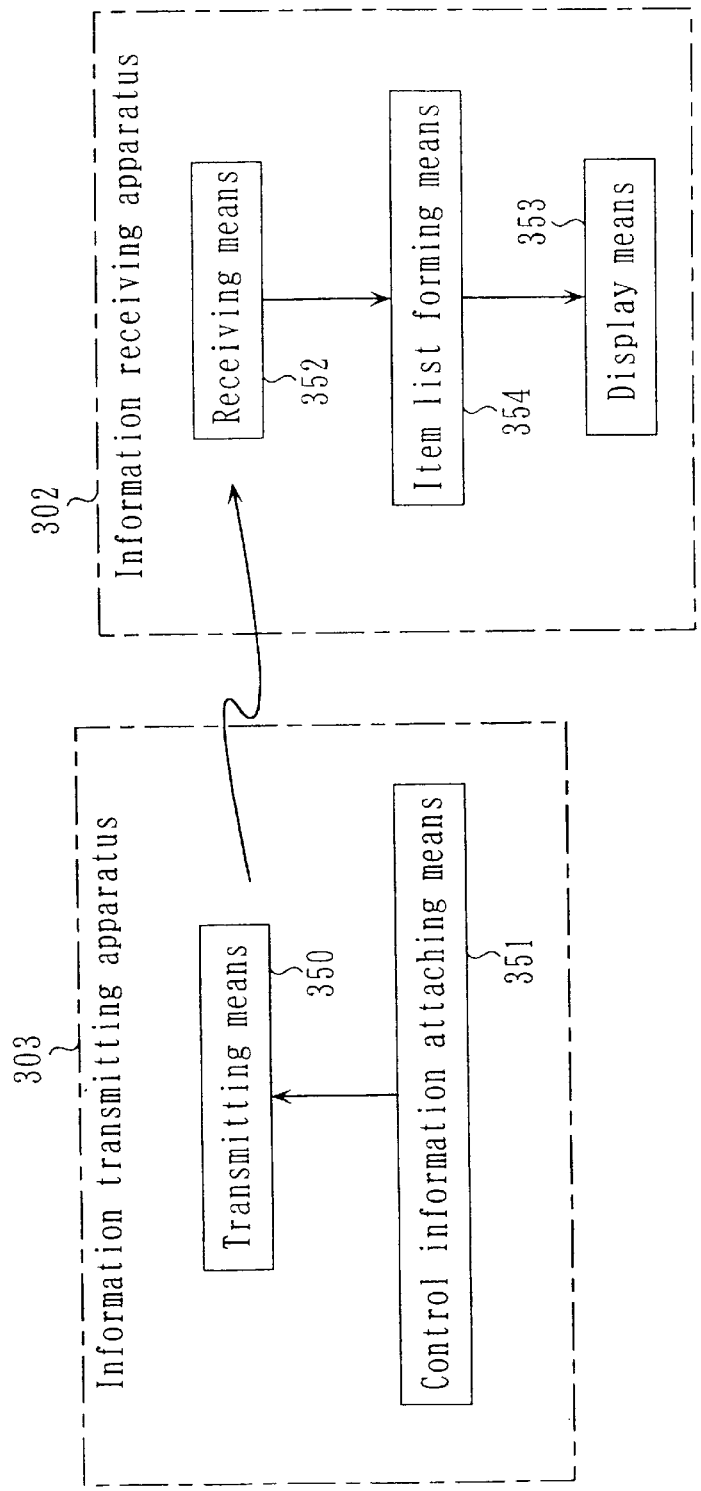

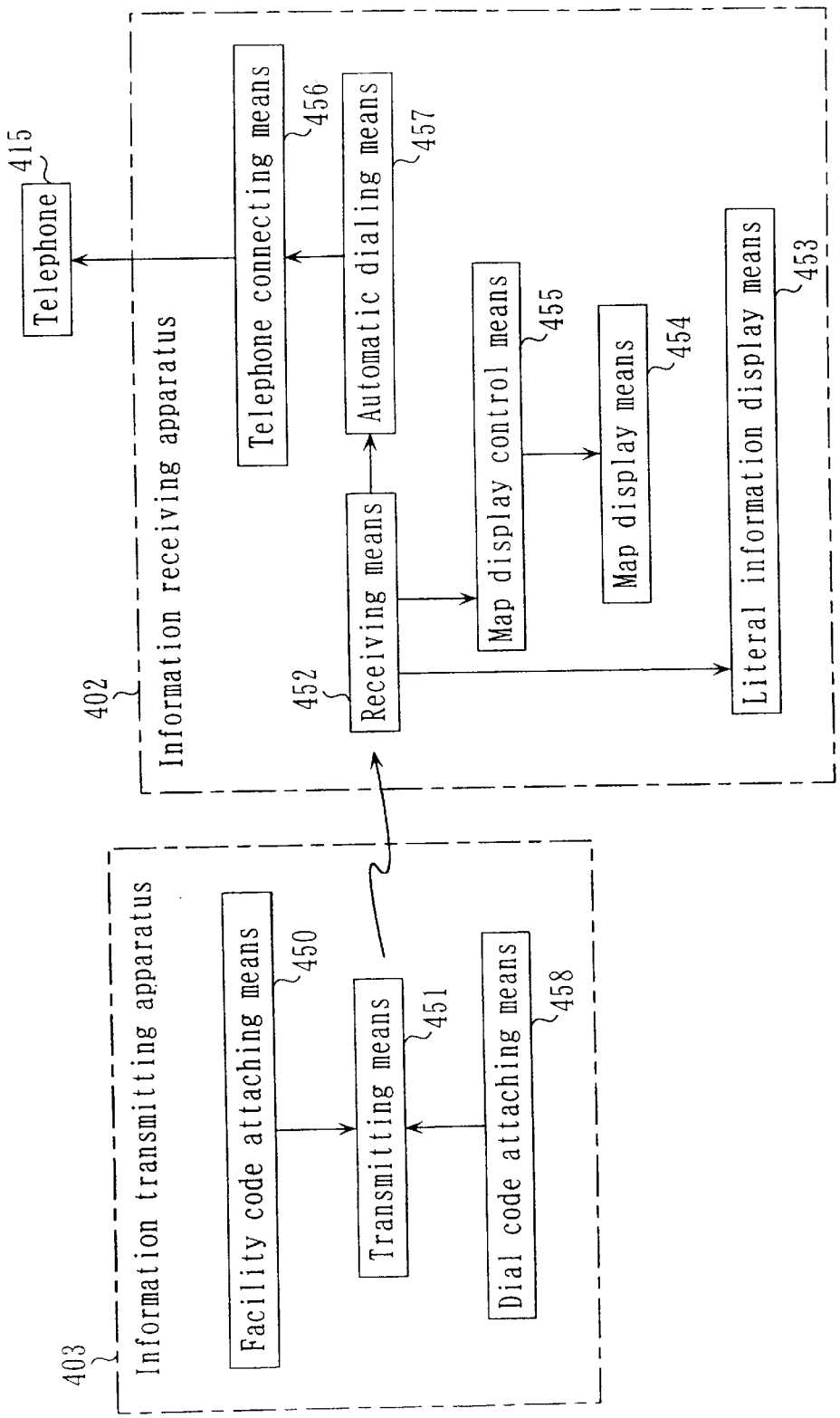
⟨Fig. 95⟩

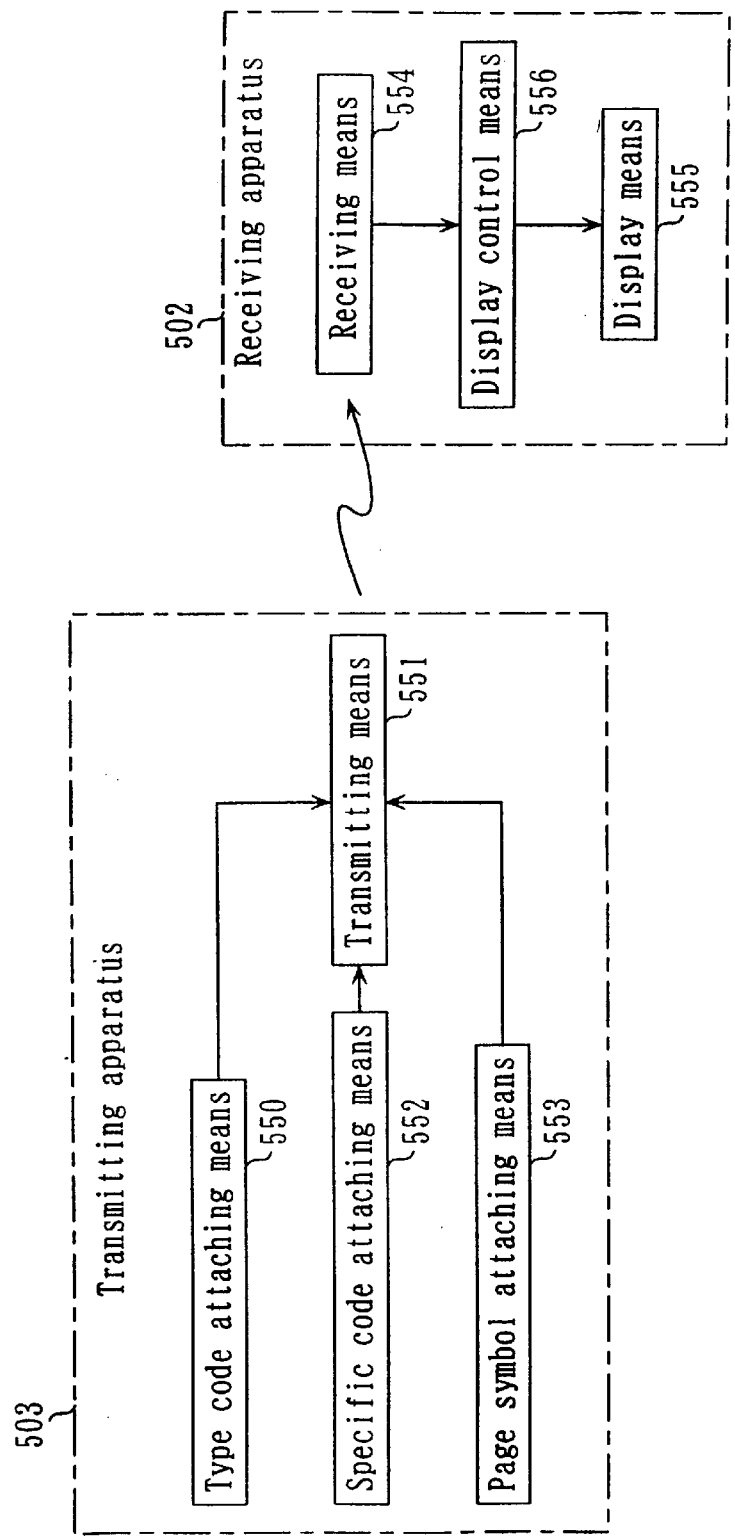
<Fig. 96>

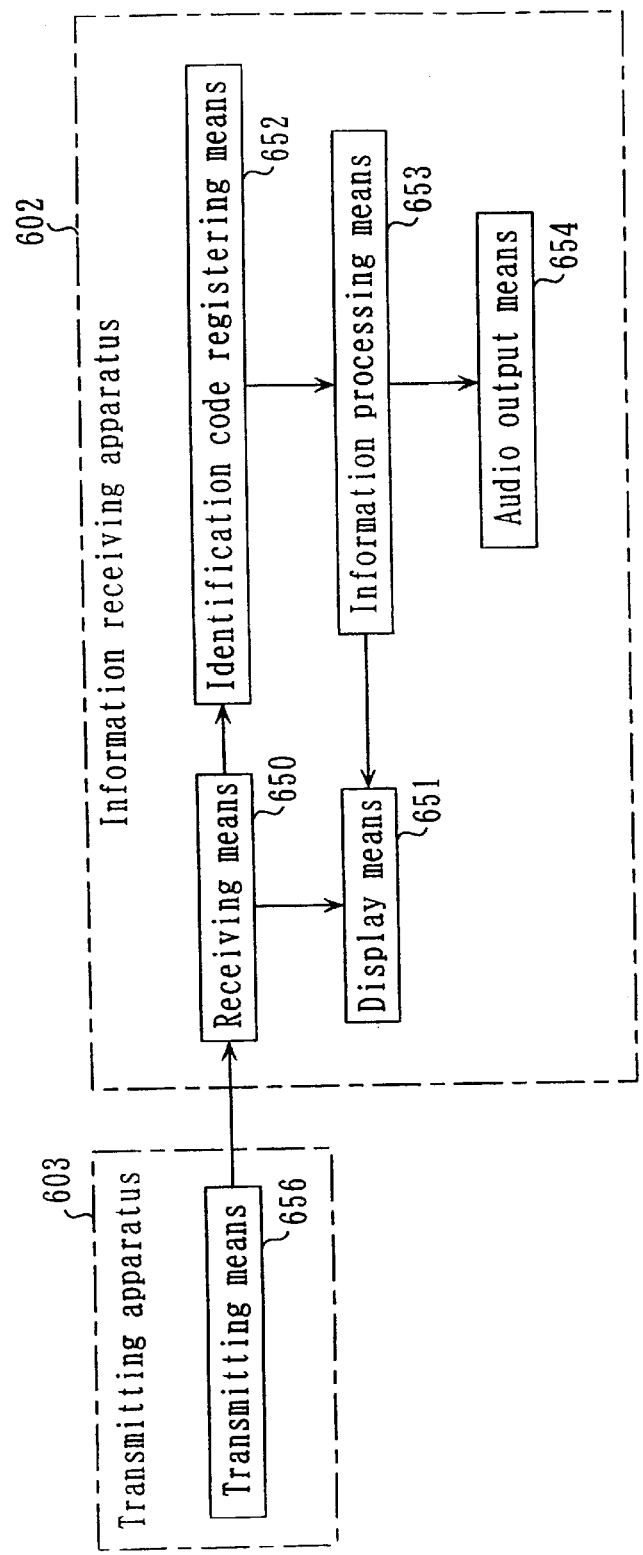
⟨Fig. 97⟩

<Fig. 98>
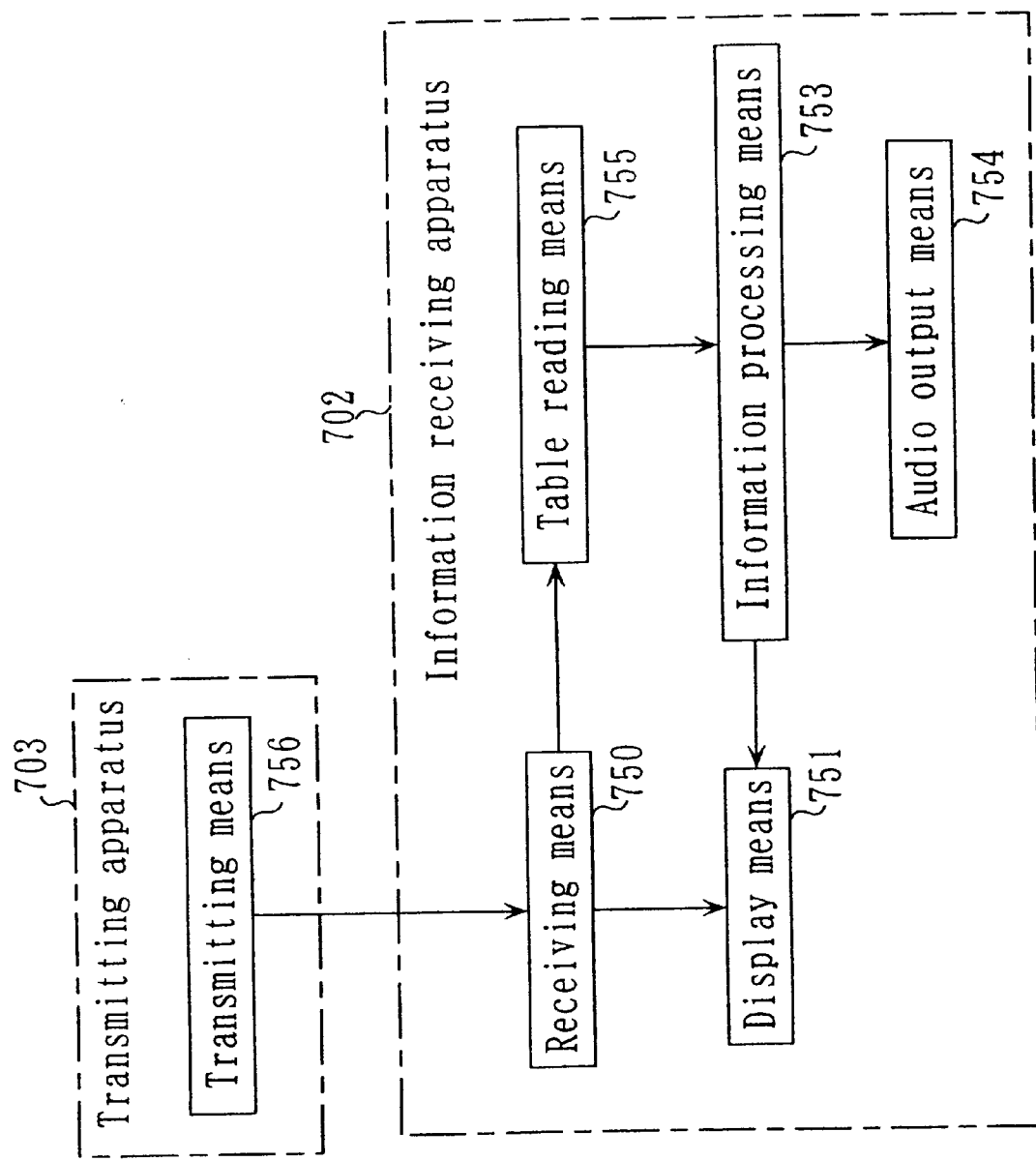

⟨Fig. 99⟩
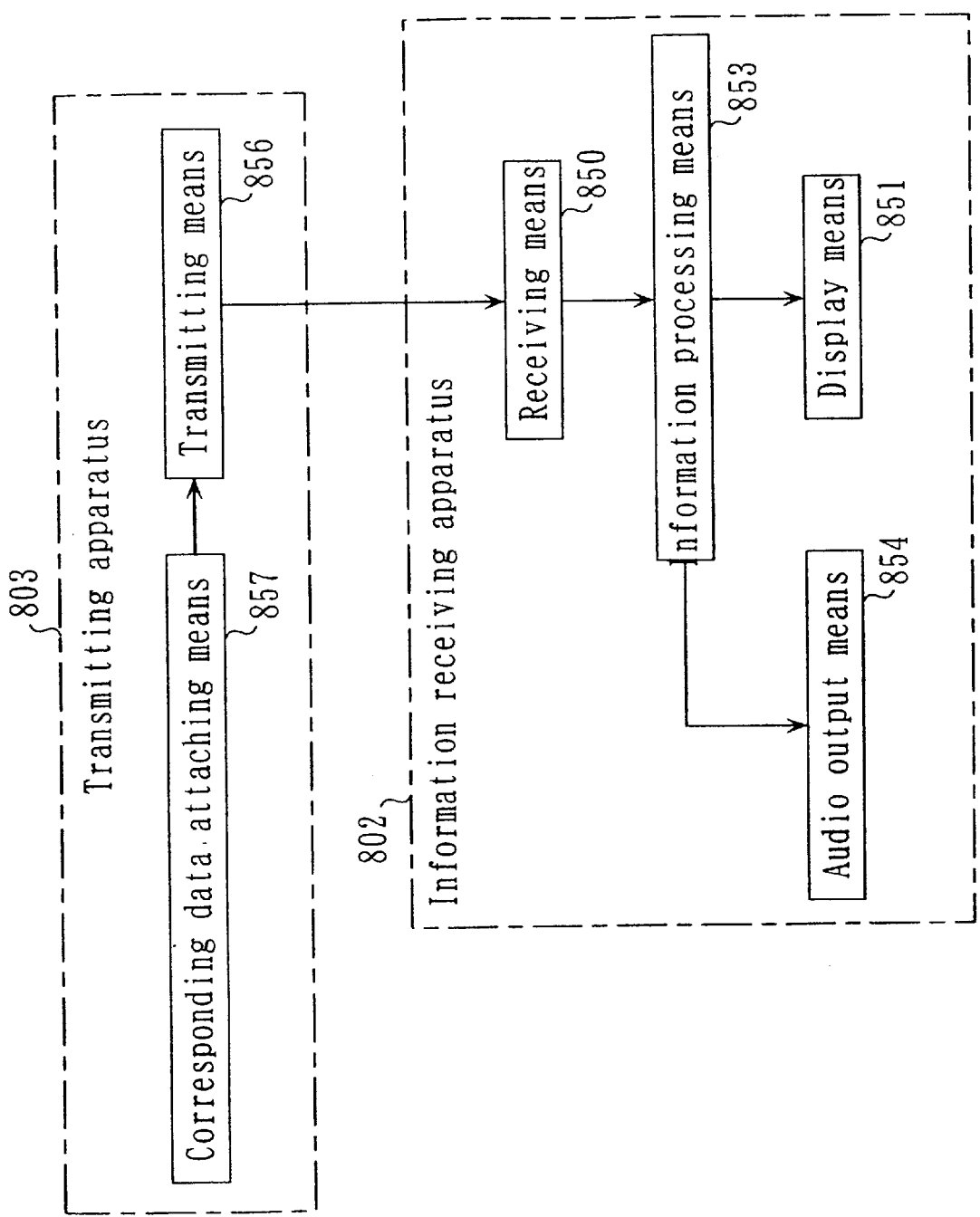

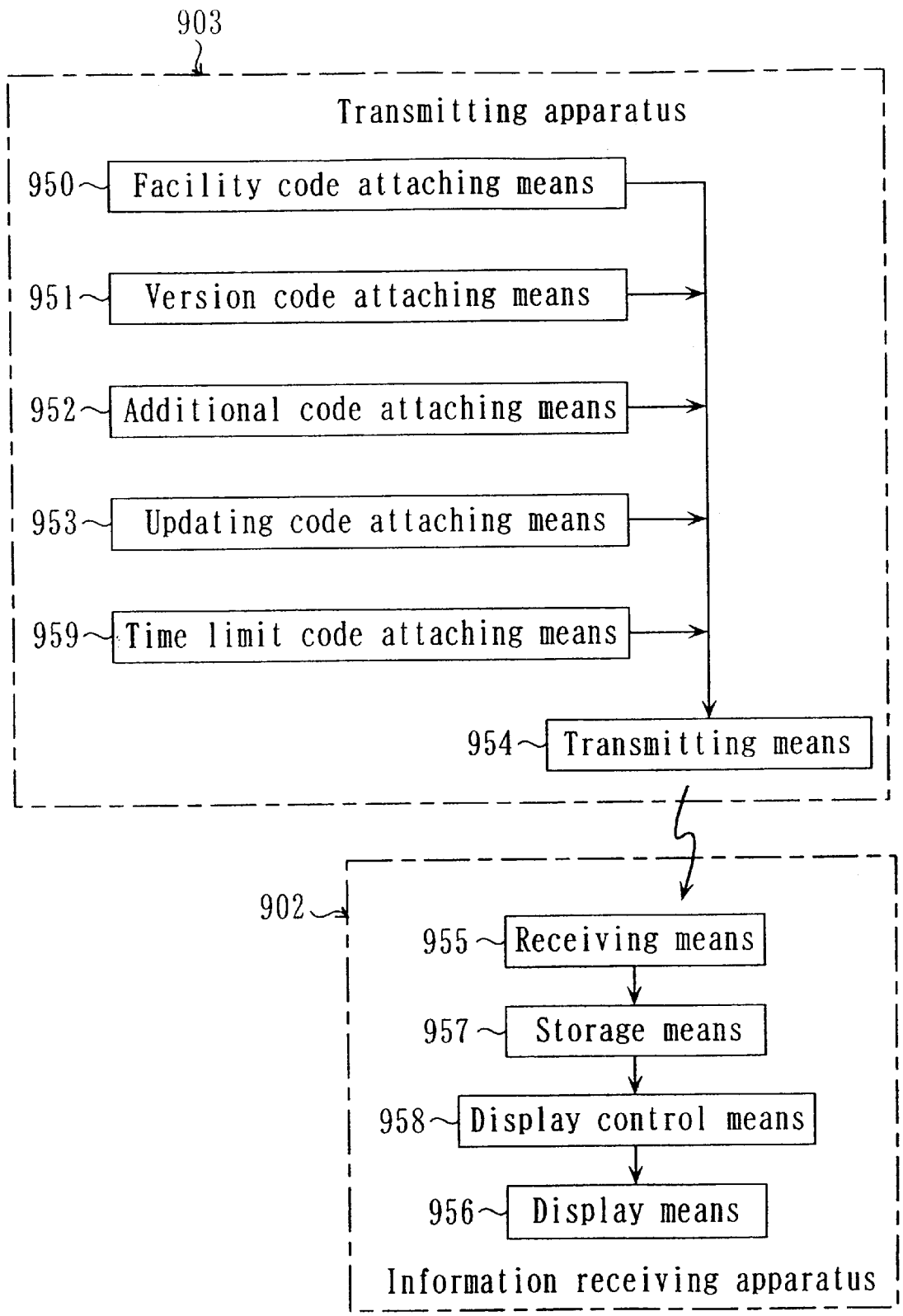
<Fig. 100>

<Fig. 101>
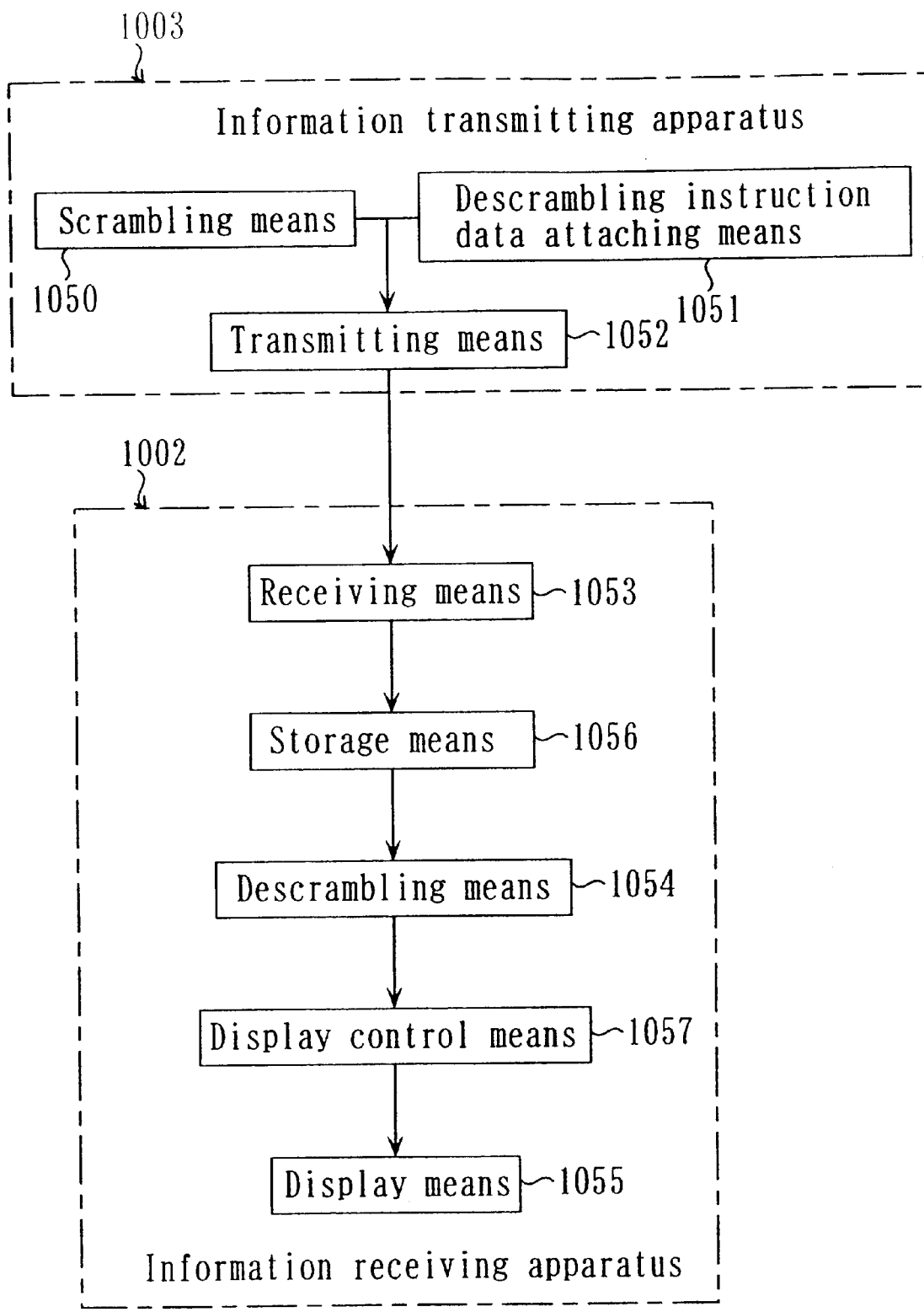

⟨Fig. 102⟩
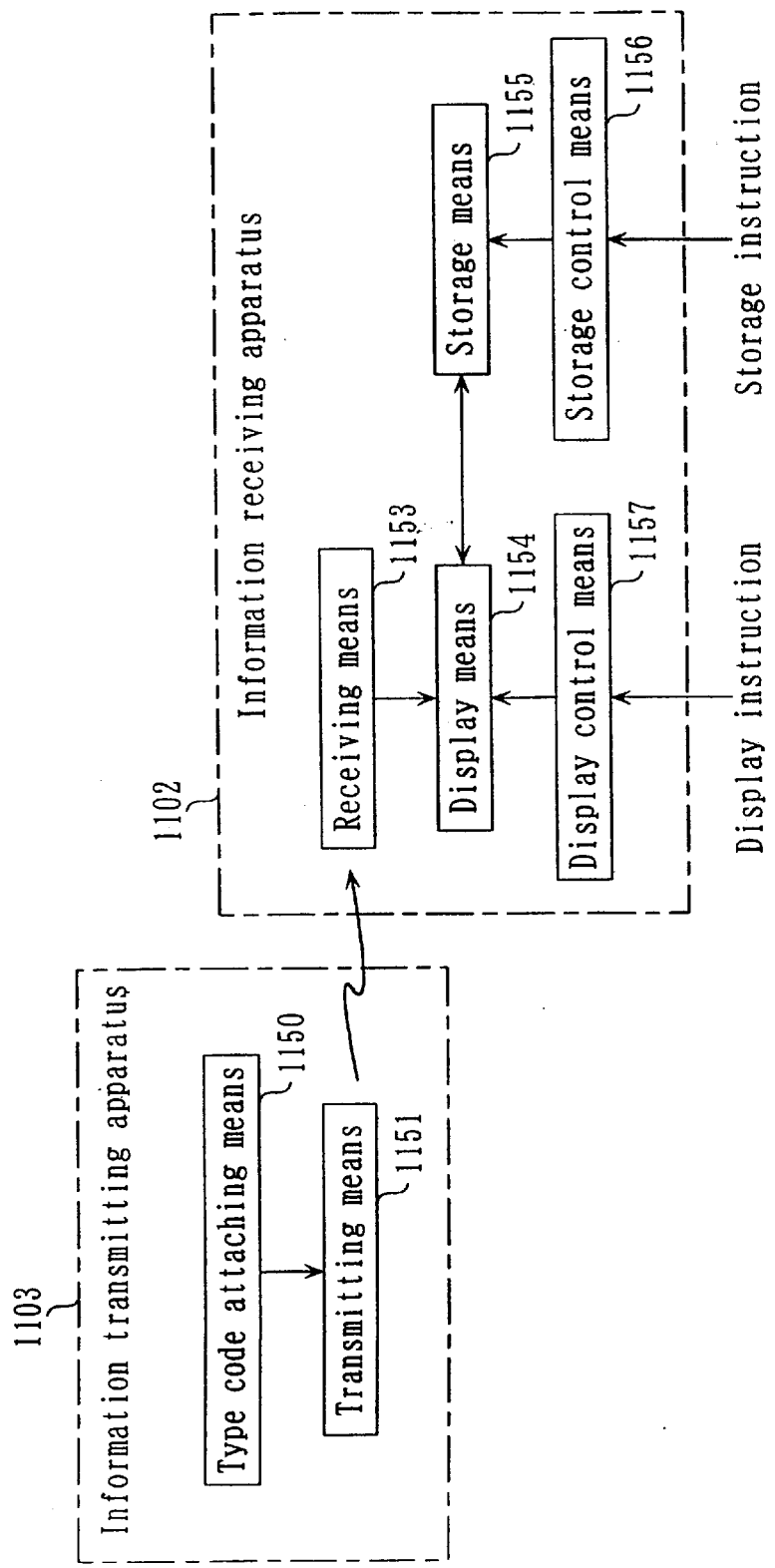

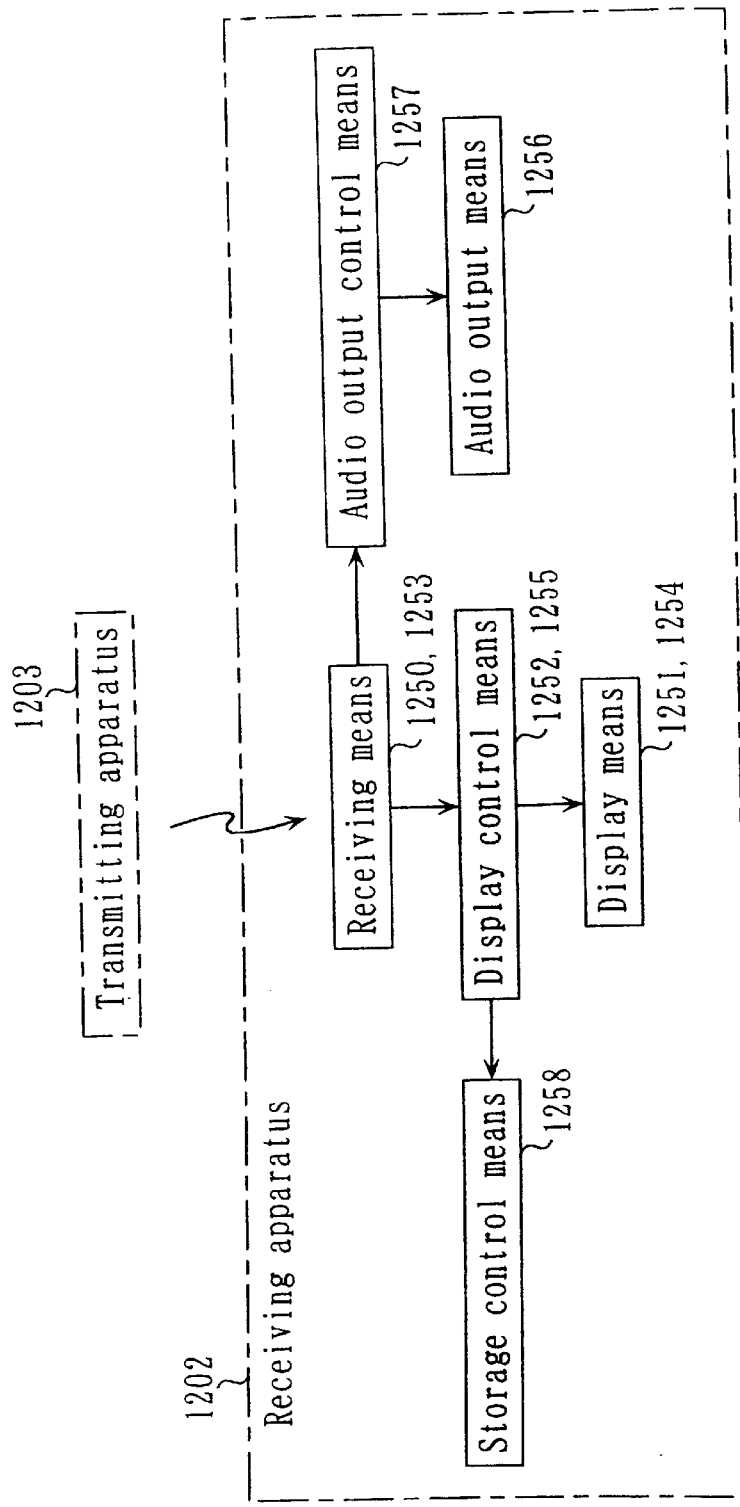
⟨Fig. 103⟩

INFORMATION TRANSMITTING APPARATUS AND INFORMATION RECEIVING APPARATUS

BACKGROUND OF THE INVENTION

1. Field of the Invention

The present invention relates to an information transmitting apparatus (external transmitting station) for transmitting literal information and graphic information by means of a radio wave of FM multiplexed text broadcasting or the like and information receiving apparatus (special receiver such as an FM teletext receiver or a car navigation apparatus integrated with an external information receiving function) for receiving and displaying the transmitted information.

2. Description of the Prior Art

Conventionally, in regard to the multiplexed text broadcasting that can be utilized in a mobile body, there has been, for example, an FM teletext receiver. Information to be transmitted by this multiplexed text broadcasting, one screen constituted in a specified format (e.g., three lines each comprised of 15 letters) is set as one page, and a plurality of pages constitutes one program. In this case, the first line of the page is used as a header which shows the transmission origin of the information, and the second and third lines are used as a text which shows the contents of the information.

When viewing the desired program on the above conventional FM teletext receiver, a variety of menus are displayed on the screen upon selecting a program menu, and the desired program should be selected from the displayed menus and then displayed.

SUMMARY OF THE INVENTION

The aforementioned prior art receiving apparatus only receives and displays the information transmitted from the transmitting apparatus. However, depending on the type and attribute of the information, the information is desired to be not only displayed but also further processed to be stored it into a memory, outputted as a voice output, used for outputting a control signal further to another equipment or subject to other processes.

A first object of the present invention is to provide an information transmitting apparatus and information receiving apparatus capable of further processing received information based on the type, attribute and the like of the information, displaying information entered in, for example, another program data or the like relevant to the received information and executing correcting control of the operation state of a vehicle.

Furthermore, in the conventional multiplexed text broadcasting by means of an FM radio wave or the like, nothing other than specified letters cannot be transmitted. The above causes a problem that position information cannot be transmitted together with facility information to, for example, a car navigation apparatus and consequently the position and route cannot be displayed on a map.

A second object of the present invention is to provide an information transmitting apparatus and information receiving apparatus capable of displaying position information together with facility information by means of multiplexed text broadcasting.

Furthermore, when, for example, a "traffic information" program is selected from the program menu in the prior art FM teletext receiver or the like, the traffic information is displayed. The traffic information program is constructed so that traffic congestion information, traffic accident information and the like of a number of trunk roads within a range in which a radio wave transmitted from the transmitting station are displayed as scrolled successively throughout a number of pages. Furthermore, when a "weather information" program is selected from the program menu, a rainfall probability and the like in each place within the area that the transmitting station covers are displayed as scrolled successively throughout a number of pages similarly to the above.

Therefore, for example, when the user desires to obtain the traffic information of the specified road on which the user is driving a vehicle, the information of the rainfall probability or the like of a specified area of the place to which the user plans to visit, the user is required to find out the desired one from the information displayed throughout a number of pages by turning the pages or performing a similar work, and this causes a problem that it takes much time and labor that much.

A third object of the present invention is to provide an information transmitting apparatus and information receiving apparatus capable of easily displaying the information of the desired specific item even when the information of a number of items are existing in one program transmitted from the transmitting apparatus.

Furthermore, as a method for displaying a place entered in event information received by the aforementioned prior art teletext receiving apparatus on a map of the navigation apparatus, there exist a method for displaying the specified place on the screen by effecting enlarging, contracting, scrolling or similar operations of the map of the navigation apparatus while viewing the display screen of the teletext or referring to notes of the screen, and a method for displaying the place of a facility by selecting a specified name from a list of facilities categorized in alphabetical order or by the field, type or the like stored in the navigation apparatus. However, either one has a problem that it takes much time and labor.

Furthermore, when dialing a telephone number included in the above displayed facility information or the like, it is required to operate the telephone by referring to the number on display and note of it, and this causes a problem that it takes much labor that much.

In view of the aforementioned conventional problems, it is a fourth object of the present invention to provide an information transmitting apparatus and information receiving apparatus capable of easily displaying the place of a specified facility displayed by teletext on the map of the navigation apparatus and easily making a telephone call to the facility.

However, in the information transmitting and receiving apparatuses that perform display control and the like of information by attaching a control code to the aforementioned header, there is a problem that the control code is displayed as a letter that makes no sense when the header is displayed by the receiving apparatus.

Furthermore, in a receiving apparatus that is not coping with the above specified control code, there is the problem that none of the aforementioned menu processing, automatic storing of information and the like can be performed.

A fifth object of the present invention is to provide an information transmitting apparatus and information receiving apparatus capable of effectively utilizing the header section and easily coping with the display control of information.

Particularly when the receiving apparatus is used as installed in a vehicle, there is a demand for calling highly demanded information to be confirmed even in the time of driving the vehicle, such as traffic information and weather information in a one-touch motion skipping over the menu retrieval. However, the names of programs differ depending on broadcasting stations and the program numbers change depending on broadcasting stations and are possibly changed during operation. Therefore, it is difficult to specify each program, meaning that it is difficult to perform the one-touch call.

Furthermore, depending on the program contents, there is one that is desired to be provided through audio conversion as converted into voice. In this case, it is preferable to change the audio conversion dictionary and the algorithm of conversion processing depending on each program in order to improve the audio conversion accuracy. However, it is difficult to specify each program also in this case.

A sixth object of the present invention is to provide an information receiving apparatus and information transmitting apparatus capable of specifying the type of each program, consequently easily displaying the desired program and providing each program through a process conforming to the type of each program.

According to the first aspect of the invention, as shown in FIGS. 92 through 99, there is provided an information transmitting apparatus for transmitting information to an external receiving apparatus by means of a radio wave, comprising: a control information attaching means for attaching control information representing a control processing method on the receiving apparatus side of the information to the information to be transmitted; and a transmitting means for transmitting information to which the control information is attached.

According to the second aspect of the invention, as shown in FIGS. 92 through 99, there is provided an information receiving apparatus for receiving and displaying information transmitted from an external transmitting apparatus by means of a radio wave, comprising: a receiving means for receiving the transmitted information; a display means for displaying the received information; and information processing means operating, when to the received information is attached control information representing a control processing method of the received information, to execute information processing according to the control information.

According to the third aspect of the invention, as shown in FIGS. 92, there is provided an information transmitting apparatus for transmitting information to an external receiving apparatus by means of a radio wave, comprising: a code attaching means (control information attaching means) for attaching to the information to be transmitted an identification code representing the type of the information and an index code representing the attribute of the information; and a transmitting means for transmitting information to which the identification code and the index code are attached.

In the third aspect of the invention, the identification code representing the type of the information is the code for identifying each program among a variety of programs of traffic information, weather information, notice, news and the like, while the index code representing the attribute of the information is the code for identifying, for example, the current page as the program title or the sub-menu of a certain program, and for specifying whether it is the information to be stored, an audio output to be outputted or other one.

Then, the identification code and the index code of the third aspect of the invention are not always required to be separated apparently in the form of two codes, and what is essential is that the codes are required to have an identifying capability to such an extent that they can instruct selection between a variety of software processes or hardware.

According to the fourth aspect of the invention, as shown in FIG. 92, there is provided an information receiving apparatus for receiving and displaying information transmitted from an external transmitting apparatus by means of a radio wave of multiplexed text broadcasting, comprising: a receiving means for receiving the transmitted information; a display means for displaying the received information; and an information processing means operating, when to the received information are attached an identification code representing the type of the information and an index code representing the attribute of the information, to execute selection of software processing or hardware corresponding to a combination of the identification code and the index code.

According to the fifth aspect of the invention, based on the fourth aspect of the invention, the information processing means retrieves information entered in different pages of an identical program, information entered in different programs, information relevant to the received information from the information of an external apparatus based on the combination of the identification code and the index code, executes a specified associating operation to display the resulting information as a series of information on the display means or output the information to an external apparatus.

In the fifth aspect of the invention, the performance of executing the specified associating operation and displaying the resulting information as a series of information means that, when, for example, the received information is facility information and event information, concerning information such as the position information of the facility or the parking near the facility and the information of an empty space is taken in from another page, another program, another receiving apparatus, another navigation apparatus or the like, and the resulting information is displayed as the received information and a series of information.

According to the sixth aspect of the invention, based on the fourth aspect of the invention, the information processing means retrieves information relevant to the received information from a data base owned by the receiving apparatus or an external apparatus based on the combination of the identification code and the index code, executes a specified associating operation to display the resulting information as a series of information on the display means or output the information to an external apparatus.

According to the seventh aspect of the invention, based on the fourth aspect of the invention, the information processing means executes engine combustion control, speed change control, suspension control and the like by means of a vehicle control apparatus based on the combination of the identification code and the index code.

According to the eighth aspect of the invention, based on the fourth aspect of the invention, the information processing means decides the validity of correcting control of the vehicle based on an external vehicle state detection signal.

In the eighth aspect of the invention, the decision of the validity of the correcting control means that, when, for example, correcting engine control for a mountain road by the code of received information, if it is confirmed that the currently running road is a mountain road in view of the position information from an external navigation apparatus, it is decided that the correcting control is valid.

According to the ninth aspect of the invention, based on the fourth through eighth aspects of the invention, a registering means for registering a specified letter string in the received information as either one or both of the identification code and index code is provided.

In the present case, the information processing means executes selection between a variety of software processes and selection of hardware based on the combination of the identification code and the index code, and it is not limited the processes of the fifth through eighth aspects of the present invention. It is to be noted that the selection of hardware means that, for example, any one of a radio receiver, a navigation apparatus, a vehicle control ECU, a traffic information providing apparatus and the like connected to a CPU is selected and a control signal such as a selection signal is supplied.

According to the tenth aspect of the invention, as shown in FIG. 93, there is provided an information transmitting apparatus for transmitting a literal information to an information receiving apparatus by means of a radio wave of multiplexed text broadcasting, comprising: a control information attaching means for attaching control literal information comprised of letters that can be displayed for executing display control of a position on a map to the inside of display information; and a transmitting means for transmitting display information to which the control literal information is attached.

According to the eleventh aspect of the invention, as shown in FIG. 93, there is provided an information receiving apparatus for receiving literal information transmitted from an external transmitting apparatus by means of a radio wave of multiplexed text broadcasting, comprising: a receiving means for receiving display information to which is attached control literal information comprised of letters that can be displayed for executing display control of a position on a map; a display means for displaying the received display information; and a display control means (information processing means) for controlling display position on a map based on the control literal information.

According to the twelfth aspect of the invention, as shown in FIG. 94, there is provided an information transmitting apparatus for transmitting literal information comprised of a header for displaying a transmission origin and the like and a text for displaying information contents to an external receiving apparatus by means of a radio wave of multiplexed text broadcasting, comprising: a control code attaching means (control information attaching means) for attaching a control code which serves as an identifier for identifying the characteristic of information contents of the text to the header; and a transmitting means for transmitting the literal information to which the control code is attached.

According to the fourteenth aspect of the invention, as shown in FIG. 94, there is provided an information receiving apparatus for receiving literal information comprised of a header for displaying a transmission origin and the like and a text for displaying information contents transmitted from an external transmitting apparatus by means of a radio wave of multiplexed text broadcasting, comprising: a receiving means for receiving the literal information in which a control code which serves as an identifier for identifying the characteristic of information contents of the text is attached to the header; an item list forming means (information processing means) for forming an item list representing the contents of the information based on the control code of the received literal information; and a display means for displaying the item list and information contents of the item selected from the list.

According to the thirteenth aspect of the invention, an updating time processing code for instructing whether the received data prior to updating is to be saved or not is attached. According to the fifteenth aspect of the invention, received data is saved or processed in another manner based on the updating time processing code.

In the twelfth through fifteenth aspects of the invention, the control code is to specify, for example, which of the notice from the broadcasting station, the program menu, the program contents, etc. the information contents of the text correspond to. Furthermore, the item representing the information contents is, for example, the trunk road name when the current program is traffic information or the district name when the current program is, for example, weather information.

According to the sixteenth aspect of the invention, as shown in FIG. 95, there is provided an information transmitting apparatus for transmitting literal information to an external receiving apparatus by means of a radio wave of multiplexed text broadcasting, comprising: a facility code attaching means (control information attaching means) for attaching a facility code for executing display control of the position of the facility relevant to the literal information to the inside of the literal information; and a transmitting means for transmitting literal information to which the facility code is attached.

According to the seventeenth aspect of the invention, based on the sixteenth aspect of the invention, the facility code is a telephone number of the facility or a code corresponding to the telephone number.

According to the eighteenth aspect of the invention, based on the seventeenth aspect of the invention, a dialing code attaching means for attaching to the inside of the literal information an automatic dialing code indicating whether or not automatic dialing to the facility relevant to the facility code can be effected based on the facility code by a receiving apparatus having an automatic dialing function is provided.

According to the nineteenth aspect of the invention, as shown in FIG. 95, there is provided an information receiving apparatus for receiving literal information transmitted from an external transmitting apparatus by means of a radio wave of multiplexed text broadcasting, comprising: a receiving means for receiving the literal information to which a facility code for executing display control of the position of the facility relevant to the literal information is attached; a literal information display means for displaying the received information; and a map display control means (information processing means) for displaying the position of the facility on a map display means based on the facility code.

According to the twentieth aspect of the invention, based on the nineteenth aspect of the invention, the map display means for displaying the position of the facility is constructed separately from the receiving apparatus.

According to the twenty-first aspect of the invention, based on the nineteenth or twentieth aspect of the invention, the receiving apparatus comprises: a telephone connecting means for connecting a telephone; and an automatic dialing means for making a telephone call to the facility relevant to the received information based on the received facility code.

According to the twenty-second aspect of the invention, as shown in FIG. 96, there is provided an information transmitting apparatus for transmitting literal information to an external receiving apparatus by means of a radio wave of multiplexed text broadcasting, the literal information being comprised of a pseudo menu page having a selection item for selecting information and a content page corresponding to each selection item of the pseudo menu page, each page being comprised of a header for displaying an information transmission origin and a text for displaying information contents, the apparatus comprising: a type code attaching means (control information attaching means) for attaching a type code for identifying the type of information contents set every selection item to the header of the content page; and a transmitting means for transmitting literal information to which the type code is attached.

According to the twenty-third aspect of the invention, based on the twenty-second aspect of the invention, the type code attaching means makes the first letter or symbol of the type code coincide with the letter or symbol attached to each selection item of the pseudo menu page.

According to the twenty-fourth aspect of the invention, based on the twenty-second or twenty-third aspect of the invention, the selection item content page is comprised of a plurality of pages, and a page symbol attaching means for attaching a page symbol representing a page number of each selection item to the header of the content page is provided, and the transmitting means transmits literal information to which the page symbol is attached.

According to the twenty-fifth aspect of the invention, based on any of the twenty-second through twenty-fourth aspects of the invention, a specific code attaching means for attaching to the header of an event page in which each type code and an event code for specifying a facility or the like relevant to the information contents of the type code are displayed in an associating manner a specific code representing the fact that page is the event page is provided, and the transmitting means transmits literal information to which the specific code is attached.

According to the twenty-sixth aspect of the present invention, as shown in FIG. 96, there is provided an information receiving apparatus for receiving and displaying literal information transmitted from an external transmitting apparatus by means of a radio wave of multiplexed text broadcasting, comprising: a receiving means for receiving the transmitted literal information; a display means for displaying the received literal information; and a display control means (information processing means) operating, when a type code for identifying the type of information contents and a page symbol representing the page number of information comprised of a plurality of pages exist in the received literal information, to display the type code and the page symbol on the display means.

According to the twenty-seventh aspect of the invention, based on the twenty-sixth aspect of the invention, when the specific code exists in the received literal information, the display control means limits display of a page having the specific code to only a time when the vehicle is stopped.

According to the twenty-eighth aspect of the invention, as shown in FIG. 97, there is provided an information receiving apparatus for receiving and displaying information transmitted from an external transmitting apparatus by means of a radio wave of multiplexed text broadcasting, comprising: a receiving means for receiving the transmitted information; a display means for displaying the received information; an identification code registering means for registering a specified letter string in the received information as an identification code for identifying the type of information contents; and an information processing means for executing specified processing corresponding to the identification code on the received information when the letter string exists in the received information.

According to the twenty-ninth aspect of the invention, as shown in FIG. 98, there is provided an information receiving apparatus for receiving and displaying information transmitted from an external transmitting apparatus by means of a radio wave of multiplexed text broadcasting, comprising: a receiving means for receiving the transmitted information; a display means for displaying the received information; a table reading means for reading from an external storage medium a table data in which an identification code for identifying the type of information contents and a processing code for designating an information processing method for the identification code are recorded; and an information processing means for executing information processing designating by a processing code corresponding to the identification code on the received information when the identification code exists in the received information.

According to the thirtieth aspect of the invention, as shown in FIG. 99, there is provided an information receiving apparatus for receiving and displaying information transmitted from an external transmitting apparatus by means of a radio wave of multiplexed text broadcasting, comprising: a receiving means for receiving an association data representing association between an identification code for identifying the type of information contents and a processing code for designating an information processing method corresponding to the identification code; a display means for displaying the received information; and an information processing means operating, when an identification code entered in the association data exists in the received information, to execute information processing designated by a processing code corresponding to the identification code on the received information.

According to the thirty-first aspect of the invention, based on any of the twenty-eighth through thirtieth aspects of the invention, the information processing means converts received information provided with the specified letter string or the identification code into an audio signal according to a converting method corresponding to the identification code, and a voice output means for outputting the converted signal is provided.

According to the thirty-second aspect of the invention, based on the thirty-first aspect of the invention, the information processing means converts the received information provided with the specified letter string or the identification code into voice according to a dictionary corresponding to the identification code.

According to the thirty-third aspect of the invention, based on any of the twenty-eighth through thirtieth aspects of the invention, the information processing means displays the received information provided with the specified letter string or the identification code on the display means by a specified key operation corresponding to the identification code.

According to the thirty-fourth aspect of the invention, as shown in FIG. 99, there is provided an information transmitting apparatus for transmitting information to an external receiving apparatus by means of a radio wave of multiplexed text broadcasting, comprising: an association data attaching means (control information attaching means) for attaching to transmission information an association data representing association between an identification code for identifying the type of information contents and a processing code for designating an information processing method corresponding to the identification code; and a transmitting means for transmitting information to which the association data is attached.

BRIEF DESCRIPTION OF THE DRAWINGS

FIG. 1 is a schematic diagram of an information transmitting apparatus and information receiving apparatus according to a first embodiment of the first through ninth aspects of the present invention;

FIG. 2 is a view showing a concrete example of the receiving apparatus of the first embodiment;

FIG. 3 is a block diagram showing the construction of the receiving apparatus of the first embodiment;

FIGS. 4 and 8 through 18 are views of examples of information received by the receiving apparatus of the first embodiment;

FIGS. 5 through 7 are views for explaining information received by the receiving apparatus of the first embodiment;

FIGS. 19 and 20 are views for explaining the operation of the receiving apparatus of the first embodiment;

FIG. 21 is a schematic diagram of an information transmitting apparatus and information receiving apparatus according to a second embodiment of the first, second, tenth and eleventh aspects of the present invention;

FIG. 22 is a view of an example of information transmitted by the transmitting apparatus of the second embodiment;

FIG. 23 is a flowchart for explaining the operation of the apparatuses of the second embodiment;

FIGS. 24 (a), (b) and (c) and 25 (a), (b) and (c) are views showing examples of a display screen of the receiving apparatus of the second embodiment;

FIG. 26 is a schematic diagram of an information transmitting apparatus and information receiving apparatus according to a third embodiment of the first, second, and twelfth through fifteenth aspects of the present invention;

FIGS. 27 and 28 are views showing display units of the receiving apparatus of the third embodiment;

FIGS. 29 and 30 are block diagrams showing the construction of the receiving apparatus of the third embodiment;

FIGS. 31 through 47 are views showing examples of data of information displayed by the receiving apparatus of the third embodiment;

FIGS. 48 through 50 are views of examples of data of an item list formed by the receiving apparatus of the third embodiment;

FIG. 51 is a schematic diagram of a broadcasting system including an information transmitting apparatus and information receiving apparatus according to a fourth embodiment of the first, second, and sixteenth through twenty-first aspects of the present invention;

FIG. 52 is a view showing an example of information transmitted from the transmitting apparatus of the fourth embodiment;

FIG. 53 is a view showing a concrete example of the receiving apparatus of the fourth embodiment;

FIGS. 54 and 55 are views showing modification examples of the receiving apparatus of the fourth embodiment;

FIG. 56 is a view showing a telephone connected to the receiving apparatus of the fourth embodiment;

FIGS. 57 and 58 are flowcharts for explaining the operation of the receiving apparatus of the fourth embodiment;

FIG. 59 is a schematic diagram of a broadcasting system including an information transmitting apparatus and information receiving apparatus according to a fifth embodiment of the first, second, and twenty-second through twenty-seventh aspects of the present invention;

FIG. 60 is a schematic view showing a concrete example of the receiving apparatus of the fifth embodiment;

FIG. 61 is a block diagram showing the construction of the receiving apparatus of the fifth embodiment;

FIG. 62 through 67 are views for explaining information displayed by the receiving apparatus of the fifth embodiment;

FIGS. 68 through 81 are views showing examples of information displayed by the receiving apparatus of the fifth embodiment;

FIG. 82 is a schematic diagram of a broadcasting system including an information transmitting apparatus and information receiving apparatus according to a sixth embodiment of the first, second, and twenty-eighth through thirty-fourth aspects of the present invention;

FIG. 83 is a view showing a concrete example of the receiving apparatus of the sixth embodiment;

FIG. 84 is a block diagram showing the construction of the receiving apparatus of the sixth embodiment;

FIG. 85 is a view showing an example of information received by the receiving apparatus of the sixth embodiment;

FIGS. 86, 88 and 89 are flowcharts for explaining the operation of the receiving apparatus of the sixth embodiment;

FIG. 87 is a view for explaining the operation of the receiving apparatus of the sixth embodiment;

FIG. 90 is a view showing association between an identification code and a type in the apparatus of the sixth embodiment;

FIG. 91 is a view showing an example of information received by the receiving apparatus of the sixth embodiment;

FIG. 92 is a schematic diagram of the apparatuses of the first through ninth aspects of the present invention;

FIG. 93 is a schematic diagram of the apparatuses of the first, second, tenth and eleventh aspects of the present invention;

FIG. 94 is a schematic diagram of the apparatuses of the first, second and twelfth through fifteenth aspects of the present invention;

FIG. 95 is a schematic diagram of the apparatuses of the first, second and sixteenth through twenty-first aspects of the present invention;

FIG. 96 is a schematic diagram of the apparatuses of the first, second and twenty-second through twenty-seventh aspects of the present invention;

FIGS. 97 through 99 are schematic diagrams of the apparatuses of the first, second and twenty-seventh through thirty-fourth aspects of the present invention; and FIGS. 100 through 103 are schematic diagrams of the information transmitting apparatus and information receiving apparatus included in the first and second aspects of the present invention.

DETAILED DESCRIPTION OF THE PREFERRED EMBODIMENTS

Preferred embodiments of the present invention will be described with reference to the accompanying drawings.

First embodiment

An information transmitting apparatus and information receiving apparatus according to a first embodiment of the first to ninth aspects of the present invention will be described with reference to FIGS. 1 through 20.

In FIG. 1, the reference numeral 1 denotes a broadcasting apparatus for executing a multiplexed text broadcasting operation by FM broadcasting. The broadcasting apparatus 1 comprises an information receiving apparatus 2 which receives literal information and displays the same, an information transmitting apparatus 3 which wirelessly transmits information to the receiving apparatus 2, and an input apparatus 5 for inputting facility information, event information, traffic information, weather information and the like to the transmitting apparatus 3 by a telephone line 4 or the like.

The literal information transmitted from the information transmitting apparatus 3 has a format as shown in FIG. 4, and it is comprised of a header 8 representing the transmission origin of the information and a text 9 representing the contents of the information. Then, the information transmitting apparatus 3 has a code attaching function for attaching an identification code representing the type of the information and an index code representing the attribute of the information to the header 8 of the information to be transmitted. It is to be noted that FIG. 4 shows the page of a main menu. In this example, there can be selected any of the programs of 1. drive information, 2. weather information, 3. notice and 4. news.

The header 8 is comprised of 31-byte data as shown in FIG. 5. In this data, the transmission origin (broadcasting station name) of the information is recorded in the 1st to 19th bytes. Further, a program identifying letter string (identification code) for identifying the type (program) of the information is attached to the 20th to 26th bytes, and an index code representing the attribute of the information is attached to the 27th to 30th bytes respectively by the above-mentioned code attaching function. It is to be noted that the 31st byte is an unused empty byte. Furthermore, the byte numbers of the above-mentioned codes are not limited to those of this example, and an arbitrary byte number can be selected for each code.

The identification code (20th to 26th bytes) and the first letter (27th byte) of the index code are set according to a rule as shown in FIG. 6. Practically, when the type (program name) of the text of the current page is, for example, "drive information" or "notice", "D-INFO" or "DGUIDE" is attached as the identification code.

When the type of the text is "drive information" and its content (attribute) is the "facility information", "D-INFO:F" is attached. Likewise, when the type of the text is "drive information" and its content (attribute) is restaurant information, "D-INFO:R" is attached.

When the type of the text is "drive information" and it is the information to be outputted in the form of voice, "D-INFO:V" for designating the activation of its voice guide as a software process corresponding to the combination of the identification code and the index code is attached.

When the type of the text is "notice" and its content is the information to be received by a radio receiver 21, "DGUIDE:A" for designating the output of a reception frequency signal (channel-select signal) of the radio receiver 21 as a software process therefor is attached.

When the type of the text is "notice" and its content is the information for executing engine control and automatic transmission (A/T) control by an ECU 33, "DGUIDE:B" for designating the correction of drive train control by the ECU 33 as a software process therefor is attached. Likewise, when it is the information for executing chassis control of a suspension and the like, "DGUIDE:C" for designating the correction of chassis control by the ECU 33 as a software process therefor is attached.

The index code (27th to 30th bytes) is set by a rule as shown in FIG. 7, and it is comprised of any one of (1) four letters that are all "space (SP)", (2) "MENU" and (3) "English" +"three English and numeral letters".

The index code comprised of the "space of four letters" is attached when the content (attribute) of the text of the current page is the title of a program, a notice from the broadcasting station or the like.

The "MENU" is attached when the content (attribute) of the text of the current page is a sub-menu (pseudo menu) of the aforementioned main menu.

Furthermore, among the index code comprised of the "English" +"three English and numeral letters", the "English" of the first letter (27th byte) is "F, R, V, A, B, C" or the like as shown in FIG. 6, and for this is adopted the same one as the English letter attached to the top of the name of a sub-program displayed as the aforementioned sub-menu (refer to FIG. 10).

Furthermore, in the position of the second letter (28th byte), "–" is attached when the content (attribute) of the text of the current page is the title of the sub-program displayed in the sub-menu, or a numeral (1 to 9) is attached when the content is an additional numeral to be attached to an event, facility or the like provided by the sub-program.

Furthermore, in the position of the third letter (29th byte), "s" is attached when the content of the current page is one that deserves to be automatically stored into a memory of the receiving apparatus. That is, automatic storing for automatically storing the contents of the page into a RAM 24 inside the receiving apparatus 2 is designated as a software process corresponding to the combination of the identification code and the index code. It the case of a space to which "s" is not attached, no automatic storing is required.

Furthermore, in the position of the fourth letter (30th byte), a "(numeral)" representing the number of remaining information pages is attached when the content (attribute) of the text is part of information of a plurality of pages. It is to be noted that "1" or "0" is attached in the case of the first page.

On the other hand, in the position of the last page of each sub-program, event codes for specifying an event, facility and the like relevant to the information contents of the sub-program are collectively recorded, and three patterns of 8-letter letter string as shown in FIG. 8 is attached to the program identifying letter string of the header of the last page. Since the event codes are thus collectively recorded on one page, display control for limiting the display of the page to only a time when the vehicle is stopped or performing a similar operation can be easily executed.

The receiving apparatus 2 is provided with a display unit 6 for displaying the received literal information, and the display unit 6 has display sections 7a through 7c for displaying the received information in three lines. A page on display, a display position, a display time and the like of the display unit 6 can be arbitrarily changed. Further, the receiving apparatus 2 is provided with operating function keys 11, direction keys (cursor keys) 12 for moving a cursor and the like, an operation decision key 13 and a speaker 28 for outputting an audio signal.

As shown in FIG. 3, the receiving apparatus 2 is further provided with an antenna 16 for receiving literal information to which the identification code and the index code are attached and which is transmitted from the transmitting apparatus 3, a tuner section (receiving means) 18, a demodulator 19 for demodulating FM multiplex data from the received signal and a CPU 20 for executing reception control and the like in the tuner section 18.

The CPU 20 is connected to a ROM 23 and a RAM 24 which serve as storage devices and to an audio converter 26 for converting the received literal information into an audio signal.

The CPU 20 has an information processing function for selecting between a variety of software processes or selecting hardware as shown in FIG. 6 when the received information includes the identification code representing the type of the information and the index code representing the attribute of the information attached thereto according to the identification code and the index code.

The CPU 20 is further connected to the radio receiver 21 via an I/F 22. When the received information includes "D-INFO:V" as a combination of the identification code and the index code attached thereto, the CPU 20 outputs the channel-select signal for selecting the station that is broadcasting the information relevant to the received information to the radio receiver 21.

The CPU 20 is further connected to a navigation apparatus 31 and an ECU 33 via I/Fs 30 and 32. The CPU 20 operates by its information processing function to display the position of a facility according to position data from the navigation apparatus 31 and correct the engine combustion control, speed change control and suspension control by means of the ECU 33.

The operation of the broadcasting apparatus 1 of the present embodiment will be described next.

When information as shown in FIGS. 9 through 18 transmitted from the transmitting apparatus 3 is received in the receiving apparatus 2, a specified program is read from the ROM 23 and the RAM 24, and the selection of the software process or varied hardware is executed according to the header information of the received information by a specified key operation or the like.

First, in the case of literal information shown in FIG. 9, since the program identifying letter string (identification code) is "D-INFO:" and the retrieval code is the four-letter space letter from the header 8, it can be found that the content (attribute) of the text is the notice information representing the program title of the drive information from the broadcasting station.

In the case of literal information shown in FIG. 10, since the identification code is "D-INFO:" and the retrieval code is "MENU" from the header 8, it can be found that the text content is the sub-menu of the program of the drive information.

When "F" is selected from the selection items "F, R, E and D" attached to information names in the sub-menu shown in FIG. 10, a page of which header retrieval code is provided with the selection item "F" (the page of the facility information and the event information) is retrieved from the received information, and, for example, information contents as shown in FIGS. 11 through 16 are displayed.

In the case of literal information shown in FIG. 11, since the program identifying letter string is "D-INFO:" and the retrieval code is "F- 0" from the header 8, it can be found that the text content is the title page of the sub-program consequent upon the selection of the sub-menu "F" of the drive information, and is the first page of the information of each event provided by the sub-program.

In the case of literal information shown in FIG. 12, since the program identifying letter string is "D-INFO:" and the retrieval code is "F1s\*" from the header 8, the text content is the first page of the first event information of the sub-program consequent upon the selection of the sub-menu "F" of the drive information, and the automatic storing is executed in the receiving apparatus 2.

In the case of literal information shown in FIG. 13, since the program identifying letter string is "D-INFO:" and the retrieval code is "F1 1" from the header 8, it can be found that the text content is the first event information of the sub-program consequent upon the selection of the sub-menu "F" of the drive information, and the number of remaining pages is 1.

In the case of literal information shown in FIG. 14, since the program identifying letter string is "D-INFO:" and the retrieval code is "F1 0" from the header 8, it can be found that the text content is the first event information of the sub-program consequent upon the selection of the sub-menu "F" of the drive information, and the number of remaining pages is 0.

In the case of literal information shown in FIG. 15, since the program identifying letter string is "D-INFO:" and the retrieval code is "F2s\*" from the header 8, 20 it can be found that the text content is the first page of the second event information of the sub-program consequent upon the selection of the sub-menu "F" of the drive information, and the automatic storing is executed in the receiving apparatus 2.

In the case of literal information shown in FIG. 16, since the program identifying letter string is "D-INFO:" and the retrieval code is "F2 2" from the header 8, it can be found that the text content is the second event information of the sub-program consequent upon the selection of the sub-menu "F" of the drive information, and the number of remaining pages is 2.

When "R" is selected in the sub-menu shown in FIG. 10, the information of which header retrieval code is provided with the selected item "R" is retrieved from the received information similarly to the above, and the selected information content of "recommended restaurant" is displayed.

Then in the case of literal information shown in FIGS. 17 and 18, since the program identifying letter string is "Navi-Code" from the header 8, it is decided that the text content is the last page of the program in which the event code for specifying the event, facility and the like relevant to the information contents is entered, and its version is "00".

On the other hand, based on the event code "19LKJ96A9" specifying the information of "Yodo River fireworks display" recorded on the last page of the program, the information relevant to the "Yodo River fireworks display" (the position information in concrete) is retrieved from the storage device in the navigation apparatus 31, and the parking position and the like as shown in FIG. 13 are displayed on the map screen.

Furthermore, information relevant to the "Yodo River fireworks display" is retrieved from different program data from the same broadcasting station stored in the RAM 24 and then displayed. Furthermore, the information relevant to the "Yodo River fireworks display" is retrieved from the information received in the radio receiver 21 and then displayed.

When the combination of the identification code and the index code attached to the header of the received information is "D-INFO:V", a voice guide is activated by the information processing function of the CPU 20, and the contents of the page are subjected to audio conversion to be outputted in the form of voice. In this case, the conversion dictionary for use in the audio conversion is changed to the one corresponding to the contents of the program, and the literal information is converted into reading corresponding to the contents of the program and then outputted in the form of voice.

When the combination of the identification code and the index code attached to the header of the received information is "DGUIDE:A", a channel-select signal is outputted to the radio receiver 21 connected to the CPU 20, and a radio program corresponding to the channel-select signal is received by the information processing function of the CPU 20.

When the combination of the identification code and the index code attached to the header of the received information is "DGUIDE:B" or "DGUIDE:C", the drive train control or the chassis control by the ECU 33 are corrected by the information processing function of the CPU 20.

There are executed, for example, drive train control for suppressing the fuel injection rate when driving a vehicle on a congested road in a city area or changing the speed change gears to the slower speed side when climbing a hill of a mountain road with the vehicle, and chassis control for changing the vehicle height to the lower side when driving the vehicle on a superhighway.

When the received information deserves to be stored based on the combination of the identification code for identifying the type of the information and the index code representing the attribute of the information, the automatic storing operation is thus executed. This arrangement eliminates the received information storing operation, thereby allowing the user's trouble to be saved.

Furthermore, when the received information is the information to be outputted in the form of voice, the automatic voice outputting operation is executed based on the combination of the identification code and the index code, and therefore, the user can be surely informed of the information. Furthermore, in executing the voice outputting operation, the audio conversion dictionary data is changed to the one corresponding to the received information. Therefore, the literal information can be converted into an audio signal according to the reading corresponding to the information contents.

Furthermore, the relevant information is retrieved and displayed based on the identification code and the index code from the literal information received by different pages of an identical program, different programs or different receiving apparatuses. Therefore, the relevant information can be easily displayed, thereby allowing the provided information to be wide and deep.

In the present case, as a countermeasure for the case where neither the identification code nor the index code is attached to the received information, it is acceptable to register a specified letter string in the received information by associating it with the identification code and the index code as in the seventh aspect of the present invention.

The registration of the identification code is performed as follows. First, a program as shown in FIG. 19 is displayed, and an arbitrary letter string "weather forecast" in the information of the page is designated by a predetermined key operation to select an arbitrary identification code "1" corresponding to the above letter string from a selection menu screen as shown in FIG. 20. By this operation, "weather forecast" entered in the header of FIG. 19 is registered as an identification code corresponding to "weather forecast". Therefore, it is treated similarly to the one in which the identification code corresponding to "weather forecast" is attached to the header of the received information.

After completing the registration of the identification code, when the page as shown in FIG. 19 having "weather forecast" in the header is displayed, the processing of the received information is executed according to a procedure predetermined for the identification code "1". For example, after the audio conversion dictionary is changed to the one for weather forecast, the voice outputting operation is executed in such a manner that an "umbrella mark" and "cloud mark" on the display screen are outputted vocally as "rain" and "cloudy" corresponding to the program contents.

Second embodiment

An information transmitting apparatus and information receiving apparatus according to a second embodiment of the tenth and eleventh aspects of the present invention will be described with reference to FIGS. 21 through 25. It is to be noted that no description is provided for the same components as those of the first embodiment.

In the figures, for example, data in a format as shown in FIG. 22 is inputted from the input apparatus 5 to the transmitting apparatus 3. The above data is comprised of a header 8 having control literal information for representing the latitude and longitude of the user's destination and executing display control of a position on a map and the like and information contents 9.

The operation of the apparatuses 1 of the present embodiment will be described next with reference to FIG. 23.

Information transmitted from the transmitting apparatus 3 is received in the receiving apparatus 2 (step S1), and control literal information comprised of letters that can be displayed and belong to the header 8 (e.g., "3502161351212") is read (step S2). It is to be noted that the control literal information is of course not limited to numerals.

Next, the control literal information "3502161351212" is converted into a control code for executing display control of the position on the map based on a specified conversion rule (step S3).

Then, the control code and the information contents 9 are transmitted to the display unit 6 of the receiving apparatus 2 (step S4), and the position information is displayed on the coordinates of the map corresponding to the above code together with the contents 9.

The display operation on the display unit 6 will be described herein with reference to FIGS. 24 (*a*) through (*f*).

First, by touching the menu key, an information menu screen as shown in FIG. 24 (*a*) is displayed. Then, after selecting "1: Leisure facility", an area selecting screen is displayed by touching the set key (refer to FIG. 24 (*b*)). After selecting an area similarly to the above, a genre selecting screen is displayed (refer to FIG. 24 (*c*)). After selecting "3. Aquarium", a list of facility names and introduction data is displayed (refer to FIG. 25 (*a*)).

By selecting the desired facility (e.g., "Kaiyukan") from the above list, the contents 9 of the information shown in FIG. 22 is displayed on a specified page (refer to FIG. 25 (*b*)). Then, by touching the "next page" key, the position, the route from the current position, the name and the position of the parking of the facility based on the above control code are displayed (refer to FIG. 25 (*c*)).

Thus, the control literal information is attached to the information header 8 and the control literal information is converted into the display control code. Therefore, the position data on the map can be transmitted by teletext, and the teletext can be used not only in the teletext receiver but also in a car navigation apparatus.

Third embodiment

An information transmitting apparatus and information receiving apparatus according to a third embodiment of the twelfth to fifteenth aspects of the present invention will be described with reference to FIGS. 26 through 50.

In the figures, the receiving apparatus 2 is provided with a display unit 6 which serves as a display means for displaying literal information. When a special teletext receiver is used as the receiving apparatus 2, the display unit 6 is provided with display sections 7*a* through 7*c* having three lines as shown in FIG. 27. When a navigation apparatus is used as the receiving apparatus 2, display sections 7*a* through 7*h* having eight lines are provided as shown in FIG. 28, and a 15-letter display is effected on the display sections 7*a* through 7*h*. The page on display, display position, display time and the like in the above display sections can be arbitrarily changed. It is to be noted that the reference numerals 11, 12 and 13 show operating function keys, direction keys for moving the cursor and an operation decision key 13, respectively.

As shown in FIG. 29, the receiving apparatus 2 is provided with a teletext receiver 14 and an FM receiver 15. The receivers 14 and 15 are connected to an antenna 16. The teletext receiver 14 is connected to a registration apparatus 17 for registering specified letters and symbols and the aforementioned keys 11 through 13, while a specified registration data signal and a specified key operation signal are inputted to the receiver 14.

As shown in FIG. 30, the receiving apparatus 2 is provided with a tuner (receiving means) 18 for selecting a signal from a specified broadcasting station among the signals inputted from the antenna 16 and a demodulator 19 for demodulating an FM multiplex data signal from the selected signal. The apparatus is further provided with a CPU (item list forming means) 20 which receives the inputs of the FM multiplex data signal and the specified key operation signals from the keys 11 through 13 and executes the control processes of outputting a channel-select instruction signal to the tuner 18, outputting display data to the display unit 6, forming a list of items representing the contents of the received information and the like.

The CPU 20 is connected to an I/F 21, and a signal representing the vehicle states (shift position, steering angle, incompletely closed door, etc.) detected by a sensor (not shown), a signal representing the vehicle running position from a navigation apparatus and the like are inputted via the I/F 21.

The CPU 20 is connected to an IC card 22, a ROM 23 and a RAM 24 which serve as storage devices to input and output specified data and is connected to a calendar timer 25 to input date and time information.

The CPU 20 is connected to a converter 26 for converting the received literal information into audio data, and the converted audio data is outputted from a speaker 28 via an amplifier 27.

The transmitting apparatus 3 receives the input of, for example, data in a format as shown in FIG. 31 from the input apparatus 5, and the above data is comprised of a header 8 for displaying the transmission origin of information and information contents 9.

The header 8 is comprised of 31-byte data as shown in FIG. 32, where the transmission origin of information is recorded in the 1st through 16th bytes. Then, a control code 10 which serves as an identifier for identifying the characteristic of the information contents of the text 9 is attached to the 17th through 30th bytes by a control code attaching means of the transmitting apparatus 3.

As shown in FIG. 33, the control code 10 is comprised of a plurality of codes, where a major classification code representing the type of information is recorded in the 17th byte, a minor classification code representing the item number is recorded in the 18th and 19th bytes, an updating flag representing the updating of the information contents is recorded in the 20th byte, an updating time processing flag (updating time processing code) representing updating time processing of the information contents, i.e., indicating whether pre-updating received data is to be stored or not stored and the like is recorded in the 21th byte, and a facility code representing the facility of the information contents is recorded in the 23th through 28th bytes. It is to be noted that the 22th, 23th, 29th and 30th bytes are provided for expansion in the stage of addition, correction and the like.

In the present case, the major classification code is to classify the types of information. For the major classification code, there are used the symbols of "!" representing that the information is a notice from the broadcasting station, """ representing that the information is a program menu, and "#" representing that the information is a program content. It is to be noted that "$" is used for the information other than the above information.

The minor classification code is to classify a plurality of information included in one program every content item. In the minor classification code, as shown in FIG. 34, the 5th to 8th bits of the 18th byte of the display control code 10 correspond to the item numbers "1 through 4", while the 5th to 8th bits of the 19th byte of the display control code 10 correspond to the item numbers "5 through 8".

The operation of the information receiving apparatus 2 of the above embodiment will be described next with reference to FIGS. 35 through 50.

First, when the power of the receiving apparatus 2 is turned on, a menu program having three pages as shown in FIGS. 35 through 37 is received in accordance with the transmission from the transmitting apparatus 3, and the text 9 of each page is displayed as a menu on the display unit 6. It is to be noted that the major classification code of the control code 10 at the header 8 of each page is """ since the text content is the menu.

Subsequently, when, for example, "5. entertainment" as shown in FIG. 37 is selected by a cursor operation or the like, the information as the contents of the entertainment program as shown in FIGS. 38 through 47 is received in accordance with the transmission from the transmitting apparatus 3. Consequently, by the item list forming means of the receiving apparatus 2, an item list for classifying the information of the entertainment program every item is formed and displayed according to the following procedure.

First, in the case of the first page shown in FIG. 38, since the major classification code of the 17th byte of the header 8 is set at "!", it is decided that the text 9 of the first page is a notice from the broadcasting station.

In the case of the second page shown in FIG. 39, since the major classification code is set at """, it is decided that the text 9 of this page is the menu and the item number of this page is "1" from the 5th bit of the minor classification code of the 18th byte of the header 8.

In the case of the third page shown in FIG. 40, since the major classification code is set at """, it is decided that the text 9 of this page is the menu and the item number of this page is "2" from the 6th bit of the minor classification code.

In the case of the fourth through seventh pages shown in FIGS. 41 through 43, since the major classification code is set at "#", it is decided that the text 9 of these pages is the program content, the item number of these pages is "2" from the 2nd bit of the minor classification code and the facility is located in a position "RK045" in the data base of a navigation apparatus (not shown) according to the facility code of the 24th through 28th bytes.

In the case of the eighth page shown in FIG. 44, since the major classification code is set at "#", it is decided that the text 9 of this page is the program content, the item number of this page is "2" from the 2nd bit of the minor classification code and the facility is located in a position "RK066" in the data base of the navigation apparatus (not shown) according to the facility code of the 24th through 28th bytes.

In the case of the ninth page shown in FIG. 45, since the major classification code is set at """, the text 9 of this page is designated as the menu and the item number of this page is designated as "3" from the 7th bit of the minor classification code.

In the case of the tenth page shown in FIG. 46, since the major classification code is set at """, it is decided that the text 9 of this page is the menu and the item number of this page is "4" from the 8th bit of the minor classification code.

In the case of the eleventh page shown in FIG. 47, since the major classification code is set at """, it is decided that the text 9 of this page is the menu and the item number of this page is "5" from the 13th bit of the minor classification code.

Then, based on the control codes of the first through eleventh pages shown in FIGS. 38 through 47, the page of which major classification code is set at """ is retrieved. By using the first line of the text 9 of the retrieved page, an item list for classifying the information contents of FIGS. 38 through 47 every item is formed as shown in FIGS. 48 through 50.

In the case of the page of the item list shown in FIG. 48, since the major classification code is set at """, the text 9 of this page is designated as the menu and the item number of this page is designated as "1, 2" from the 5th and 6th bits of the minor classification code.

In the case of the page of the item list shown in FIG. 49, since the major classification code is set at """, the text 9 of this page is designated as the menu and the item number of this page is designated as "3, 4" from the 7th and 8th bits of the minor classification code.

In the case of the page of the item list shown in FIG. 50, since the major classification code is set at """, the text 9 of this page is designated as the menu and the item number of this page is designated as "5" from the 13th bit of the minor classification code.

When "5. entertainment" is selected from the menu program (FIGS. 35 through 37), the item list (FIGS. 48 through 50) for classifying the contents of the entertainment program every item is displayed on the display unit 6.

Therefore, when, for example, "★ driver message board" is selected from the item list by a cursor operation or the like, the page on which its item number is set at "1" and the letters of "driver message board" exist in the first line of the text 9, or the page on which its major classification code is """ (FIG. 39) is retrieved from the information of FIGS. 38 through 47, and the retrieved page as shown in FIG. 39 is displayed in the form of its contents.

Furthermore, when, for example, "★Today's restaurant" is selected from the item list by a cursor operation or the like, the page on which its item number is set at "2" and the letters of "today's restaurant" exist in the first line of the text 9, or the page on which its major classification code is """ (FIG. 40) is retrieved from the information of FIGS. 38 through 47, and the retrieved page is displayed in the form of its contents. By a subsequent page turning operation, the contents shown in FIGS. 41 through 44 are successively displayed.

Thus, by forming the item list for classifying the information of the conventional one program every item based on the control code and displaying the contents of the item selected from the item list, the desired information can be immediately displayed by a simple operation.

Furthermore, the control code (updating time processing code) for specifying whether the received data prior to the updating is to be saved or not saved is attached to the transmission data. Therefore, necessary received data is automatically stored at the receiving side, so that the user's trouble can be saved. Furthermore, the control code indicating whether or not the information has been updated is attached likewise. Therefore, the updating frequency of the saved data can be easily confirmed, and from this point of view, the user's trouble can be saved.

Furthermore, the facility code for specifying a facility is attached to the transmission data. Therefore, the position of the facility can be specified by the facility code in the navigation apparatus, and the position can be displayed on the map.

Fourth embodiment

An information transmitting apparatus and information receiving apparatus according to a fourth embodiment of the first, second, and sixteenth through twenty-first aspects of the present invention will be described with reference to FIGS. 51 through 58.

In the figures, a portable telephone 15 can be connected to the receiving apparatus 2. To the transmitting apparatus 3 is inputted, for example, data in a format as shown in FIG. 52 as literal information from the input apparatus 5. The data is comprised of a header 8 for designating the transmission origin and the characteristic of information and text content 9 of the information. To the header 8 is attached a facility code 30 for executing display control by specifying the position of the facility in displaying the position of the facility relevant to the information of the text. For this facility code 30, a telephone number of the facility or a code corresponding to it is adopted.

To the left end of the facility code 30 is attached an automatic dialing code ("T") representing that an automatic dialing calling operation can be executed from the portable telephone 15 by the receiving apparatus 2 based on the facility code 30. When the automatic dialing cannot be executed, a code "C" is attached. Further, the reference numeral 32 denotes a specified symbol mark indicating whether or not the apparatus is connected with the facility entered in the information while the literal information is displayed by the receiving apparatus 2. During the connection, this indication blinks.

The receiving apparatus 2 is provided with a display unit 6 for displaying the literal information and the position information (map information) of the facility that are received, and the page on display, display position, display time of the literal information and the rate of display between the literal information and the map information at the display unit 6 can be arbitrarily changed.

As shown in FIGS. 54 and 55, it is acceptable to provide a receiving apparatus 2a which receives the literal information and displays it on a display unit 6a separately from a receiving apparatus 2b which receives the map information and displays it on a display unit 6b.

Further, the receiving apparatuses 2, 2a and 2b are provided with operating function keys 11, direction keys (cursor keys) 12 for moving the cursor and an operation decision key 13. The receiving apparatuses 2 and 2a are provided with a connector 16 for connecting a portable telephone 15 via a cable 14. Further, the receiving apparatuses 2 and 2b are connected to a storage device such as a CD-ROM, an IC card and a DVD (not shown), and facility information (position on the map, etc.) of a facility provided with the facility code 30 is read from the storage device.

The receiving apparatuses 2 and 2a have an automatic dialing function for making a telephone call to the facility by means of the portable telephone 15 based on the facility code of the displayed facility or the like, and the portable telephone 15 is provided with a display panel 17 for displaying the facility name and telephone number displayed on the display units 6 and 6a, an abbreviated dialing key 22, numeral keys 23 and a transmitting key 24. When the facility code is a code corresponding to the telephone number, the automatic dialing function has a function for restoring the code into the corresponding telephone number.

The operation of the above embodiment will be described next.

When literal information is received in the receiving apparatuses 2 and 2a, the map of the facility provided with the facility code 30 in the received information is retrieved from the storage device such as a CD-ROM and displayed on the display unit 6 or 6b, and the position information of the facility is read, so that the position is displayed by a specified mark (★) on the map on the display unit 6 or 6b.

Control operation in executing automatic dialing in the transmitting apparatus 3 will be described with reference to FIG. 57.

First, when teletext data is received by the receiving apparatuses 2 and 2a, the operation states of the operating keys 11, 12 and 13 are read (steps S1 and S2).

When there is neither updating operation of the display information nor specified turning-on operation of a "Tel" key for making a telephone call to a facility or the like in the information, and when an automatic dialing flag ("T") representing that an automatic dialing instruction can be effected from the receiving apparatuses 2 and 2a to the telephone 15 is attached and this flag is "1" (steps S3 through S5), the telephone number of the facility is retrieved and extracted based on the facility code from the storage device such as a CD-ROM or from the display information when the telephone number is entered in the display information (step S6).

Subsequently, the telephone 15 is instructed to effect automatic dialing to the telephone number that has been retrieved and extracted, so that an automatic dialing process is executed (step S7).

When the display updating operation is detected in step S3 and the display contents are updated (step S8) or when the turning-on operation of the above specified "Tel" key is not executed or a state in which the automatic dialing flag is not "1" is detected, the program flow proceeds to step S1 in either case.

The updating of the display contents will be further described with reference to FIG. 58.

When the display is updated to the contents of the designated page of the designated program, the facility code exists in the display information and the telephone is in course of connection to the facility consequent upon the operation of the keys 11, 12 and 13 (steps S11 through S13), the specified "Tel" mark indicating that the telephone is in course of connection blinks on the display units 6 and 6a. Then, a flag representing that the automatic dialing of the telephone 15 can be executed is set to "1" (step S15). When the facility code is not included in the information or when the telephone is not in course of connection, the above flag is set to "0" (step S16).

Thus, a periphery map of the above facility is displayed based on the facility code representing the position of the facility relevant to the information in the literal information, and the position of the facility is displayed on the map. The above arrangement can obviates the need for operating the navigation apparatus while referring to the display of the literal information, a note or the like, thereby allowing the user's trouble to be saved.

Furthermore, the facility code received from the package media such as the CD-ROM is retrieved, and therefore, the apparatus can consistently cope with the newest information by changing the media.

Furthermore, when the telephone number of the facility is used as the facility code, the trouble of setting a new facility code for each facility to form a data base can be eliminated, and a matching between the transmitting apparatus side and the receiving apparatus side can be automatically achieved.

Furthermore, a telephone call is made to the facility relevant to the information based on the facility code in the received literal information, and therefore, the trouble of making a telephone call to the facility in the displayed literal information can be saved.

Furthermore, the automatic dialing code indicating whether or not the automatic dialing to the facility can be executed by the telephone 15 is attached, and therefore, a display for indicating that the automatic dialing can be achieved can be displayed on the display units 6 and 6a of the receiving apparatus 2 based on this code.

Fifth embodiment

An information transmitting apparatus and information receiving apparatus according to a fifth embodiment of the first, second, and twenty-second through twenty-seventh aspects of the present invention will be described with reference to FIGS. 59 through 81.

In the figures, a receiving apparatus 2 is provided with a display unit 6 which serves as a display means for displaying received literal information. The display unit 6 is provided with display sections 7a and 7b for displaying a header 8 and a text 9 in three lines. In the display unit 6, a page on display, display position, display time and the like can be arbitrarily changed. The receiving apparatus 2 is provided with operating function keys 11, direction Keys (cursor keys) 12 for moving the cursor and the like, an operation decision key 13 and a speaker 28 for outputting an audio signal.

As shown in FIG. 61, the receiving apparatus 2 is provided with an antenna 16 for receiving a teletext signal transmitted from the transmitting apparatus 3, a tuner (receiving means) 18, a demodulator 19 for demodulating FM multiplex data from the received signal and a CPU (display control means) 20 for executing reception control of the tuner 18, display control based on a type code for identifying the type of information contents, a page symbol representing the page number of information, and an event code for specifying a facility relevant to the information contents, and other operations.

The CPU 20 is connected to an I/F 21 for connecting an external apparatus to the receiving apparatus 2, an IC card 22, a ROM 23 and a RAM 24 that serve as storage devices to and from which specified data are inputted and outputted. The receiving apparatus 2 is further connected to an audio converter 26 for converting the received literal information into an audio signal, and the audio signal is outputted from the speaker 28 via an amplifier 27.

The literal information transmitted from the transmitting apparatus 3 has a format as shown in FIG. 62, where each page is comprised of a header 8 for displaying the transmission origin and the like of the information and a text 9 for displaying the contents of the information and one program is comprised of a plurality of pages. It is to be noted that FIG. 62 shows the main menu of the transmission information of the broadcasting station. Further, one program is provided with a pseudo menu page having a selection item for selecting information and a content page corresponding to each selection item of the pseudo menu page.

The transmitting apparatus 3 is provided with a type code attaching means for attaching a type code for identifying the type of the information contents set every selection item to the header of the above content page and a page symbol attaching means for attaching a page symbol representing the page number of each selection item to the header of the content pages when there is a plurality of content pages of the selection item.

The above program is provided with an event page in which each type code and an event code for setting a facility or the like relevant to the information contents of the type code are displayed in an associating manner. To the header of the event page is attached a specific code representing the fact that the page is the event page by a specific code attaching means of the transmitting apparatus 3, so that literal information to which the specific code, type code and page symbol are attached is transmitted to the receiving apparatus 2 by a transmitting means.

As shown in FIG. 63, the header 8 is comprised of 31-byte data, and the information transmission origin (broadcasting station name) is recorded in the 1st through 15th bytes.

Then, in the 16th through 26th bytes, a program identifying letter string for identifying the information contents is recorded. In this case, since the text content is the "drive information", any of the five sorts of letter strings as shown in FIG. 64 is attached as the program identifying letter string.

Furthermore, in the 27th through 30th bytes, an index code to witch the specific code, type code and page symbol are attached is recorded.

The index code is set by a rule as shown in FIG. 65. In concrete, when the text content (attribute) of the page is a program title, a notice or the like from the broadcasting station, a 4-letter blank ("space") is attached as the index code.

When the text content (attribute) of the page is a sub-menu (pseudo menu) of the main menu, "MENU" is attached as the index code.

When the text content (attribute) of the page is the information contents of the program selected on the menu page, an English letter selection item for designating a program on the menu page is attached to the first letter from the left (leftmost end) of the index code. In this case, the "space" and an English letter other than "M" are used as the selection item.

Furthermore, when the text content (attribute) of the page is a program title, "-" is attached to the second letter from the left of the index code. When it is relevant to the same objects (event, facility or the like) as the information contents of another page, an additional number representing the number of objects is attached to the second letter from the left of the index code.

When the text content (attribute) of the page designates the execution of writing into the storage device of the receiving apparatus, "s" is attached to the third letter from the left of the index code. When it does not designate the execution of writing into the storage device, the "space" is attached to the third letter from the left of the index code.

Furthermore, in the case where the text content (attribute) of the page is part of information included in a plurality of pages, "*" or "0" is attached to the fourth letter from the left of the index code when the "(numeral)" representing the number of remaining information pages indicates the first page.

On the other hand, a telephone number which serves as the event code for specifying an event, a facility or the like relevant to the information contents of a program is recorded on the last page of the program. In the header on the last page, as shown in FIG. 66, the information transmission origin (broadcasting station name) is recorded in the 1st through 18th bytes, the program identifying letter string is recorded in the 19th through 28th bytes, and the version of the telephone number is recorded in the 29th and 30th bytes. It is to be noted that a three sorts of letter strings each comprised of eight letters as shown in FIG. 67 is attached to the program identifying letter string on the last page.

The operation of the receiving apparatus 2 of the present embodiment will be described next.

When information as shown in FIGS. 68 through 81 transmitted from the transmitting apparatus 3 is received in the receiving apparatus 2, a specified program is read from the IC card 22, the ROM 23 and RAM 24, and information display control is executed based on the header information of the received information by a specified key operation or the like, and literal information is displayed on the display unit 6. Further, the literal information is converted into an audio signal by the converter 26, and voice is outputted from the speaker 28.

In the case of the literal information shown in FIG. 68, since the program identifying letter string is "D-INFO:" and the retrieval code is the four-letter space letter from the header 8, it is decided that the text content is notice information from the broadcasting station representing the program title.

In the case of the literal information shown in FIG. 69, since the program identifying letter string is "D-INFO:" and the retrieval code is "MENU" from the header 8, it is decided that the text content is a sub-menu (pseudo menu) in a program of the drive information.

When "F" representing "special program of this week" is selected from the selection items "F, R, E and D" attached to each information name in the sub-menu, a page of which header retrieval code is provided with the selection item "F" is retrieved from the received information, and information content of "special program of this week" is displayed as shown in FIG. 70.

In the case of literal information shown in FIG. 70, since the program identifying letter string is "DINFO:" and the retrieval code is "F- 0" from the header 8, the user can recognize that the text content is the title page of the sub-program consequent upon the selection of the sub-menu "F" of the drive information, i.e., the first page of the information of each event provided by the sub-program, and the automatic storing is not executed in the receiving apparatus 2.

In the case of literal information shown in FIG. 71, since the program identifying letter string is "D-INFO:" and the retrieval code is "F1 *" from the header 8, it is decided that the text content is the first page of the first event information of the sub-program consequent upon the selection of the sub-menu "F" of the drive information, and the automatic storing is not executed in the receiving apparatus 2.

In the case of literal information shown in FIG. 74, since the program identifying letter string is "D-INFO:" and the retrieval code is "F1 1" from the header 8, it is decided that the text content is the first event information of the sub-program consequent upon the selection of the sub-menu "F" of the drive information, the number of remaining pages is 1, and the automatic storing is not executed in the receiving apparatus 2.

In the case of literal information shown in FIG. 73, since the program identifying letter string is "D-INFO:" and the retrieval code is "F1 0" from the header 8, it is decided that the text content is the first event information of the sub-program consequent upon the selection of the sub-menu "F" of the drive information, the number of remaining pages is 0, and the automatic storing is not executed in the receiving apparatus 2.

In the case of literal information shown in FIG. 74, since the program identifying letter string is "D-INFO:" and the retrieval code is "F2 *" from the header 8, it is decided that the text content is the first page of the second event information of the sub-program consequent upon the selection of the sub-menu "F" of the drive information, and the automatic storing is not executed in the receiving apparatus 2.

In the case of literal information shown in FIG. 75, since the program identifying letter string is "D-INFO:" and the retrieval code is "F2 2" from the header 8, it is decided that the text content is the second event information of the sub-program consequent upon the selection of the sub-menu "F" of the drive information, the number of remaining pages is 2, and the automatic storing is not executed in the receiving apparatus 2.

When "R" is selected in the sub-menu shown in FIG. 69, the information of which header retrieval code is provided with the selected item "R" is retrieved from the received information similarly to the above, and the selected information content of "recommended restaurant" is displayed.

In the case of literal information shown in FIG. 76, since the program identifying letter string is "D-INFO:" and the retrieval code is "R- 0" from the header 8, it is decided that the text content is the title page of the sub-program consequent upon the selection of the sub-menu "R" of the drive information and is the first page of the information of each event provided by the sub-program, and the automatic storing is not executed in the receiving apparatus 2.

In the case of literal information shown in FIG. 77, since the program identifying letter string is "D-INFO:" and the retrieval code is "R1 *" from the header 8, it is decided that the text content is the first page of the first event information of the sub-program consequent upon the selection of the sub-menu "R" of the drive information, and the automatic storing is not executed in the receiving apparatus 2.

In the case of literal information shown in FIG. 78, since the program identifying letter string is "D-INFO:" and the retrieval code is "R1 1" from the header 8, it is decided that the text content is the first event information of the sub-program consequent upon the selection of the sub-menu "R" of the drive information, the number of remaining pages is 1, and the automatic storing is not executed in the receiving apparatus 2.

In the case of literal information shown in FIG. 79, since the program identifying letter string is "D-INFO:" and the retrieval code is "R2 *" from the header 8, it is decided that the text content is the first page of the second event information of the sub-program consequent upon the selection of the sub-menu "R" of the drive information, and the automatic storing is not executed in the receiving apparatus 2.

In the case of literal information shown in FIGS. 80 and 81, since the program identifying letter string is "NaviCode" from the header 8, it is decided that the text content is the last page of the program in which the specific code for specifying the facility or the like relevant to the information content is entered, and its version is "00".

Thus, the type code corresponding to the selection item on the sub-menu page is attached to the header on the content page. Therefore, by retrieving the content page provided with the type code selected on the sub-menu page from the received information, the selected program contents can be easily displayed. Furthermore, it can be easily decided what item on the sub-menu page the information displayed on the content page is corresponding to, and this facilitates the user's convenience. That is, the user can easily know the meaning of the control code displayed at the header of the content page.

Furthermore, since the telephone number representing where to make contact of the facility and the like relevant to the information content is attached to the last page of the program, the display of the telephone number can be easily controlled in such a manner that the display of the telephone number is limited only to the time when the vehicle is stopped depending on the use conditions.

Furthermore, since the page symbol representing the page is attached to the header of the information comprised of a plurality of pages, the number of pages that are relevant to the information content on display and have not been displayed can be confirmed, so that the information can be prevented from escaping the user's attention.

Sixth embodiment

A sixth embodiment of the first, second, twenty-eighth, and thirty-first through thirty-third aspects of the present invention will be described with reference to FIGS. 82 through 89.

In the figures, a receiving apparatus 2 is provided with a display unit 6 for displaying received literal information. The display unit 6 is provided with display sections 7a and 7b for displaying the received information in three lines. In the display unit 6, the page on display, display position, display time and the like can be arbitrarily changed. The receiving apparatus 2 is provided with operating function keys 11, direction Keys (cursor keys) 12 for moving the cursor or the like, an operation decision key 13 and a speaker 28 for outputting an audio signal.

As shown in FIG. 84, the receiving apparatus 2 is further provided with an antenna 16 for receiving literal information transmitted from the transmitting apparatus 3, a tuner (receiving means) 18, a demodulator 19 for demodulating FM multiplex data from the received signal and a CPU 20 for executing reception control of the tuner 18.

The CPU 20 is connected to a navigation apparatus 30 via an I/F 29 and further to an audio converter 26 for converting the received literal information into an audio signal, so that voice is outputted from the speaker (voice output means) 28 via the amplifier 27.

Furthermore, the CPU 20 is connected to a ROM 23, a RAM 24 and an IC card 25 that serve as storage devices, in which reading of specified information such as a control program and writing of received information or the like are executed.

Then, the CPU 20 has an identification code registering function for registering a specified letter string in the received information such as "weather forecast" (refer to FIG. 85) as an identification code for identifying the type of the information content while associating it with a type code (processing code) such as "weather forecast . . . 2" (refer to FIG. 87) for designating a processing method corresponding to the information, and an information processing function for executing specified processing according to a type code set for the identification code on the received information when the letter string exists in the contents of the received information, such as audio conversion based on a dictionary corresponding to the identification code. Further, the CPU 20 displays the received information provided with the above specified letter string or the identification code immediately on the display means upon a specified switch operation corresponding to the identification code in so-called the one-touch display manner by the information processing function.

To the receiving apparatus 2 is transmitted, for example, data in a format as shown in FIG. 85 as literal information from the transmitting apparatus 3, and the data is comprised of a header 8 for designating the transmission origin (broadcasting station name) and characteristics of information and the text 9 of the information.

In the data shown in FIG. 85, the transmission origin of the information is expressed by the "fm osaka visual radio", and the information content is expressed by the letter string "weather forecast".

The operation of the receiving apparatus 2 of the present embodiment will be described next.

First, registration of the identification code is executed according to a procedure as shown in FIG. 86. When the weather information program is selected on the menu page in the receiving apparatus 2, for example, a program content as shown in FIG. 85 is received and displayed (step A1). In this case, a specified letter string entered in the header of the page, e.g., the "weather forecast" is selected as the identification code by a key operation (step A2), and subsequently the type code "weather forecast . . . 2" for designating the information processing corresponding to the identification code is selected from the selection menu screen as shown in FIG. 87 and then set (step A3). Then, the identification code "weather forecast" and the type code "weather forecast . . . 2" are associated with each other to be stored and registered in the RAM 24.

Next, the information processing based on the identification code and the type code is executed as follows. When information is received in the receiving apparatus 2 (step B1), it is decided whether or not the letters of "weather forecast" exists in the header of the received information based on the association between the identification code and the type code that have been stored and registered in a manner as above. When the letters are existing, it is decided that the received information is the type to be subjected to execution of information processing as weather forecast, and accordingly the information is stored into a memory area for weather forecast in the RAM 24 (steps B2 and B3). When the type of the received information is not weather forecast, it is decided whether or not the information is traffic information. When the information is traffic information, it is stored in a memory area for traffic information (steps B4 and B5). When it is neither one of them, the information is stored in a normal memory area (step B6).

Then, after the registration of the identification code and the storing of the received information are completed, when a specified key operation is executed by, for example, depressing a designation switch one time to designate the display of traffic information (step C1), the stored information is read from the memory area in which the traffic information has been stored to be displayed in a one-touch motion (step C2), and the audio conversion dictionary is switched to the one for traffic information (step C3). When an instruction to output voice is issued, the information is converted into an audio signal and then outputted from the speaker 28 (steps C4 and C5).

Furthermore, when a specified key operation is executed in step C1 by, for example, depressing the designation switch two times to issue an instruction to display the weather forecast (step C1), the stored information is read from the memory area in which the weather forecast data has been stored. Subsequent to one-touch display, the conversion dictionary is switched (steps C6 and C7), and then the audio conversion and voice output are executed based on the instruction to output voice (steps C4 and C5).

Thus, the specified letter string in the received information is made to be the identification code for identifying the type of the information content, and it is registered as associated with the type code for designating the information processing corresponding to the type of the information. When the same letter string as the registered identification code exists in the header of the received information, storage of the information designated by the type code corresponding to the identification code, the one-touch display and the audio conversion output by means of the conversion dictionary corresponding to the information are executed. With this arrangement, display and voice output of the literal information by a simple operation can be achieved, an improved audio conversion efficiency can be achieved, and voice output can be achieved by appropriate reading corresponding to the information content.

Seventh embodiment

Next, an information receiving apparatus according to a seventh embodiment of the first, second and twenty-ninth aspects of the present invention will be described with reference to FIGS. 82 through 85 and 90. FIG. 90 is a view showing an association between the identification code and the type code (processing code).

The user executes the operation of associating the identification code with the type code by a cursor operation in the sixth embodiment. In contrast to the above, according to the seventh embodiment, the operation of associating the identification code with the type code is executed by a table data read from an external storage medium.

According to the receiving apparatus 2 of the seventh embodiment, the table data shown in FIG. 90 in which the identification code for identifying the type of the contents of the received information and the type code (processing code) for designating the information processing method corresponding to the identification code are recorded is read via a navigation apparatus 30 connected via an I/F 29.

When any of the identification codes on the table data exists in the header of the received information, the CPU 20 functions as an information processing means for executing specified information processing designated by the type code of the table data on the information of the page in which the identification code exists.

When the information shown in FIG. 85 is received in the receiving apparatus 2 of the present embodiment, the "weather forecast" of the header 8 coincides with the "weather forecast" of the table data shown in FIG. 90. Consequently, the specified information processing designated by its type code "2 . . . weather forecast" is executed. In this case, the same information processing as that of the sixth embodiment, i.e., the information storing, one-touch display, dictionary switching and subsequent voice output are executed.

By thus reading the table data in which the identification code and the type code (processing code) for designating the information processing method corresponding to it are recorded from the external storage medium via the navigation apparatus 30, the trouble of registering the identification code as in the sixth embodiment can be saved. It is of course acceptable to directly read the table data from an IC card 25 or the like without interposition of the external apparatus.

Eighth embodiment

An information transmitting apparatus and information receiving apparatus according to an eighth embodiment of the first, second, thirtieth, and thirty-fourth aspects of the present invention will be described with reference to FIGS. 82 through 85 and 91. FIG. 91 is a view showing an example of information transmitted from the transmitting apparatus 3.

The table data is read from the external storage medium in the seventh embodiment. In contrast to the above, according to the eighth embodiment, the table data is transmitted from the transmitting apparatus.

The information shown in FIG. 91 is transmitted by the transmitting means of the transmitting apparatus 3. The identification code "D-INFO:" of the header designates the fact that the information is drive information, and "SC" designates the execution of storing and registering the information of this page as an identification code. Further, the association between the identification code and the type code of the information transmitted from the transmitting apparatus 3 is set in the text. In concrete, the type code of the information of which header is provided with the letter string "TRAFFIC NEWS" is designated as "1", while the type code of the information of which header is provided with the letter string "weather forecast" is designated as "2". The type codes "1" and "2" indicate the execution of the same information processing as those of "traffic information" and "weather forecast", respectively, as in the first and second embodiments.

When the information shown in FIG. 85 is transmitted from the transmitting apparatus 3 and received in the receiving apparatus 2 of the present embodiment, since the identification code "weather forecast" exists in the header 8, the type code of the received information shown in FIG. 85 is set to "2". Then the specified processing corresponding to the code is executed, and the storing of information content, one-touch display, dictionary switching and subsequent voice output are executed similarly to the first and second embodiments.

Thus, the literal information provided with the association data (table data) representing the association between the identification code and the processing code and the information content data is received. When any of the identification codes recorded in the association data exists in the header of the content data, the information processing designated by the processing code corresponding to the identification code is executed on the text of the content data. The above arrangement can save the user's trouble of registering the association between the identification code and the processing code as in the first embodiment, and obviates the need for the maintenance and management of the external storage medium as in the second embodiment such as the IC card 25.

In the present case, the first and second aspects of the present invention are not limited to the third through thirty-fourth aspects of the present invention, but includes the following information transmitting apparatuses and information receiving apparatuses (1) through (20) as described below.

(1) An information transmitting apparatus 903, as shown in FIG. 100, for transmitting information such as literal information to an external receiving apparatus 902 by means of an electronic wave of multiplexed text broadcasting or the like, comprising: a facility code attaching means 950 for attaching to the transmission information a facility code for executing display control of the position of the facility relevant to the transmission information; a version code attaching means 951 for attaching to the transmission information a version code for designating the version of a storage means 957 in the information receiving apparatus 902 that stores detailed information of the facility; and a transmitting means 954 for transmitting the information to which the above codes are attached.

(2) The apparatus of above (1) further comprising: an additional code attaching means 952 for attaching to the transmission information an additional code representing that the detailed information in the storage means 957 of the designated version is additional information for the data of the old version; and an updating code attaching means 953 for attaching to the transmission information an updating code representing that the detailed information of the designated version in the storage means 957 is updating information for the old version.

(3) The apparatus of above (1) or (2), further comprising a time limit code attaching means 959 for attaching a time limit code for designating the term of validity of the version code to the transmission information.

(4) An information receiving apparatus 902, as shown in FIG. 100, for receiving and displaying information such as literal information transmitted from an external information transmitting apparatus 1003 by means of a radio wave of multiplexed text broadcasting or the like, comprising: a receiving means 955 for receiving the transmission information; a display means 956 for displaying the received information; a storage means 957 storing therein the detailed information and the version of a specified facility; and a display control means 958 operating, in the case where the facility code and the version code exist in the received information, to display the detailed information stored in the storage means 957 on the display means 956 when the version designated by the version code and the version of the storage means 957 coincide with each other and, when they do not coincide with each other, to display the information of the fact.

(5) The apparatus of above (4), wherein the display control means 958 displays on the display means 956 the fact that the detailed information of the above facility is attached when the version designated by the version code and the version of the storage means 957 do not coincide with each other and the additional code exists in the received information, or displays the fact that the detailed information of the above facility has been updated when the version designated by the version code and the version of the storage means 957 do not coincide with each other and the updating code exists in the received information.

(6) The apparatus of above (4) or (5), wherein, when the time limit code exists in the received information, the display control means 958 displays the term of validity of the storage means 957 on the display means 956 based on the time limit code.

(7) An information transmitting apparatus 1003, as shown in FIG. 101, for transmitting literal information to an external receiving apparatus 1002 by means of a radio wave, comprising: a scrambling means 1050 for scrambling at least part of the literal information; a descrambling instruction data attaching means 1051 for attaching to the literal information a descrambling instruction data which executes descrambling and has been updated every specified interval in the receiving apparatus 1002 while associating it with version data representing the updating stage; and a transmitting means 1052 for transmitting literal information which has undergone the scrambling process and to which a specified descrambling instruction data is attached.

(8) The apparatus of above (7), wherein the descrambling instruction data attaching means 1051 attaches descrambling instruction data to the literal information every program.

(9) An information receiving apparatus 1002, as shown in FIG. 101, for receiving and displaying literal information transmitted from an external transmitting apparatus 1003 by means of a radio wave, comprising: a receiving means 1053 for receiving the transmitted literal information; a display means 1055 for displaying the received literal information; a storage means 1056 for storing versions in a plurality of stages for descrambling and descrambling data corresponding to them; a descrambling means 1054 operating, when the received information is scrambled and the descrambling instruction data is attached thereto, to execute descrambling based on a descrambling execution data according to the instruction of the descrambling instruction data; and a display control means 1057 for displaying descrambled literal information on the display means 1055.

(10) The apparatus of above (9), wherein, the descrambling means 1054 descrambles the information based on the descrambling execution data corresponding to the version data when the descrambling execution data corresponding to the version data in the received information is stored in the storage means 1056, and the display control means 1057 displays the requirement for updating the storage means 1056 on the display means 1055 when the descrambling execution data corresponding to the version data in the received information is not stored in the storage means 1056.

(11) A storage medium of the information receiving apparatus 1002, as shown in FIG. 101, for receiving and displaying literal information transmitted from an external transmitting apparatus 1003, wherein the descrambling execution data for executing descrambling is stored as associated with version data representing the updating stage.

(12) The apparatus of above (5), wherein the descrambling execution data and the version data are stored every broadcasting station or every combination of the broadcasting station and each program.

(13) An information transmitting apparatus 1103, as shown in FIG. 102, for transmitting literal information comprised of a plurality of pages to an external receiving apparatus 1102 by means of a radio wave of multiplexed text broadcasting or the like, comprising: a type code attaching means 1150 for attaching a type code representing the fact that the information is relevant to a common facility, a common event or the like to the header of each page; and a transmitting means 1151 for transmitting literal information to which the type code is attached.

(14) An information receiving apparatus 1102, as shown in FIG. 102, for receiving and displaying literal information transmitted from an external information transmitting apparatus 1103 by means of a radio wave of multiplexed text broadcasting, comprising: a receiving means 1153 for receiving the transmitted literal information; a display means 1154 for displaying the received literal information; a storage means 1155 for storing the received literal information; a storage control means 1156 operating, when a type code representing that the information is relevant to a common facility, a common event or the like exists in the header of each page of the received literal information, to store the information of all the pages provided with the same type code based on an external storing instruction into the storage means 1155; and a display control means 1157 for displaying the information stored in the storage means 1155 on the display means 1154 based on an external display instruction.

(15) An information receiving apparatus 1202, as shown in FIG. 103, for receiving and displaying information which is transmitted from an external transmitting apparatus 1203 by means of a radio wave of multiplexed text broadcasting or the like and is comprised of a header for displaying the information transmission origin and the like and a text for displaying the information content, comprising: a receiving means 1250 for receiving the transmitted information; a display means 1251 for displaying the received information; and a display control means 1252 operating, when event codes for specifying a facility and the like relevant to the received information are collectively attached to the text of a specified page, to display on the display means 1251 the event code at the header of the page in which the information relevant to the event code is entered.

(16) The apparatus of above (15), wherein when the event code is the telephone number the display control means 1252 displays it as it is at the header, and when the event code is coded the means displays it at the header by restoring it into a meaningful letter string.

(17) An information receiving apparatus 1202, as shown in FIG. 103, for receiving and displaying information which is transmitted from an external transmitting apparatus 1203 by means of a radio wave of multiplexed text broadcasting or the like and is comprised of a header for displaying the information transmission origin and the like and a text for displaying the information content, comprising: a receiving means 1253 for receiving the transmitted information; a display means 1254 for displaying the received information; a display control means 1255 operating, when an event code for specifying a facility or the like relevant to the received information is attached as an invisible letter, to display on the display means 1254 the event code as a normal invisible letter at the header of the page in which the information relevant to the event code is entered.

(18) The apparatus of either one of above (15) through (17), wherein the display control means 1252 and 1255 display the event code on the display means 1251 and 1254 only when the vehicle is stopped.

(19) The apparatus of either one of above (15) through (18), comprising: an audio output means 1256 for converting the display information into voice and outputting the same; and an audio output control means 1257 for outputting an audio output to the audio output means 1256 only when the vehicle is stopped.

(20) The apparatus of either one of above (15) through (19), comprising a storage control means 1258 for attaching the received event code as a recognizable letter to the header of the page in which the information relevant to the code is entered and storing it together with the text content of the page.

What is claimed is:

1. An information transmitting apparatus for transmitting information to an external receiving apparatus by means of a radio wave, comprising:

a control information attaching means for attaching control information, representing a control processing method on the receiving apparatus side of the information, to said information to be transmitted; and a transmitting means for transmitting information to which said control information is attached;

wherein said apparatus is characterized by at least one of the following of (a) and (b):

(a) said control information includes a telephone number of a facility relevant to said transmitted information or a code corresponding to said telephone number; and (b) said transmitted information comprises a pseudo menu page having a selection item for selecting information and a content page corresponding to each selection item of said pseudo menu page, said content page comprises a header for displaying an information transmission origin and a text for displaying information content, and said control information attaching means attaches to the header of said content page a type code for identifying the type of information content corresponding to each selection item, and wherein said control information attaching means attaches to said information to be transmitted an identification code representing a type of said information and an index code representing an attribute of said information.

2. An information receiving apparatus, for receiving and displaying information transmitted from an external transmitting apparatus by means of a radio wave, comprising:

a receiving means for receiving said transmitted information; a display means for displaying said received information; and information processing means operating, when control information representing a control processing method of said received information is attached to said received information, to execute information processing according to said control information;

wherein based on said control information said information processing means performs at least one of the following (a) through (e) operations:

(a) when an identification code representing a type of said information and an index code representing an attribute of said information is attached to said received in formation, retrieving inform ation entered in different pages of an identical program, retrieving information entered in different programs, or retrieving information relevant to said received information from information of an external apparatus, and executing a specified associating operation to display the resulting inform ation as a series of information on the display means or to output the information to an external apparatus;

(b) executing engine combustion control, speed change control, or suspension control by means of a vehicle control apparatus;

(c) controlling a vehicle and deciding the validity of correcting control of said vehicle based on an external vehicle state detection signal;

(d) when a page symbol representing a page number of information comprised of a type code for identifying a type of information content and a plurality of pages exists in the received information, displaying said type code and page symbol on said display means; and (e) converting the received information provided with a specified letter string or an identification code into voice according to a dictionary corresponding to said identification code; and wherein, when an identification code representing a type of said information and an index code representing an attribute of said information are attached to the received information, said information processing means executes selection between software processes or selection of hardware according to a combination of said identification code and index code.

3. An information receiving apparatus as claimed in claim 2, wherein, based on the combination of said identification code and said index code, said information processing means retrieves information entered in different pages of an identical program, information entered in different programs, or information relevant to said received information from information of an external apparatus, and executes a specified associating operation to display the resulting information as a series of information on the display means or output the information to an external apparatus.

4. An information receiving apparatus as claimed in claim 2, wherein, based on the combination of said identification code and said index code, said information processing means retrieves information relevant to said received information from a data base owned by said receiving apparatus or an external apparatus, executes a specified associating operation to display the resulting information as a series of information on the display means or output the information to an external apparatus.

5. An information receiving apparatus as claimed in claim 2, wherein, based on the combination of said identification code and said index code, said information processing means executes engine combustion control, speed change control, suspension control and the like by means of a vehicle control apparatus.

6. An information receiving apparatus as claimed in claim 2, wherein said information processing means controls a vehicle and decides the validity of correcting control of said vehicle based on an external vehicle state detection signal.

7. An information receiving apparatus as claimed in any of claims 2 through 6, comprising a registering means for registering a specified letter string in the received information as either one or both of said identification code and index code.

8. An information transmitting apparatus for transmitting information to an external receiving apparatus by means of a radio wave, comprising:

a control information attaching means for attaching control information, representing a control processing method on the receiving apparatus side of the information, to said information to be transmitted; and a transmitting means for transmitting information to which said control information is attached;

wherein said apparatus is characterized by at least one of the following of (a) and (b):

(a) said control information includes a telephone number of a facility relevant to said transmitted information or a code corresponding to said telephone number; and (b) said transmitted information comprises a pseudo menu page having a selection item for selecting information and a content page corresponding to each selection item of said pseudo menu page, said content page comprises a header for displaying an information transmission origin and a text for displaying information content, and said control information attaching means attaches to the header of said content page a type code for identifying the type of information content corresponding to each selection item; and wherein said control information attaching means attaches control literal information comprised of letters which can be displayed for executing display control of a position on a map to said information to be transmitted.

9. An information receiving apparatus for receiving and displaying information transmitted from an external transmitting apparatus by means of a radio wave, comprising:

a receiving means for receiving said transmitted information; a display means for displaying said received information; and information processing means operating, when control information representing a control processing method of said received information is attached to said received information, to execute information processing according to said control information;

wherein based on said control information, said information processing means performs at least one of the following (a) through (e) operations:

(a) when an identification code representing a type of said information and an index code representing an attribute of said information is attached to said received information, retrieving information entered in different pages of an identical program, retrieving information entered in different programs, or retrieving information relevant to said received information from information of an external apparatus, and executing a specified associating operation to display the resulting information as a series of information on the display means or to output the information to an external apparatus;

(b) executing engine combustion control, speed change control, or suspension control by means of a vehicle control apparatus;

(c) controlling a vehicle and deciding the validity of correcting control of said vehicle based on an external vehicle state detection signal;

(d) when a page symbol representing a page number of information comprised of a type code for identifying a type of information content and a plurality of pages exists in the received information, displaying said type code and page symbol on said display means; and (e) converting the received information provided with a specified letter string or an identification code into voice according to a dictionary corresponding to said identification code, and wherein when control literal information comprised of letters which can be displayed for executing display control of a position on a map is attached to the received information, said information processing means controls the display position on the map based on the control literal information.

10. An information transmitting apparatus for transmitting information to an external receiving apparatus by means of a radio wave, comprising:

a control information attaching means for attaching control information, representing a control processing method on the receiving apparatus side of the information, to said information to be transmitted; and a transmitting means for transmitting information to which said control information is attached;

wherein said apparatus is characterized by at least one of the following of (a) and (b):

(a) said control information includes a telephone number of a facility relevant to said transmitted information or a code corresponding to said telephone number; and said transmitted information comprises a pseudo menu page having a selection item for selecting information and a content page corresponding to each selection item of said pseudo menu page, said content page comprises a header for displaying an information transmission origin and a text for displaying information content, and said control information attaching means attaches to the header of said content page a type code for identifying the type of information content corresponding to each selection item; and wherein, for information comprised of a header for displaying an information transmission origin and a text for displaying information content, said control information attaching means attaches to the header a control code which serves as an identifier for identifying the characteristic of the information content of the text.

11. An information transmitting apparatus as claimed in claim 10, wherein said control code attaching means attaches an updating time processing code for instructing whether received data is to be saved or not saved in an data updating time.

12. An information receiving apparatus, for receiving and displaying information transmitted from an external transmitting apparatus by means of a radio wave, comprising:

a receiving means for receiving said transmitted information; a display means for displaying said received information; and information processing means operating, when control information representing a control processing method of said received information is attached to said received information, to execute information processing according to said control information;

wherein based on said control information, said information processing means performs at least one of the following (a) through (e) operations:

(a) when an identification code representing a type of said information and an index code representing an attribute of said information is attached to said received information, retrieving information entered in different pages of an identical program, retrieving information entered in different programs, or retrieving information relevant to said received information from information of an external apparatus, and executing a specified associating operation to display the resulting information as a series of information on the display means or to output the information to an external apparatus;

(b) executing engine combustion control, speed change control, or suspension control by means of a vehicle control apparatus;

(c) controlling a vehicle and deciding the validity of correcting control of said vehicle based on an external vehicle state detection signal;

(d) when a page symbol representing a page number of information comprised of a type code for identifying a type of information content and a plurality of pages exists in the received information, displaying said type code and page symbol on said display means; and (e) converting the received information provided with a specified letter string or an identification code into voice according to a dictionary corresponding to said identification code; and for information comprised of a header for displaying an information transmission origin and a text for displaying information content, and a control code being attached as an identifier for identifying the characteristic of the information content of the text to the header, the apparatus comprises: an item list forming means for forming an item list representing received information content based on said control code; and a display means for displaying said item list and an information content of an item selected from said list.

13. An information receiving apparatus as claimed in claim 12, comprising: a received data saving means for processing received data prior to updating based on an updating time processing code.

14. An information transmitting apparatus for transmitting information to an external receiving apparatus by means of a radio wave, comprising:

a control information attaching means for attaching control information, representing a control processing method on the receiving apparatus side of the information, to said information to be transmitted; and a transmitting means for transmitting information to which said control information is attached;

wherein said apparatus is characterized by at least one of the following of (a) and (b):

(a) said control information includes a telephone number of a facility relevant to said transmitted information or a code corresponding to said telephone number; and (b) said transmitted information comprises a pseudo menu page having a selection item for selecting information and a content page corresponding to each selection item of said pseudo menu page, said content page comprises a header for displaying an information transmission origin and a text for displaying information content, and said control information attaching means attaches to the header of said content page a type code for identifying the type of information content corresponding to each selection item; and said apparatus further comprises a dialing code attaching means for attaching to the inside of said literal information an automatic dialing code indicating whether or not automatic dialing to the facility relevant to said facility code can be effected based on said facility code by means of a receiving apparatus having an automatic dialing function.

15. An information receiving apparatus for receiving and displaying information transmitted from an external transmitting apparatus by means of a radio wave, comprising:

a receiving means for receiving said transmitted information; a display means for displaying said received information;

information processing means operating, when control information representing a control processing method of said received information is attached to said received information, to execute information processing according to said control information; and a map display control means operating. when a facility code for executing display control of a position of a facility relevant to the information is attached to the inside of the received information to display the position of the facility on a map display means based on said facility code;

wherein based on said control information, said information processing means performs at least one of the following (a) through (e) operations:

(a) when an identification code representing a type of said information and an index code representing an attribute of said information is attached to said received information, retrieving information entered in different pages of an identical program, retrieving information entered in different programs, or retrieving information relevant to said received information from information of an external apparatus, and executing a specified associating operation to display the resulting information as a series of information on the display means or to output the information to an external apparatus;

(b) executing engine combustion control, speed change control, or suspension control by means of a vehicle control apparatus;

(c) controlling a vehicle and deciding the validity of correcting control of said vehicle based on an external vehicle state detection signal;

(d) when a page symbol representing a page number of information comprised of a type code for identifying a type of information content and a plurality of pages exists in the received information, displaying said type code and page symbol on said display means; and (e) converting the received information provided with a specified letter string or an identification code into voice according to a dictionary corresponding to said identification.

16. An information receiving apparatus as claimed in claim 15, wherein said map display means for displaying the position of the facility is constructed separately from said receiving apparatus.

17. An information receiving apparatus as claimed in claim 15 or 16, comprising: a telephone connecting means for connecting a telephone; and an automatic dialing means operating, based on said received facility code, to make a telephone call to a facility corresponding to said facility code.

18. An information transmitting apparatus for transmitting information to an external receiving apparatus by means of a radio wave, comprising:

a control information attaching means for attaching control information, representing a control processing method on the receiving apparatus side of the information, to said information to be transmitted; and a transmitting means for transmitting information to which said control information is attached;

wherein said apparatus is characterized by at least (b) of the following of (a) and (b):

(a) said control information includes a telephone number of a facility relevant to said transmitted information or a code corresponding to said telephone number; and (b) said transmitted information comprises a pseudo menu page having a selection item for selecting information and a content page corresponding to each selection item of said pseudo menu page, said content page comprises a header for displaying an information transmission origin and said text for displaying information content, and said control information attaching means attaches to said header of said content page a type code for identifying the type of information content corresponding to each selection item.

19. An information transmitting apparatus as claimed in claim 18, wherein said control information attaching means makes a first letter or symbol of said type code coincide with a letter or symbol attached to each selection item of said pseudo menu page.

20. An information transmitting apparatus as claimed in claim 18 or 19, for said selection item content page comprised of a plurality of pages, wherein said control information attaching means comprises a page symbol attaching means for attaching a page symbol representing a page number of each selection item to the header of said content page.

21. An information transmitting apparatus as claimed in claims 18 or 19, wherein said control information attaching means comprises a specific code attaching means for attaching to a header of an event page in which said each type code and an event code for specifying a facility or the like relevant to the information content of said type code are displayed in an associating manner a specific code representing the fact that page is the event page.

22. An information transmitting apparatus as claimed in claim 20, wherein said control information attaching means comprises a specific code attaching means for attaching to a header of an event page in which said each type code and an event code for specifying a facility or the like relevant to the information content of said type code are displayed in an associating manner a specific code representing the fact that page is the event page.

23. An information receiving apparatus for receiving and displaying information transmitted from an external transmitting apparatus by means of a radio wave, comprising:

a receiving means for receiving said transmitted information; a display means for displaying said received information; and information processing means operating, when control information representing a control processing method of said received information is attached to said received information, to execute information processing according to said control information;

wherein, when a page symbol representing a page number of information comprised of a type code for identifying a type of information content and a plurality of pages exists in the received information, said information processing means displays said type code and page symbol on said display means; and wherein based on said control information, said information processing means further performs at least one of the following (a) through (d) operations:

(a) when an identification code representing a type of said information and an index code representing an attribute of said information is attached to said received information, retrieving information entered in different pages of an identical program, retrieving information entered in different programs, or retrieving information relevant to said received information from information of an external apparatus, and executing a specified associating operation to display the resulting information as a series of information on the display means or to output the information to an external apparatus;

(b) executing engine combustion control, speed change control, or suspension control by means of a vehicle control apparatus;

(c) controlling a vehicle and deciding the validity of correcting control of said vehicle based on an external vehicle state detection signal; and (d) converting the received information provided with a specified letter string or an identification code into voice according to a dictionary corresponding to said identification code.

24. An information receiving apparatus as claimed in claim 23, wherein, when said specific code exists in the received information, said information processing means limits display of a page having said specific code to only a time when a vehicle is stopped.

25. An information receiving apparatus for receiving and displaying information transmitted from an external transmitting apparatus by means of a radio wave, comprising:

a receiving means for receiving said transmitted information; a display means for displaying said received information;

information processing means operating, control information representing a control processing method of said received information is attached to said received information, to execute information processing according to said control information; and an identification code registering means for registering a specified letter string in the received information as an identification code for identifying a type of information content, wherein said information processing means executes specified processing corresponding to said identification code on said received information when said letter string exists in said received information; and wherein based on said control information, said information processing means performs at least one of the following (a) through (e) operations:

(a) when an identification code representing a type of said information and an index code representing an attribute of said information is attached to said received information, retrieving information entered in different pages of an identical program, retrieving information entered in different programs, or retrieving information relevant to said received information from information of an external apparatus, and executing a specified associating operation to display the resulting information as a series of information on the display means or to output the information to an external apparatus;

(b) executing engine combustion control, speed change control, or suspension control by means of a vehicle control apparatus;

(c) controlling a vehicle and deciding the validity of correcting control of said vehicle based on an external vehicle state detection signal;

(d) when a page symbol representing a page number of information comprised of a type code for identifying a type of information content and a plurality of pages exists in the received information, displaying said type code and page symbol on said display means; and (e) converting the received information provided with a specified letter string or an identification code into voice according to a dictionary corresponding to said identification code.

26. An information receiving apparatus for receiving and displaying information transmitted from an external transmitting apparatus by means of a radio wave, comprising:

a receiving means for receiving said transmitted information; a display means for displaying said received information;

information processing means operating, control information representing a control processing method of said received information is attached to said received information, to execute information processing according to said control information; and a table reading means for reading from an external storage medium a table data in which an identification code for identifying a type of information content and a processing code for designating an information processing method for said identification code are recorded, wherein when said identification code exists in the received information said information processing means executes information processing designating by a processing code corresponding to said identification code on said received information; and wherein based on said control information, said information processing means performs at least one of the following (a) through (e) operations:

(a) when an identification code representing a type of said information and an index code representing an attribute of said information is attached to said received information, retrieving information entered in different pages of an identical program, retrieving information entered in different programs, or retrieving information relevant to said received information from information of an external apparatus, and executing a specified associating operation to display the resulting information as a series of information on the display means or to output the information to an external apparatus;

(b) executing engine combustion control, speed change control, or suspension control by means of a vehicle control apparatus;

(c) controlling a vehicle and deciding the validity of correcting control of said vehicle based on an external vehicle state detection signal;

(d) when a page symbol representing a page number of information comprised of a type code for identifying a type of information content and a plurality of pages exists in the received information, displaying said type code and page symbol on said display means; and (e) converting the received information provided with a specified letter string or an identification code into voice according to a dictionary corresponding to said identification.

27. An information receiving apparatus for receiving and displaying information transmitted from an external transmitting apparatus by means of a radio wave, comprising:

a receiving means for receiving said transmitted information; a display means for displaying said received information; and information processing means operating, control information representing a control processing method of said received information is attached to said received information, to execute information processing according to said control information;

wherein based on said control information, said information processing means performs at least one of the following (a) through (e) operations:

(a) when an identification code representing a type of said information and an index code representing an attribute of said information is attached to said received information, retrieving information entered in different pages of an identical program, retrieving information entered in different programs, or retrieving information relevant to said received information from information of an external apparatus, and executing a specified associating operation to display the resulting information as a series of information on the display means or to output the information to an external apparatus;

(b) executing engine combustion control, speed change control, or suspension control by means of a vehicle control apparatus;

(c) controlling a vehicle and deciding the validity of correcting control of said vehicle based on an external vehicle state detection signal;

(d) when a page symbol representing a page number of information comprised of a type code for identifying a type of information content and a plurality of pages exists in the received information, displaying said type code and page symbol on said display means; and (e) converting the received information provided with a specified letter string or an identification code into voice according to a dictionary corresponding to said identification code; and wherein, when an association data representing association between an identification code for identifying a type of information content and a processing code for designating an information processing method corresponding to said identification code exists in the received information. said information processing means operates, when an identification code entered in said association data exists in said received information, to execute information processing designated by a processing code corresponding to said identification code on said received information.

28. An information receiving apparatus as claimed in any of claims 25 through 27, wherein said information processing means comprises a voice output means for converting received information provided with said specified letter string or said identification code into an audio signal according to a converting method corresponding to said identification code and outputting said converted signal.

29. An information receiving apparatus as claimed in claim 28, wherein said information processing means converts the received information provided with said specified letter string or said identification code into voice according to said dictionary corresponding to said identification code.

30. An information receiving apparatus as claimed in any of claims 25 through 27, wherein said information processing means displays the received information provided with said specified letter string or said identification code on said display means by a specified key operation corresponding to said identification code.

31. An information transmitting apparatus for transmitting information to an external receiving apparatus by means of a radio wave, comprising:

a control information attaching means for attaching control information, representing a control processing method on the receiving apparatus side of the information, to said information to be transmitted; and a transmitting means for transmitting information to which said control information is attached;

wherein said apparatus is characterized by at least one of the following of (a) and (b):

(a) said control information includes a telephone number of a facility relevant to said transmitted information or a code corresponding to said telephone number; and (b) said transmitted information comprises a pseudo menu page having a selection item for selecting information and a content page corresponding to each selection item of said pseudo menu page, said content page comprises a header for displaying an information transmission origin and a text for displaying information content, and said control information attaching means attaches to the header of said content page a type code for identifying the type of information content corresponding to each selection item; and wherein said control information attaching means attaches to the information to be transmitted an association data representing association between an identification code for identifying a type of information content and a processing code for designating an information processing method corresponding to said identification code.

* * * * *